(12) United States Patent
Brown et al.

(10) Patent No.: US 12,552,799 B2
(45) Date of Patent: Feb. 17, 2026

(54) TRIAZOLONE COMPOUNDS

(71) Applicant: Nxera Pharma UK Limited, Cambridge (GB)

(72) Inventors: Giles Albert Brown, Cambridge (GB); Miles Stuart Congreve, Cambridge (GB); Stephen Philippe Andrews, Royston (GB); Jonathan Stephen Mason, Cambridge (GB); Francesca Deflorian, Cambridge (GB); Nigel Alan Swain, Cambridge (GB)

(73) Assignee: NXERA PHARMA UK LIMITED, Cambridge (GB)

( * ) Notice: Subject to any disclaimer, the term of this patent is extended or adjusted under 35 U.S.C. 154(b) by 698 days.

(21) Appl. No.: 17/914,157

(22) PCT Filed: Mar. 25, 2021

(86) PCT No.: PCT/EP2021/057808
§ 371 (c)(1),
(2) Date: Sep. 23, 2022

(87) PCT Pub. No.: WO2021/191380
PCT Pub. Date: Sep. 30, 2021

(65) Prior Publication Data
US 2023/0146796 A1    May 11, 2023

Related U.S. Application Data

(60) Provisional application No. 62/994,954, filed on Mar. 26, 2020.

(51) Int. Cl.
| | | |
|---|---|---|
| *C07D 487/04* | (2006.01) | |
| *A61K 31/519* | (2006.01) | |
| *A61P 35/00* | (2006.01) | |

(52) U.S. Cl.
CPC ........ *C07D 487/04* (2013.01); *A61K 31/519* (2013.01); *A61P 35/00* (2018.01); *C07B 2200/05* (2013.01)

(58) Field of Classification Search
CPC ...... C07D 487/04; A61K 31/519; A61P 35/00
See application file for complete search history.

(56) References Cited

FOREIGN PATENT DOCUMENTS

| | | |
|---|---|---|
| EP | 3575301 A1 | 12/2019 |
| JP | 2011513417 A | 4/2011 |
| WO | 2006/138734 A1 | 12/2006 |
| WO | 2009/111449 A1 | 9/2009 |
| WO | 2018184590 A1 | 10/2018 |
| WO | 2019/196803 A1 | 10/2019 |
| WO | 2020010197 A1 | 1/2020 |

OTHER PUBLICATIONS

Patani et al., "Bioisosterism: A Rational Approach in Drug Design", 1996, Chem Rev, 96, pp. 3147-3176 (Year: 1996).*
International Search Report and Written Opinion for Application No. PCT/EP2021/057808, dated May 3, 2021, 10 pages.

* cited by examiner

*Primary Examiner* — Brenda L Coleman
*Assistant Examiner* — Madeline E Braun
(74) *Attorney, Agent, or Firm* — Finnegan, Henderson, Farabow, Garrett & Dunner LLP

(57) ABSTRACT

Described herein are triazalone compounds of Formula (I): and pharmaceutically acceptable salts thereof. Methods of making and using compounds of Formula (I) are also described. Compounds of Formula (I) and pharmaceutically acceptable salts thereof can be useful as adenosine receptor antagonists, for example in the treatment of diseases or conditions mediated by the adenosine receptor, such as cancer, movement disorders, or attention disorders.

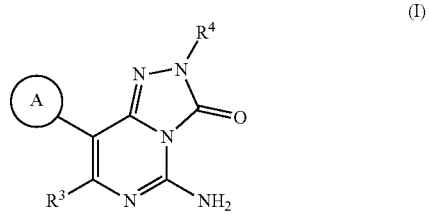

7 Claims, No Drawings

TRIAZOLONE COMPOUNDS

CROSS-REFERENCE TO RELATED APPLICATIONS

This application is a 35 U.S.C. § 371 national stage filing of International Application No. PCT/EP2021/057808, filed on Mar. 25, 2021, which claims priority to U.S. Provisional Application No. 62/994,954, filed on Mar. 26, 2020.

Adenosine modulates of a number of physiological functions. Intracellularly, adenosine is involved in energy metabolism, nucleic acid metabolism, and the methionine cycle; extracellular adenosine engages in intercellular signaling. For example, extracellular adenosine is a potent immunosuppressor, preventing an overzealous immune response during inflammation and infection. Adenosine also acts on other systems, including the cardiovascular system, and the central nervous system.

The action of adenosine is mediated by a family of G-protein coupled receptors. At least four subtypes of adenosine receptors have been identified: A1R, A2aR, A2bR, and A3R. The A1R and A3 subtypes inhibit the activity of the enzyme adenylate cyclase, whereas the A2a and A2b subtypes stimulate the activity of the same enzyme, thereby modulating the level of cyclic AMP in cells.

In the immune system, engagement of A2a and A2b adenosine receptors is a critical regulatory mechanism that protects tissues against excessive immune reactions. In tumors, this pathway is hijacked and hinders antitumor immunity, promoting cancer progression. Furthermore, in many cases, the tumor microenvironment contains high levels of extracellular adenosine. Thus, the adenosine receptor, notably A2aR and A2bR, have been identified as targets for cancer therapies.

Numerous adenosine receptor antagonists have been reported. For example, international patent application WO 2006/138734 discloses triazolopyrimidine cannabinoid receptor 1 (CB-1) antagonists. WO 2008/002596 and WO 2009/111449 disclose adenosine A2a receptor antagonists which include a triazolone moiety. WO 2012/038980 discloses fused tricyclic compounds as adenosine receptor antagonists. WO 2016/161282 discloses heterocyclic compounds as LSD1 inhibitors. WO 2018/166493 discloses heteroaryl[4,3-c]pyrimidine-5-amine derivatives for use as A2a receptor antagonists.

There remains a need for adenosine receptor antagonists that are highly soluble, highly selective, and highly potent.

SUMMARY

In one aspect, a compound of Formula (I):

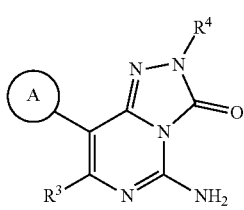

(I)

or a pharmaceutically acceptable salt thereof, is provided, wherein:

ring A can be saturated, partially unsaturated, or aromatic, and can have the structure:

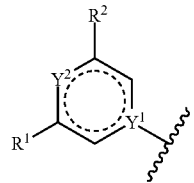

$Y^1$ can be N, —CH—, or —C=;
$Y^2$ can be O or —CR$^g$=;
  wherein R$^g$ is H, halo, —R$^a$ or —OR$^a$;
$R^1$ can be halo, $C_{1-3}$alkyl, —O—$C_{1-3}$alkyl, —CO$_2$R$^a$, or —NR$^7$R$^8$;
  wherein alkyl is optionally substituted with one or more substituents independently selected from —OR$^a$ and halo;
or $R^1$ and R$^g$ together with the atoms to which they are attached can form a 5-membered heterocyclyl or heteroaryl having from one to two heteroatoms selected from N and O;
$R^2$ can be halo, $C_{1-3}$alkyl, —O—$C_{1-3}$alkyl, —CO$_2$R$^a$, or —NR$^7$R$^8$;
  wherein alkyl is optionally substituted with one or more substituents independently selected from —OR$^a$ and halo;
$R^3$ can be:

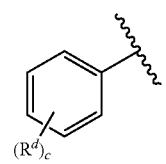

$(R^d)_c$ $R^4$ can be —(CHR$^c$)$_i$—(NR$^a$)$_j$—R$^5$;
$R^5$ can be:
  (1) $C_{3-8}$cycloalkyl, aryl, 3- to 8-membered heterocyclyl, or 3- to 8-membered heteroaryl;
    wherein heterocyclyl and heteroaryl, independently, include from 1 to 4 heteroatoms independently selected from N, O, and S(O)$_k$;
    wherein one or two ring atoms of R$^5$ is optionally replaced by —C(=O)—;
  (2) a 6- to 11-membered multicyclic cycloalkyl, aryl, heterocyclyl, or heteroaryl ring system wherein each of heterocyclyl and heteroaryl include from 1 to 4 heteroatoms independently selected from N, O, and S(O)$_k$;
    wherein one or two ring atoms of R$^5$ is optionally replaced by —C(=O)—; or
  (3) $C_{1-6}$alkyl, —OR$^a$, —NR$^a$R$^b$, cyano, —OS(O)$_2$—$C_{1-3}$alkyl, —CO$_2$R$^a$, —C(O)NR$^a$R$^b$, —NR$^a$—C(O)—OR$^a$, or —O—C(O)—NR$^a$R$^b$;
    wherein R$^5$ is optionally substituted with from one to four groups —X—R$^6$; each X, independently, can be a bond, —O—, —NR$^a$—, —S(O)$_k$—, —(CH$_2$)$_m$—, or —C(O)—;
each R$^6$, independently, can be H, halo, —OR$^a$, $C_{1-6}$alkyl, $C_{3-8}$cycloalkyl, heterocyclyl, heteroaryl, aryl, —CO$_2$R$^a$, —C(O)NR$^a$R$^b$, —(CH$_2$)$_n$—NR$^a$R$^b$, or cyano;
    wherein each of heterocyclyl and heteroaryl include from 1 to 4 heteroatoms independently selected from N, O, and S(O)$_k$;

wherein one or two ring atoms of each $C_{3-8}$cycloalkyl, heterocyclyl, heteroaryl, or aryl, independently is optionally replaced by —C(=O)—;
wherein each of alkyl, cycloalkyl, heterocyclyl, heteroaryl, and aryl is optionally substituted with one or more substituents independently selected from —$R^a$, —$OR^a$, —$(CH_2)_n$—$NR^aR^b$, and halo;
each $R^7$ and each $R^8$, independently, can be $R^a$;
or $R^7$ and $R^8$ together with the atom to which they are attached can form a 3- to 8-membered heterocyclyl optionally substituted with one or more substituents independently selected from —$OR^a$ and halo;
each $R^a$ and each $R^b$, independently, can be H, $C_{1-6}$alkyl, $C_{3-8}$cycloalkyl, or $C_{4-9}$cycloalkylalkyl;
wherein each $R^a$ and each $R^b$, independently, is optionally substituted with one or more substituents independently selected from —OH and halo;
each $R^c$, independently, can be H, halo, $C_{1-3}$alkyl, or —$(CH_2)_n$—$NR^aR^b$;
wherein alkyl is optionally substituted with one or more substituents independently selected from —$OR^a$ and halo;
each $R^d$, independently, can be halo, cyano, —$R^a$, or —$OR^a$;
c can be 0, 1, 2, or 3;
i can be 0, 1, 2, or 3;
j can be 0 or 1;
each k, independently, can be 0, 1, or 2;
each m, independently, can be 1 or 2; and
each n, independently, can be 0 or 1.

The compound can be a selective adenosine receptor antagonist with respect to CB-1.

The compound can have a Ki for at least one of A2aR and A2bR of 100 nM or less, and can have a Ki for CB-1 of 10,000 nM or more.

$R^2$ can be —$CH_3$.

i can 1, 2, or 3; and each $R^c$ can be H.

$R^5$ can be 5-membered heterocyclyl or 5-membered heteroaryl.

i can be 1; $R^c$ can be H; and $R^5$ can be 1,3-oxazolyl optionally substituted with from one to two —$CH_3$.

In another aspect, a compound of Formula (IIa) or (IIb):

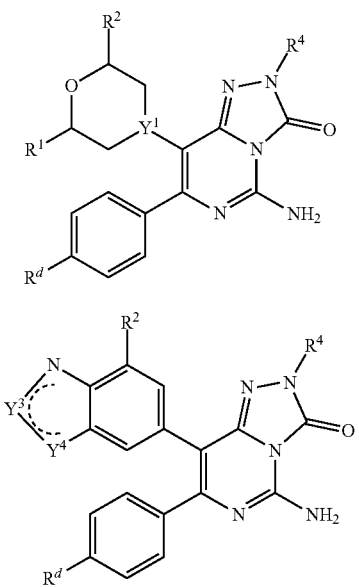

or a pharmaceutically acceptable salt thereof, is provided wherein:
$Y^1$ can be N or CH;
$Y^3$ and $Y^4$ together can be —CH=N—, —N=CH—, —CH=CH—, or =CH—O—;
each $R^1$ and each $R^2$, independently, can be halo, $C_{1-3}$alkyl, or —O—$C_{1-3}$alkyl;
wherein alkyl is optionally substituted with one or more substituents independently selected from —OH and halo;
$R^4$ can be —$CHR^c$—$R^5$;
$R^5$ can be:
(1) 5- or 6-membered heterocyclyl, or 5- or 6-membered heteroaryl;
wherein heterocyclyl and heteroaryl, independently, include from 1 to 4 heteroatoms independently selected from N, O, and $S(O)_k$;
wherein one or two ring atoms of $R^5$ is optionally replaced by —C(=O)—;
wherein heterocyclyl and heteroaryl is optionally substituted with one or more substituents independently selected from halo, —$R^e$, and —$OR^e$; or
(2) H, halo, or $C_{1-3}$alkyl;
wherein alkyl can be optionally substituted with one or more substituents independently selected from —OH and halo;
each $R^a$ and each $R^b$, independently, can be H, $C_{1-6}$alkyl, $C_{3-8}$cycloalkyl, or $C_{4-9}$cycloalkylalkyl;
wherein each $R^a$ and each $R^b$, independently, is optionally substituted with one or more substituents independently selected from —OH and halo;
$R^c$ can be H, halo, $C_{1-3}$alkyl, or —$(CH_2)_n$—$NR^aR^b$;
wherein alkyl is optionally substituted with one or more substituents independently selected from —$OR^a$ and halo;
$R^d$ can be H or halo;
each $R^e$, independently, can be H or $C_{1-6}$alkyl;
wherein alkyl is optionally substituted with one or more substituents independently selected from —OH and halo; and
n can be 0 or 1.

In a compound of Formula (IIa), or a pharmaceutically acceptable salt thereof, $Y^1$ can be N; and $R^1$ and $R^2$ can be each independently —$CH_3$.

In a compound of Formula (IIb), or a pharmaceutically acceptable salt thereof, $R^2$ can be —$CH_3$; and $R^5$ can be 5- or 6-membered heteroaryl.

In a compound of Formula (IIa) or Formula (IIb), or a pharmaceutically acceptable salt thereof, $R^c$ can be H; and $R^5$ can be $C_{1-3}$alkyl optionally substituted with from one to three fluoro.

In another aspect, a compound, or a pharmaceutically acceptable salt thereof, is provided, selected from the group consisting of:
5-amino-8-[(cis)-2,6-dimethylmorpholin-4-yl]-7-phenyl-2-(3,3,3-trifluoropropyl)-[1,2,4]triazolo[4,3-c]pyrimidin-3-one;
5-amino-8-[(cis)-2,6-dimethylmorpholin-4-yl]-2-(3-fluoropropyl)-7-phenyl-[1,2,4]triazolo[4,3-c]pyrimidin-3-one;
5-amino-2-(3,3-difluoropropyl)-8-[(cis)-2,6-dimethylmorpholin-4-yl]-7-phenyl-[1,2,4]triazolo[4,3-c]pyrimidin-3-one;
5-amino-8-[(cis)-2,6-dimethylmorpholin-4-yl]-7-phenyl-2-propyl-[1,2,4]triazolo[4,3-c]pyrimidin-3-one;
5-amino-8-[(cis)-2,6-dimethylmorpholin-4-yl]-7-(4-fluorophenyl)-2-(3,3,3-trifluoropropyl)-[1,2,4]triazolo[4,3-c]pyrimidin-3-one;

5-amino-8-[(cis)-2,6-dimethylmorpholin-4-yl]-7-(4-fluorophenyl)-2-propyl-[1,2,4]triazolo[4,3-c]pyrimidin-3-one;

5-amino-8-[(cis)-2,6-dimethylmorpholin-4-yl]-2-[[(2S)-1-methylpyrrolidin-2-yl]methyl]-7-phenyl-[1,2,4]triazolo [4,3-c]pyrimidin-3-one;

5-amino-8-[(cis)-2,6-dimethylmorpholin-4-yl]-7-phenyl-2-[[(2R)-tetrahydrofuran-2-yl]methyl]-[1,2,4]triazolo [4,3-c]pyrimidin-3-one;

5-amino-8-[(cis)-2,6-dimethylmorpholin-4-yl]-7-phenyl-2-[2-(1-piperidyl)ethyl]-[1,2,4]triazolo[4,3-c]pyrimidin-3-one;

5-amino-8-[(cis)-2,6-dimethylmorpholin-4-yl]-2-[[(3S)-morpholin-3-yl]methyl]-7-phenyl-[1,2,4]triazolo [4,3-c]pyrimidin-3-one;

5-amino-8-[(cis)-2,6-dimethylmorpholin-4-yl]-2-[[(3R)-morpholin-3-yl]methyl]-7-phenyl-[1,2,4]triazolo [4,3-c]pyrimidin-3-one;

5-amino-8-[(cis)-2,6-dimethylmorpholin-4-yl]-2-[[(3S)-4-methylmorpholin-3-yl]methyl]-7-phenyl-[1,2,4]triazolo [4,3-c]pyrimidin-3-one;

5-amino-8-[(cis)-2,6-dimethylmorpholin-4-yl]-2-[[(3R)-4-methylmorpholin-3-yl]methyl]-7-phenyl-[1,2,4]triazolo [4,3-c]pyrimidin-3-one;

5-amino-8-[(cis)-2,6-dimethylmorpholin-4-yl]-2-[(5-fluoro-2-pyridyl)methyl]-7-phenyl-[1,2,4]triazolo[4,3-c]pyrimidin-3-one;

5-amino-8-[(cis)-2,6-dimethylmorpholin-4-yl]-2-[(2-methoxy-3-pyridyl)methyl]-7-phenyl-[1,2,4]triazolo [4,3-c]pyrimidin-3-one;

5-amino-8-[(cis)-2,6-dimethylmorpholin-4-yl]-7-phenyl-2-(pyridazin-3-ylmethyl)-[1,2,4]triazolo[4,3-c]pyrimidin-3-one;

5-amino-8-[(cis)-2,6-dimethylmorpholin-4-yl]-7-phenyl-2-(2-phenylethyl)-[1,2,4]triazolo[4,3-c]pyrimidin-3-one;

5-amino-8-[(cis)-2,6-dimethyl-3,6-dihydro-2H-pyran-4-yl]-7-phenyl-2-(3,3,3-trifluoropropyl)-[1,2,4]triazolo [4,3-c]pyrimidin-3-one;

5-amino-8-[(cis)-2,6-dimethyltetrahydropyran-4-yl]-7-phenyl-2-(3,3,3-trifluoropropyl)-[1,2,4]triazolo[4,3-c]pyrimidin-3-one;

5-amino-2-[(5-fluoro-2-pyridyl)methyl]-8-(4-hydroxy-3,5-dimethyl-phenyl)-7-phenyl-[1,2,4]triazolo[4,3-c]pyrimidin-3-one;

5-amino-7-(4-fluorophenyl)-8-(4-methyl-1,3-benzoxazol-6-yl)-2-(3,3,3-trifluoropropyl)-[1,2,4]triazolo[4,3-c]pyrimidin-3-one;

5-amino-2-[(5-chloro-2-pyridyl)methyl]-7-(4-fluorophenyl)-8-(4-methyl-1,3-benzoxazol-6-yl)-[1,2,4]triazolo[4,3-c]pyrimidin-3-one;

5-amino-7-(4-fluorophenyl)-8-(4-methyl-1,3-benzoxazol-6-yl)-2-[(5-methyl-2-pyridyl)methyl]-[1,2,4]triazolo[4,3-c]pyrimidin-3-one;

5-amino-2-[(5-fluoro-2-pyridyl)methyl]-8-(7-methyl-1H-indazol-5-yl)-7-phenyl-[1,2,4]triazolo[4,3-c]pyrimidin-3-one;

5-amino-2-[(5-fluoro-2-pyridyl)methyl]-8-(7-methyl-1H-benzimidazol-5-yl)-7-phenyl-[1,2,4]triazolo[4,3-c]pyrimidin-3-one;

5-amino-8-(4-methyl-1,3-benzoxazol-6-yl)-2-[(5-methyloxazol-4-yl)methyl]-7-phenyl-[1,2,4]triazolo[4,3-c]pyrimidin-3-one;

5-amino-2-[(2,5-dimethyloxazol-4-yl)methyl]-7-(4-fluorophenyl)-8-(4-methyl-1,3-benzoxazol-6-yl)-[1,2,4]triazolo[4,3-c]pyrimidin-3-one;

5-amino-7-(4-fluorophenyl)-8-(7-methyl-1H-indazol-5-yl)-2-[(5-methyloxazol-4-yl)methyl]-[1,2,4]triazolo[4,3-c]pyrimidin-3-one;

5-amino-8-(7-methyl-1H-indazol-5-yl)-2-[(5-methyloxazol-4-yl)methyl]-7-phenyl-[1,2,4]triazolo[4,3-c]pyrimidin-3-one;

5-amino-8-(7-methyl-1H-indazol-5-yl)-2-[(5-methyloxazol-4-yl)methyl]-7-(2,3,4,5,6-pentadeuteriophenyl)-[1,2,4]triazolo[4,3-c]pyrimidin-3-one;

5-amino-8-(7-chloro-1H-indazol-5-yl)-2-[(5-methyloxazol-4-yl)methyl]-7-phenyl-[1,2,4]triazolo[4,3-c]pyrimidin-3-one; and 5-amino-8-(7-methyl-1H-indol-5-yl)-2-[(5-methyloxazol-4-yl)methyl]-7-phenyl-[1,2,4]triazolo[4,3-c]pyrimidin-3-one.

In another aspect, a pharmaceutical composition comprising a compound of Formula (I), or a pharmaceutically acceptable salt thereof, and a pharmaceutically acceptable carrier, diluent, or excipient, is provided.

In another aspect, use of a compound of Formula (I), or a pharmaceutically acceptable salt thereof, for the treatment of a disease or condition mediated by the adenosine receptor is provided.

The disease or condition mediated by the adenosine receptor can be lung cancer, pancreatic cancer, prostate cancer, ovarian cancer, cervical cancer, colorectal cancer, breast cancer, brain cancer, gastric cancer, liver cancer, renal cancer, endometrial cancer, thyroid cancer, bladder cancer, glial cancer, melanoma, or other solid tumor.

Other features, objects, and advantages will be apparent from the description and drawings, and from the claims.

DESCRIPTION

Compounds of Formula (I), Formula (II), and Formula (IIb), or pharmaceutically acceptable salts thereof, are useful as adenosine receptor antagonists.

A compound of Formula (I):

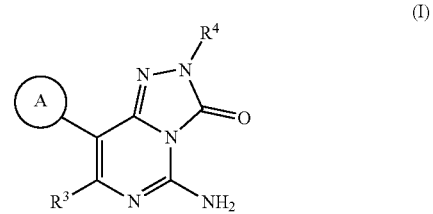

or a pharmaceutically acceptable salt thereof, is described herein.

Ring A is saturated, partially unsaturated, or aromatic, and has the structure:

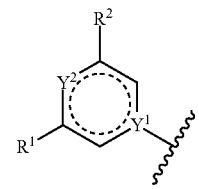

$Y^1$ is N, —CH—, or —C=.

$Y^2$ is O or —CR$^g$=; wherein R$^g$ is H, halo, —R$^a$ or —OR$^a$.

$R^1$ is halo, $C_{1-3}$alkyl, —O—$C_{1-3}$alkyl, —CO$_2$R$^a$, or —NR$^7$R$^8$; wherein alkyl is optionally substituted with one or more substituents independently selected from —OR$^a$ and halo.

Or $R^1$ and $R^g$ together with the atoms to which they are attached form a 5-membered heterocyclyl or heteroaryl having from one to two heteroatoms selected from N and O.

$R^2$ is halo, $C_{1-3}$alkyl, —O—$C_{1-3}$alkyl, —$CO_2R^a$, or —$NR^7R^8$; wherein alkyl is optionally substituted with one or more substituents independently selected from —$OR^a$ and halo.

$R^3$ is:

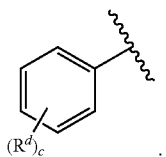

$R^4$ is —$(CHR^c)_i$—$(NR^a)_j$—$R^5$.

$R^5$ is: (1) $C_{3-8}$cycloalkyl, aryl, 3- to 8-membered heterocyclyl, or 3- to 8-membered heteroaryl; wherein heterocyclyl and heteroaryl, independently, include from 1 to 4 heteroatoms independently selected from N, O, and $S(O)_k$; wherein one or two ring atoms of $R^5$ is optionally replaced by —C(=O)—; (2) a 6- to 11-membered multicyclic cycloalkyl, aryl, heterocyclyl, or heteroaryl ring system wherein each of heterocyclyl and heteroaryl include from 1 to 4 heteroatoms independently selected from N, O, and $S(O)_k$; wherein one or two ring atoms of $R^5$ is optionally replaced by —C(=O)—; or (3) $C_{1-6}$alkyl, —$OR^a$, —$NR^aR^b$, cyano, —$OS(O)_2$-$C_{1-3}$alkyl, —$CO_2R^a$, —$C(O)NR^aR^b$, —$NR^a$—C(O)—$OR^a$, or —O—C(O)—$NR^aR^b$.

$R^5$ is optionally substituted with from one to four groups —X—$R^6$.

Each X, independently, is a bond, —O—, —$NR^a$—, —$S(O)_k$—, —$(CH_2)_m$—, or —C(O)—.

Each $R^6$, independently, is H, halo, —$OR^a$, $C_{1-6}$alkyl, $C_{3-8}$cycloalkyl, heterocyclyl, heteroaryl, aryl, —$CO_2R^a$, —$C(O)NR^aR^b$, —$(CH_2)_n$—$NR^aR^b$, or cyano; where in each of heterocyclyl and heteroaryl includes from 1 to 4 heteroatoms independently selected from N, O, and $S(O)_k$; wherein one or two ring atoms of each $C_{3-8}$cycloalkyl, heterocyclyl, heteroaryl, or aryl, independently is optionally replaced by —C(=O)—; wherein each of alkyl, cycloalkyl, heterocyclyl, heteroaryl, and aryl is optionally substituted with one or more substituents independently selected from —$R^a$, —$OR^a$, —$(CH_2)_n$—$NR^aR^b$, and halo.

Each $R^7$ and each $R^8$, independently, is $R^a$.

Or $R^7$ and $R^8$ together with the atom to which they are attached form a 3- to 8-membered heterocyclyl optionally substituted with one or more substituents independently selected from —$OR^a$ and halo.

Each $R^a$ and each $R^b$, independently, is H, $C_{1-6}$alkyl, $C_{3-8}$cycloalkyl, or $C_{4-9}$cycloalkylalkyl; wherein each $R^a$ and each $R^b$, independently, is optionally substituted with one or more substituents independently selected from —OH and halo.

Each $R^c$, independently, is H, halo, $C_{1-3}$alkyl, or —$(CH_2)_n$—$NR^aR^b$; wherein alkyl is optionally substituted with one or more substituents independently selected from —$OR^a$ and halo;

each $R^d$, independently, is halo, cyano, —$R^a$, or —$OR^a$.

c is 0, 1, 2, or 3.
i is 0, 1, 2, or 3.
j is 0 or 1.
Each k, independently, is 0, 1, or 2.
Each m, independently, is 1 or 2.

Each n, independently, is 0 or 1.
In some embodiments, $R^2$ is —$CH_3$.
In some embodiments, i is 1, 2, or 3; and each $R^c$ is H.
In some embodiments, $R^5$ is 5-membered heterocyclyl or 5-membered heteroaryl.
In some embodiments, i is 1; $R^c$ is H; and $R^5$ is 1,3-oxazolyl optionally substituted with from one to two —$CH_3$.
In some embodiments, $R^5$ is 6-membered heterocyclyl or 6-membered heteroaryl.
In some embodiments, $Y^1$ is N; $Y^2$ is O; $R^1$ is —$CH_3$; and $R^2$ is $CH_3$.
In some embodiments, $Y^1$ is —CH— or —C=; and $Y^2$ is O.
In some embodiments, i is 1; $R^c$ is H; and $R^5$ is 5-membered heterocyclyl or 5-membered heteroaryl.
In some embodiments, i is 1; $R^c$ is H; and $R^5$ is 6-membered heterocyclyl or 6-membered heteroaryl.
In some embodiments, $R^1$ and $R^g$ together with the atoms to which they are attached form a 5-membered heterocyclyl or heteroaryl.
In some embodiments, $R^1$ and $R^g$ together with the atoms to which they are attached form a 5-membered heterocyclyl or heteroaryl; and $R^2$ is —$CH_3$.
In some embodiments, $Y^1$ is N; $Y^2$ is O; $R^1$ is —$CH_3$; $R^2$ is $CH_3$; and $R^5$ is 5-membered heterocyclyl or 5-membered heteroaryl.
In some embodiments, $Y^1$ is N; $Y^2$ is O; $R^1$ is —$CH_3$; $R^2$ is $CH_3$; and $R^5$ is 6-membered heterocyclyl or 6-membered heteroaryl.
In some embodiments, $Y^1$ is N; $Y^2$ is O; $R^1$ is —$CH_3$; $R^2$ is $CH_3$; i is 1; $R^c$ is H; and $R^5$ is 5-membered heterocyclyl or 5-membered heteroaryl.
In some embodiments, $Y^1$ is N; $Y^2$ is O; $R^1$ is —$CH_3$; $R^2$ is $CH_3$; i is 1; $R^c$ is H; and $R^5$ is 6-membered heterocyclyl or 6-membered heteroaryl.

A compound of Formula (IIa) or (IIb):

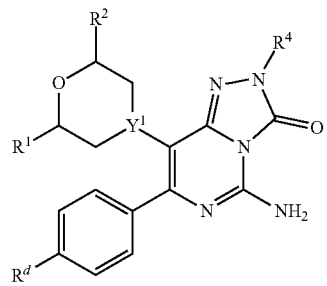

(IIa)

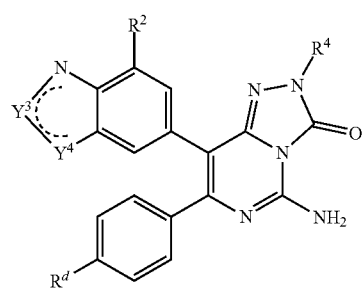

(IIb)

or a pharmaceutically acceptable salt thereof, is described herein.

$Y^1$ is N or CH.
$Y^3$ and $Y^4$ together are —CH=N—, —N=CH—, —CH=CH—, or =CH—O—.

Each $R^1$ and each $R^2$, independently, is halo, $C_{1-3}$alkyl, or —O—$C_{1-3}$alkyl; wherein alkyl is optionally substituted with one or more substituents independently selected from —OH and halo.

$R^4$ is —CHR$^c$—R$^5$.

$R^5$ is: (1) 5- or 6-membered heterocyclyl, or 5- or 6-membered heteroaryl; wherein heterocyclyl and heteroaryl, independently, include from 1 to 4 heteroatoms independently selected from N, O, and S(O)$_k$; wherein one or two ring atoms of $R^5$ is optionally replaced by —C(=O)—; wherein heterocyclyl and heteroaryl are optionally substituted with one or more substituents independently selected from halo, —R$^e$, and —OR$^e$; or (2) H, halo, or $C_{1-3}$alkyl; wherein alkyl is optionally substituted with one or more substituents independently selected from —OH and halo.

Each $R^a$ and each $R^b$, independently, is H, $C_{1-6}$alkyl, $C_{3-8}$cycloalkyl, or $C_{4-9}$cycloalkylalkyl; wherein each $R^a$ and each $R^b$, independently, is optionally substituted with one or more substituents independently selected from —OH and halo.

$R^c$ is H, halo, $C_{1-3}$alkyl, or —(CH$_2$)$_n$—NR$^a$R$^b$; wherein alkyl is optionally substituted with one or more substituents independently selected from —OR$^a$ and halo.

$R^d$ is H or halo.

Each $R^e$, independently, is H or $C_{1-6}$alkyl; wherein alkyl is optionally substituted with one or more substituents independently selected from —OH and halo.

n is 0 or 1.

Compounds of Formula (IIa) and Formula (IIb) are encompassed by the broader Formula (I).

In some embodiments of Formula (IIa), $Y^1$ is N; and $R^1$ and $R^2$ are each independently —CH$_3$.

In some embodiments of Formula (IIb), $R^2$ is —CH$_3$; and $R^5$ is 5- or 6-membered heteroaryl.

In some embodiments, $R^c$ is H; and $R^5$ is $C_{1-3}$alkyl optionally substituted with from one to three fluoro.

In some embodiments, $Y^3$ and $Y^4$ together are —CH=N—.

In some embodiments, $Y^3$ and $Y^4$ together are —N=CH—.

In some embodiments, $Y^3$ and $Y^4$ together are —CH=CH—.

In some embodiments, $Y^3$ and $Y^4$ together are =CH—O—.

In some embodiments of Formula (IIa), $R^c$ is H; and $R^5$ is $C_{1-3}$alkyl optionally substituted with from one to three fluoro.

In some embodiments of Formula (IIb), $R^c$ is H; and $R^5$ is 1,3-oxazolyl optionally substituted with from one to two —CH$_3$.

The term "halo" refers to fluoro, chloro, bromo and iodo.

The term "alkyl" refers to a fully saturated straight-chain or branched aliphatic group, having the number of carbon atoms specified, if designated (e.g., $C_{1-10}$ioalkyl refers to an alkyl group having one to ten carbons). Examples include as methyl, ethyl, n-propyl, isopropyl, n-butyl, t-butyl, isobutyl, sec-butyl, n-pentyl, n-hexyl, n-heptyl, n-octyl, and the like. If no size is designated, "alkyl" refers to a group having from 1 to 10 carbon atoms.

The term "alkenyl" refers to an unsaturated straight-chain or branched aliphatic group, which contain at least one carbon-carbon double bond, and having the number of carbon atoms specified, if designated. Examples of alkenyl groups include, but are not limited to, vinyl, allyl, 1-propenyl, 2-butenyl, 3-butenyl, 3-methylbut-1-enyl, 1-pentenyl and 4-hexenyl. If no size is designated, "alkenyl" refers to a group having from 2 to 10 carbon atoms.

The term "alkynyl" refers to an unsaturated straight-chain or branched aliphatic group, which contain at least one carbon-carbon triple bond, and having the number of carbon atoms specified, if designated. Examples of alkynyl groups include, but are not limited to, ethynyl, propargyl, and but-2-ynyl. If no size is designated, "alkynyl" refers to a group having from 2 to 10 carbon atoms.

Alkenyl and alkynyl groups can contain more than one unsaturated bond, or a mixture of double and triple bonds.

The term "cycloalkyl" refers to a saturated or unsaturated aliphatic ring containing from 3 to 10 carbon ring atoms, where one or more carbon ring atoms can optionally be replaced by —C(=O)—. A cycloalkyl group can contain fused and/or bridged rings, including where the fused or bridged ring(s) are cycloalkyl. Suitable examples of "cycloalkyl" include, but are not limited to, cyclopropyl, cyclopentyl, cyclobutyl, cyclohexyl, cyclohexenyl, cyclohexynyl, cycloheptyl, norbornyl, 4-oxocyclohex-1-yl and 3-oxocyclohept-5-en-1-yl.

The term "heterocyclyl" refers to a saturated or unsaturated heterocyclic ring containing from 3 to 10 ring atoms, where from 1 to 4 ring atoms are independently N, O, or S; and one or more carbon ring atoms can optionally be replaced by —C(=O)—. A ring nitrogen or a ring sulfur atom, independently, can optionally be oxidized, including for example —N(O)—, —S(O)—, or —S(O)$_2$—. A ring nitrogen atom in a heterocyclyl group can optionally be quaternized, for example, —N$^+$(CH$_3$)$_2$—. A heterocyclyl group can contain fused and/or bridged rings, including where the fused or bridged ring(s) are cycloalkyl or heterocyclyl groups. Examples of heterocyclic groups include, but are not limited to, pyrrolidinyl, piperidinyl, piperazinyl, tetrahydrofuranyl, morpholinyl, thiomorpholinyl, dihydropyranyl, dihydropyridinyl, tetrahydropyranyl, octahydroquinolinyl, octahydroindolizinyl, and decahydroquinolinyl.

The term "aryl" refers to a monocyclic, bicyclic or tricyclic aromatic hydrocarbon group containing from 6 to 14 ring atoms. Aryl may contain fused rings, including aryl rings fused to cycloalkyl, heterocyclyl, or aryl rings. Examples of aryl groups include, but are not limited to, phenyl, naphthyl, anthracenyl, tetrahydronaphthyl, and dihydro-1H-indenyl.

The term "heteroaryl" refers to a monocyclic, bicyclic or tricyclic aromatic group containing from 6 to 14 ring atoms, where from 1 to 4 ring atoms are independently N, O, or S. A ring nitrogen or a ring sulfur atom, independently, can optionally be oxidized, including for example —N(O)—, —S(O)—, or —S(O)$_2$—. A heteroaryl group can contain fused and/or bridged rings, including where the fused or bridged ring(s) are cycloalkyl, heterocyclyl, aryl, or heteroaryl groups. Examples of heteroaryl groups include, but are not limited to, pyrrolyl, furanyl, pyridyl, imidazolyl, oxazolyl, thiazolyl, pyrimidinyl, 5,6,7,8-tetrahydroquinolinyl, benzofuranyl, pyrrolopyridinyl, pyrrolopyrimidinyl, triazinyl, and tetrazolyl.

The term "multicyclic ring system" refers to a cycloalkyl, heterocyclyl, aryl, or heteroaryl group which includes two or more fused and/or bridged rings.

Some compounds described herein can exist in more than one stereoisomeric form. Descriptions of such compounds, unless otherwise specified, are intended to encompass all geometric and optical isomers, including racemates.

Some compounds described herein can exhibit tautomerism. The structural drawings herein typically represent only one of the possible tautomeric forms of such compounds. It will be understood that the structural drawings are intended to encompass all tautomeric forms of such compounds.

The term "pharmaceutically acceptable salts" refers those salts of the compounds of Formula (I) which retain the biological activity of the free compounds and which can be administered as a pharmaceutical to humans and/or animals. The desired salt of a basic functional group of a compound may be prepared by treating the compound with an acid. Some examples of suitable inorganic acids include, but are not limited to, hydrochloric acid, hydrobromic acid, sulfuric acid, nitric acid, and phosphoric acid. Some examples of suitable organic acids include, but are not limited to, formic acid, acetic acid, propionic acid, glycolic acid, pyruvic acid, oxalic acid, maleic acid, malonic acid, succinic acid, fumaric acid, tartaric acid, citric acid, benzoic acid, cinnamic acid, mandelic acid, sulfonic acids, and salicylic acid. The desired salt of an acidic functional group of a compound can be prepared by treating the compound with a base. Some examples of suitable inorganic salts of acid compounds include, but are not limited to, alkali metal and alkaline earth salts, such as sodium salts, potassium salts, magnesium salts, and calcium salts; ammonium salts; and aluminum salts. Some examples of suitable of organic salts of acid compounds include, but are not limited to, procaine, dibenzylamine, N-ethylpiperidine, N,N'-dibenzylethylenediamine, and triethylamine salts.

Compounds of Formula (I) may contain the stated atoms in any of their isotopic forms. In this respect, embodiments of the invention that may be mentioned include those in which: (a) the compound of Formula (I) is not isotopically enriched or labelled with respect to any atoms of the compound; and (b) the compound of Formula (I) is isotopically enriched or labelled with respect to one or more atoms of the compound.

The use of "⁓" in formulas herein denotes the point of attachment between different groups.

Illustrative compounds of Formula (I), or a pharmaceutically acceptable salt thereof, include:

5-amino-8-[(cis)-2,6-dimethylmorpholin-4-yl]-7-phenyl-2-(3,3,3-trifluoropropyl)-[1,2,4]triazolo[4,3-c]pyrimidin-3-one;
5-amino-8-[(cis)-2,6-dimethylmorpholin-4-yl]-2-(3-fluoropropyl)-7-phenyl-[1,2,4]triazolo[4,3-c]pyrimidin-3-one;
5-amino-2-(3,3-difluoropropyl)-8-[(cis)-2,6-dimethylmorpholin-4-yl]-7-phenyl-[1,2,4]triazolo[4,3-c]pyrimidin-3-one;
5-amino-8-[(cis)-2,6-dimethylmorpholin-4-yl]-7-phenyl-2-propyl-[1,2,4]triazolo[4,3-c]pyrimidin-3-one;
5-amino-8-[(cis)-2,6-dimethylmorpholin-4-yl]-7-(4-fluorophenyl)-2-(3,3,3-trifluoropropyl)-[1,2,4]triazolo[4,3-c]pyrimidin-3-one;
5-amino-8-[(cis)-2,6-dimethylmorpholin-4-yl]-7-(4-fluorophenyl)-2-propyl-[1,2,4]triazolo[4,3-c]pyrimidin-3-one;
5-amino-8-[(cis)-2,6-dimethylmorpholin-4-yl]-2-[[(2S)-1-methylpyrrolidin-2-yl]methyl]-7-phenyl-[1,2,4]triazolo[4,3-c]pyrimidin-3-one;
5-amino-8-[(cis)-2,6-dimethylmorpholin-4-yl]-7-phenyl-2-[[(2R)-tetrahydrofuran-2-yl]methyl]-[1,2,4]triazolo[4,3-c]pyrimidin-3-one;
5-amino-8-[(cis)-2,6-dimethylmorpholin-4-yl]-7-phenyl-2-[2-(1-piperidyl)ethyl]-[1,2,4]triazolo[4,3-c]pyrimidin-3-one;
5-amino-8-[(cis)-2,6-dimethylmorpholin-4-yl]-2-[[(3S)-morpholin-3-yl]methyl]-7-phenyl-[1,2,4]triazolo[4,3-c]pyrimidin-3-one;
5-amino-8-[(cis)-2,6-dimethylmorpholin-4-yl]-2-[[(3R)-morpholin-3-yl]methyl]-7-phenyl-[1,2,4]triazolo[4,3-c]pyrimidin-3-one;
5-amino-8-[(cis)-2,6-dimethylmorpholin-4-yl]-2-[[(3S)-4-methylmorpholin-3-yl]methyl]-7-phenyl-[1,2,4]triazolo[4,3-c]pyrimidin-3-one;
5-amino-8-[(cis)-2,6-dimethylmorpholin-4-yl]-2-[[(3R)-4-methylmorpholin-3-yl]methyl]-7-phenyl-[1,2,4]triazolo[4,3-c]pyrimidin-3-one;
5-amino-8-[(cis)-2,6-dimethylmorpholin-4-yl]-2-[(5-fluoro-2-pyridyl)methyl]-7-phenyl-[1,2,4,]triazolo[4,3-c]pyrimidin-3-one;
5-amino-8-[(cis)-2,6-dimethylmorpholin-4-yl]-2-[(2-methoxy-3-pyridyl)methyl]-7-phenyl-[1,2,4]triazolo[4,3-c]pyrimidin-3-one;
5-amino-8-[(cis)-2,6-dimethylmorpholin-4-yl]-7-phenyl-2-(pyridazin-3-ylmethyl)-[1,2,4]triazolo[4,3-c]pyrimidin-3-one;
5-amino-8-[(cis)-2,6-dimethylmorpholin-4-yl]-7-phenyl-2-(2-phenylethyl)-[1,2,4]triazolo[4,3-c]pyrimidin-3-one;
5-amino-8-[(cis)-2,6-dimethyl-3,6-dihydro-2H-pyran-4-yl]-7-phenyl-2-(3,3,3-trifluoropropyl)-[1,2,4]triazolo[4,3-c]pyrimidin-3-one;
5-amino-8-[(cis)-2,6-dimethyltetrahydropyran-4-yl]-7-phenyl-2-(3,3,3-trifluoropropyl)-[1,2,4]triazolo[4,3-c]pyrimidin-3-one;
5-amino-2-[(5-fluoro-2-pyridyl)methyl]-8-(4-hydroxy-3,5-dimethyl-phenyl)-7-phenyl-[1,2,4]triazolo[4,3-c]pyrimidin-3-one;
5-amino-7-(4-fluorophenyl)-8-(4-methyl-1,3-benzoxazol-6-yl)-2-(3,3,3-trifluoropropyl)-[1,2,4]triazolo[4,3-c]pyrimidin-3-one;
5-amino-2-[(5-chloro-2-pyridyl)methyl]-7-(4-fluorophenyl)-8-(4-methyl-1,3-benzoxazol-6-yl)-[1,2,4]triazolo[4,3-c]pyrimidin-3-one;
5-amino-7-(4-fluorophenyl)-8-(4-methyl-1,3-benzoxazol-6-yl)-2-[(5-methyl-2-pyridyl)methyl]-[1,2,4]triazolo[4,3-c]pyrimidin-3-one;
5-amino-2-[(5-fluoro-2-pyridyl)methyl]-8-(7-methyl-1H-indazol-5-yl)-7-phenyl-[1,2,4]triazolo[4,3-c]pyrimidin-3-one;
5-amino-2-[(5-fluoro-2-pyridyl)methyl]-8-(7-methyl-1H-benzimidazol-5-yl)-7-phenyl-[1,2,4]triazolo[4,3-c]pyrimidin-3-one;
5-amino-8-(4-methyl-1,3-benzoxazol-6-yl)-2-[(5-methyloxazol-4-yl)methyl]-7-phenyl-[1,2,4]triazolo[4,3-c]pyrimidin-3-one;
5-amino-2-[(2,5-dimethyloxazol-4-yl)methyl]-7-(4-fluorophenyl)-8-(4-methyl-1,3-benzoxazol-6-yl)-[1,2,4]triazolo[4,3-c]pyrimidin-3-one;
5-amino-7-(4-fluorophenyl)-8-(7-methyl-1H-indazol-5-yl)-2-[(5-methyloxazol-4-yl)methyl]-[1,2,4]triazolo [4,3-c]pyrimidin-3-one;
5-amino-8-(7-methyl-1H-indazol-5-yl)-2-[(5-methyloxazol-4-yl)methyl]-7-phenyl-[1,2,4]triazolo[4,3-c]pyrimidin-3-one;
5-amino-8-(7-methyl-1H-indazol-5-yl)-2-[(5-methyloxazol-4-yl)methyl]-7-(2,3,4,5,6-pentadeuteriophenyl)-[1,2,4]triazolo[4,3-c]pyrimidin-3-one;
5-amino-8-(7-chloro-1H-indazol-5-yl)-2-[(5-methyloxazol-4-yl)methyl]-7-phenyl-[1,2,4]triazolo[4,3-c]pyrimidin-3-one; and
5-amino-8-(7-methyl-1H-indol-5-yl)-2-[(5-methyloxazol-4-yl)methyl]-7-phenyl-[1,2,4]triazolo[4,3-c]pyrimidin-3-one.

Compounds of Formula (I) can be adenosine receptor antagonists, i.e. antagonists of one or more of A1R, A2aR, A2bR, and A3R. The term "adenosine receptor antagonist" refers to a compound, e.g., a compound of Formula (I) that binds to the adenosine receptor and antagonizes its activity.

In some cases, the compound of Formula (I) is a selective adenosine receptor antagonist. The term "selective" refers the property of a compound of Formula (I) that is an adenosine receptor antagonist but is substantially inactive at other biological targets. The term "substantially inactive" as used herein describes a compound that (i) has significantly weaker affinity for a given receptor as compared to its affinity for the adenosine receptor; (ii) does not show substantial agonist or antagonist activity at a given receptor; or both (i) and (ii).

The term "selective adenosine receptor antagonist" refers to a compound that shows binding affinity for one or more adenosine receptor subtypes that is at least 100 times greater, at least 1,000 times greater, or at least 10,000 times greater than its affinity for a given receptor. In other words, the ratio of binding Ki values (given receptor:adenosine receptor) can be at least 100, at least 1,000, or at least 10,000.

In particular, a selective adenosine receptor antagonist can be substantially inactive toward other G-protein coupled receptors, such as the cannabinoid receptors, referred to as CB-1 and CB-2.

A compound of Formula (I) can have a binding affinity Ki for A2aR of, e.g., 100 nM or less, 10 nM or less, or 1 nM or less.

A compound of Formula (I) can have a binding affinity Ki for A2bR of, e.g., 100 nM or less, 10 nM or less, or 1 nM or less.

A compound of Formula (I) can have a binding affinity $K_i$ for CB-1 of, e.g., 1,000 nM or greater, 10,000 nM or greater, 13,000 nM or greater.

A compound of Formula (I) can be a selective adenosine receptor antagonist with respect to CB-1.

A compound of Formula (I) can be active as an adenosine receptor antagonist but substantially inactive at CB-1.

The compounds of Formula (I) can also be selective between the different subtypes of adenosine receptor. In some embodiments, the compounds of Formula (I) are A2aR-selective; A2bR-selective; or dual A2aR/A2bR-selective.

An A2aR-selective compound shows a binding affinity for A2aR that is at least 100 times stronger, at least 1,000 times stronger, or at least 10,000 times stronger than its binding affinity for each of A1R, A2bR, and A3R.

An A2bR-selective compound that is at least 100 times stronger, at least 1,000 times stronger, or at least 10,000 times stronger than its binding affinity for each of A1R, A2aR, and A3R.

A dual A2aR/A2bR-selective compound shows a binding affinity for A2aR that is at least 100 times stronger, at least 1,000 times stronger, or at least 10,000 times stronger than its binding affinity for each of A1R and A3R. A dual A2aR/A2bR-selective also shows a binding affinity for A2bR that is at least 100 times stronger, at least 1,000 times stronger, or at least 10,000 times stronger than its binding affinity for each of AIR and A3R. In addition, for a dual A2aR/A2bR-selective compound, the ratio of binding affinity for A2aR to binding affinity for A2bR is less than 100.

In one embodiment, there is provided a pharmaceutical composition which includes a compound of Formula (I), or a pharmaceutically acceptable salt thereof, and a pharmaceutically acceptable carrier, diluent, or excipient.

The compositions of the invention may be in a form suitable for oral use (for example as tablets, lozenges, hard or soft capsules, aqueous or oily suspensions, emulsions, dispersible powders or granules, syrups or elixirs), for topical use (for example as creams, ointments, gels, or aqueous or oily solutions or suspensions), for administration by inhalation (for example as a finely divided powder or a liquid aerosol), for administration by insufflation (for example as a finely divided powder) or for parenteral administration (for example as a sterile aqueous or oily solution for intravenous, subcutaneous, intramuscular or intramuscular dosing or as a suppository for rectal dosing).

Suitable pharmaceutically acceptable excipients for a tablet formulation include, for example, inert diluents such as lactose, sodium carbonate, calcium phosphate or calcium carbonate; granulating and disintegrating agents such as corn starch or algenic acid; binding agents such as starch; lubricating agents such as magnesium stearate, stearic acid or talc; preservative agents such as ethyl or propyl p-hydroxybenzoate; and anti-oxidants, such as ascorbic acid. Tablet formulations may be uncoated or coated either to modify their disintegration and the subsequent absorption of the active ingredient within the gastrointestinal tract, or to improve their stability and/or appearance, in either case, using conventional coating agents and procedures well known in the art.

Compositions for oral use may be in the form of hard gelatin capsules in which the active ingredient is mixed with an inert solid diluent, for example, calcium carbonate, calcium phosphate or kaolin, or as soft gelatin capsules in which the active ingredient is mixed with water or an oil such as peanut oil, liquid paraffin, or olive oil.

Compounds of Formula (I) are useful in the treatment of diseases or conditions mediated by the adenosine receptor. In one embodiment, there is provided a compound of Formula (I) or a pharmaceutically acceptable salt thereof, for use in the treatment of diseases or conditions mediated by the adenosine receptor. In some embodiments the disease or condition is mediated by A2aR; in other embodiments, by A2bR; in still other embodiments, by both A2aR and A2bR.

Some examples of disease or conditions mediated by the adenosine receptor include cancer, including lung cancer, pancreatic cancer, prostate cancer, ovarian cancer, cervical cancer, colorectal cancer, breast cancer, brain cancer, gastric cancer, liver cancer, renal cancer, endometrial cancer, thyroid cancer, bladder cancer, glial cancer, melanoma, or other solid tumor; movement disorders, including Parkinson's disease and Huntington's disease; and attention disorders, including attention deficit disorder and attention deficit-hyperactivity disorder. Other diseases and conditions mediated by the adenosine receptor are known.

In one embodiment, there is provided a compound of Formula (I), or a pharmaceutically acceptable salt thereof, for use in the treatment of a disease or condition mediated by the adenosine receptor.

In one embodiment, there is provided a compound of Formula (I), or a pharmaceutically acceptable salt thereof, for use in the treatment of cancer (including lung cancer, pancreatic cancer, prostate cancer, ovarian cancer, cervical cancer, colorectal cancer, breast cancer, brain cancer, gastric cancer, liver cancer, renal cancer, endometrial cancer, thyroid cancer, bladder cancer, glial cancer, melanoma, or other solid tumor).

In one embodiment, there is provided a compound of Formula (I), or a pharmaceutically acceptable salt thereof, for use in the treatment of a disease or condition mediated by the adenosine receptor, wherein the compound is a selective adenosine receptor antagonist with respect to CB-1.

In one embodiment, there is provided a compound of Formula (I), or a pharmaceutically acceptable salt thereof, for use in the treatment of cancer (including lung cancer, pancreatic cancer, prostate cancer, ovarian cancer, cervical cancer, colorectal cancer, breast cancer, brain cancer, gastric cancer, liver cancer, renal cancer, endometrial cancer, thyroid cancer, bladder cancer, glial cancer, melanoma, or other solid tumor, wherein the compound is a selective adenosine receptor antagonist with respect to CB-1.

In one embodiment, there is provided a method of treating a disease or condition mediated by the adenosine receptor, which includes administering an effective amount of a compound of Formula (I), or a pharmaceutically acceptable salt thereof, to a subject in need of such treatment.

In one embodiment, there is provided a method of treating cancer (including lung cancer, pancreatic cancer, prostate cancer, ovarian cancer, cervical cancer, colorectal cancer, breast cancer, brain cancer, gastric cancer, liver cancer, renal cancer, endometrial cancer, thyroid cancer, bladder cancer, glial cancer, melanoma, or other solid tumor) which includes administering an effective amount of a compound of Formula (I), or a pharmaceutically acceptable salt thereof, to a subject in need of such treatment.

In one embodiment, there is provided a method of treating a disease or condition mediated by the adenosine receptor, which includes administering an effective amount of a compound of Formula (I), or a pharmaceutically acceptable salt thereof, to a subject in need of such treatment, wherein the compound is a selective adenosine receptor antagonist with respect to CB-1.

In one embodiment, there is provided a method of treating cancer (including lung cancer, pancreatic cancer, prostate cancer, ovarian cancer, cervical cancer, colorectal cancer, breast cancer, brain cancer, gastric cancer, liver cancer, renal cancer, endometrial cancer, thyroid cancer, bladder cancer, glial cancer, melanoma, or other solid tumor), which includes administering an effective amount of a compound of Formula (I), or a pharmaceutically acceptable salt thereof, to a subject in need of such treatment, wherein the compound is a selective adenosine receptor antagonist with respect to CB-1.

In one embodiment, there is provided a compound of Formula (I), or a pharmaceutically acceptable salt thereof, for use in the manufacture of a medicament for use in the treatment of a disease or condition mediated by the adenosine receptor.

In one embodiment, there is provided a compound of Formula (I), or a pharmaceutically acceptable salt thereof, for use in the manufacture of a medicament for use in the treatment of cancer (including lung cancer, pancreatic cancer, prostate cancer, ovarian cancer, cervical cancer, colorectal cancer, breast cancer, brain cancer, gastric cancer, liver cancer, renal cancer, endometrial cancer, thyroid cancer, bladder cancer, glial cancer, melanoma, or other solid tumor).

In one embodiment, there is provided a compound of Formula (I), or a pharmaceutically acceptable salt thereof, for use in the manufacture of a medicament for use in the treatment of a disease or condition mediated by the adenosine receptor, wherein the compound is a selective adenosine receptor antagonist with respect to CB-1.

In one embodiment, there is provided a compound of Formula (I), or a pharmaceutically acceptable salt thereof, for use in the manufacture of a medicament for use in the treatment of cancer (including lung cancer, pancreatic cancer, prostate cancer, ovarian cancer, cervical cancer, colorectal cancer, breast cancer, brain cancer, gastric cancer, liver cancer, renal cancer, endometrial cancer, thyroid cancer, bladder cancer, glial cancer, melanoma, or other solid tumor, wherein the compound is a selective adenosine receptor antagonist with respect to CB-1.

Compounds of Formula (I) can be prepared according to the following general schemes.

Schemes 1a and 1b illustrate the preparation of intermediate 6-substituted-4-hydrazino-2-aminopyrimidine compounds of Formula (IV).

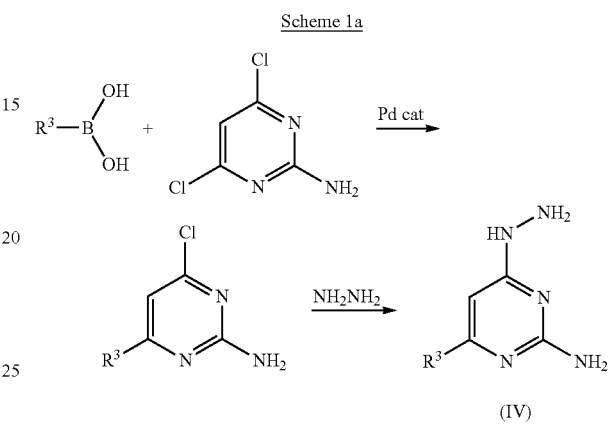

Scheme 1a

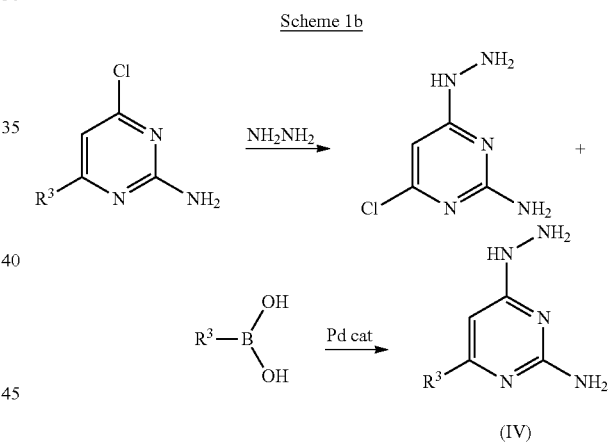

Scheme 1b

Scheme 2 illustrates the conversion of compounds of Formula (IV) into the intermediate 7-substituted-5-amino-8-bromo-[1,2,4]triazolo[4,3-c]pyrimidin-3-one compounds of Formula (V). Briefly, the compound of Formula (IV) is treated with triphosgene to effect closure of the triazolone ring, followed by bromination with $(CH_3)_3PhN^+Br_3^-$.

Scheme 2

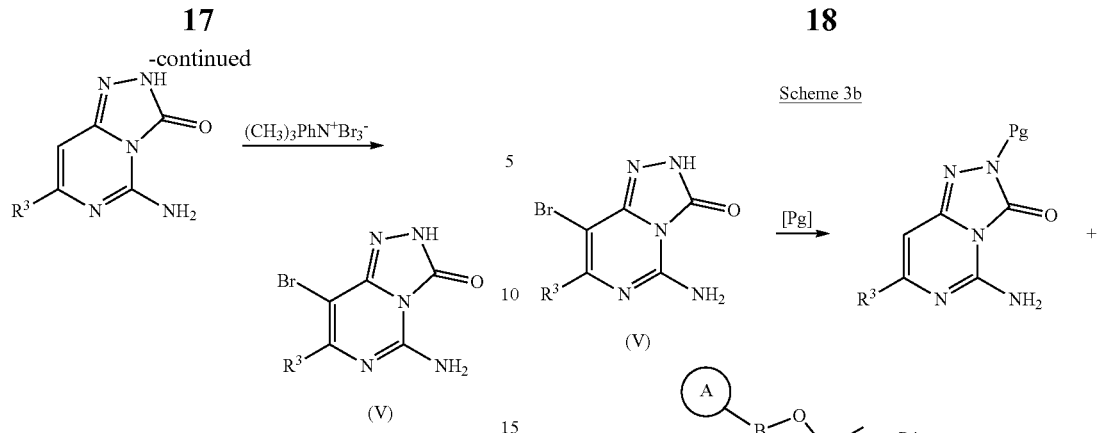

Scheme 3a illustrates the conversion of compounds of Formula (V) into compound of Formula (I). The alkylation of the compound of Formula (V) with $R^4$ can be carried out using a variety of methods, for example, Mitsonobu reaction; alcohol mesylation followed by an alkylation reaction; alcohol tosylation followed by an alkylation reaction; or alcohol chlorination followed by an alkylation reaction.

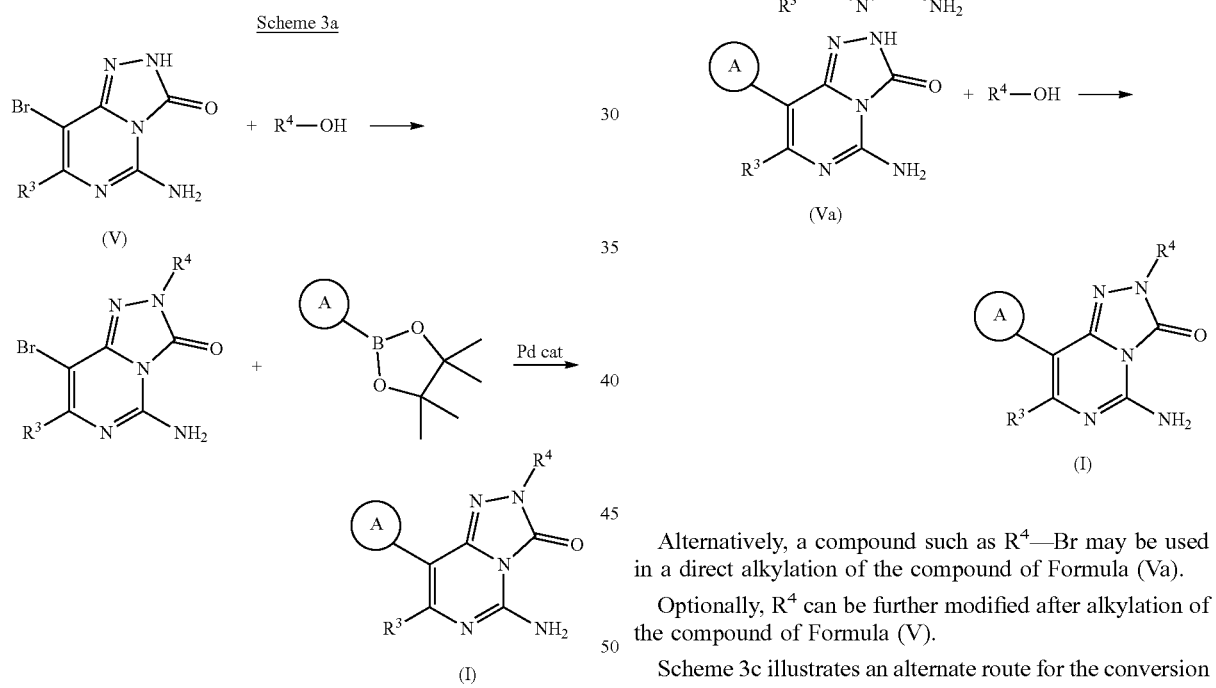

Alternatively, a compound such as $R^4$—Br may be used in a direct alkylation of the compound of Formula (V).

Optionally, $R^4$ can be further modified after alkylation of the compound of Formula (V).

Scheme 3b illustrates an alternate route for the conversion of compounds of Formula (V) into compounds of Formula (I). In Scheme 3b, [Pg] represents a suitable reagent for installing the protecting group denoted Pg. The alkylation of the compound of Formula (Va) with $R^4$ can be carried out using a variety of methods, for example, Mitsonobu reaction; alcohol mesylation followed by an alkylation reaction; alcohol tosylation followed by an alkylation reaction; alcohol chlorination followed by an alkylation reaction.

Alternatively, a compound such as $R^4$—Br may be used in a direct alkylation of the compound of Formula (Va).

Optionally, $R^4$ can be further modified after alkylation of the compound of Formula (V).

Scheme 3c illustrates an alternate route for the conversion of compounds of Formula (V) into compounds of Formula (I). Step 1 of Scheme 3c is the same as in Scheme 3a, i.e., the alkylation of the compound of Formula (V) with $R^4$ can be carried out using a variety of methods, for example, Mitsonobu reaction; alcohol mesylation followed by an alkylation reaction; alcohol tosylation followed by an alkylation reaction; or alcohol chlorination followed by an alkylation reaction. Alternatively, a compound such as $R^4$—Br may be used in a direct alkylation of the compound of Formula (V).

Step 2 of Scheme 3c illustrates the case where ring A includes an aliphatic amine as the point of attachment. In this case, the product of step 1 can be reacted directly with the ring A precursor compound as shown in Scheme 3c.

Scheme 3c

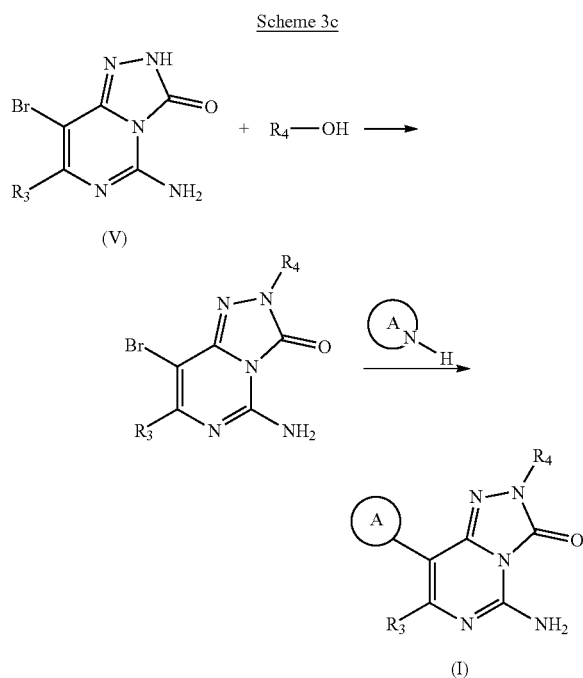

Optionally, a compound of Formula (I) can be further modified, for example, to form a different compound of Formula (I).

EXAMPLES

General Techniques

LCMS Method A

Instrument: Agilent Technologies 1200 Series, Agilent LC/MSD SL, Column: Waters XBridge C8 3.5μ, 4.6×50 mm. Gradient [time (min)/solvent B (%)]:0.0/5,8.0/100,8.1/100,8.5/5,10.0/5. (Solvent A=1 mL of TFA in 1000 mL of Milli-Q Water; Solvent B=1 mL of TFA in 1000 mL of MeCN); Injection volume 1 μL (may vary); UV detection 220 to 400 nm; Column temperature 25° C.; 2.0 mL/min.

Note: For UV inactive compounds an ELSD detector (Polymer Laboratories PL-ELS 2100 ICE) is connected with the above instrument.

LCMS Method B

Instrument: Agilent Technologies 1200 Series, Agilent LC/MSD SL, Column: Atlantis dC18 5μ, 4.6×50 mm. Gradient [time (min)/solvent B (%)]:0.0/10, 2.5/95, 4.5/95, 4.6/10, 6.0/10. (Solvent A=1 mL of TFA in 1000 mL of Milli-Q Water; Solvent B=1 mL of TFA in 1000 mL of MeCN); Injection volume 1 μL (may vary); UV detection 210 to 400 nm; Column temperature 25° C.; 1.5 mL/min.

LCMS Method C

Instrument: Agilent Technologies 1200 Series, Agilent 6130 Quadrupole LC/MS, Column: Zorbax C18 5μ, 4.6×50 mm. Gradient [time (min)/solvent B (%)]:0.0/10, 2.5/95, 4.5/95, 4.6/10, 6.0/10. (Solvent A=1 mL of Formic Acid in 1000 mL of Milli-Q Water; Solvent B=MeCN); Injection volume 1 μL (may vary); UV detection 210 to 400 nm; column temperature 25° C.; 1.5 mL/min.

LCMS Method D

Instrument: Agilent Technologies 1200 Series, Agilent 6130 Quadrupole LC/MS, Column: Zorbax C18 5 μ4.6×50 mm. Gradient [time (min)/solvent B (%)]:0.0/10, 4.0/95, 5.0/95, 5.5/10, 7.0/10. (Solvent A=770.08 mg of Ammonium acetate in 1000 mL of Milli-Q Water; Solvent B=MeCN); Injection volume 1 μL (may vary); UV detection 210 to 400 nm; column temperature 25° C.; 1.2 mL/min.

Prep-HPLC Method A

Instrument: Agilent Technologies 1260 Infinity II Series LC. Solvent: A-0.1% TFA in $H_2O$, B-MeOH, Column: YMC Actus Triart C18 (30 mm×250 mm) 5 μm. Gradient [time (min)/solvent B (%)]:0.0/10, 20/95, 23/95, 24/10, 26/10.

Prep-HPLC Method B

Instrument: Agilent Technologies 1260 Infinity II Series LC. Solvent: A-0.1% HCOOH in $H_2O$, B-MeCN, Column: YMC Actus Triart C8 (20 mm×250 mm) 5 μm. Gradient [time (min)/solvent B (%)]:0.0/10, 20/95, 23/95, 24/10, 26/10.

Prep-HPLC Method C

Instrument: Agilent Technologies 1260 Infinity II Series LC. Solvent: A-10 mM $NH_4HCO_3$ in $H_2O$, B-MeOH or MeCN, Column: XBridge C8 (19 mm×150 mm), 5 μm or YMC Actus Triart C18 (30 mm×250 mm) 5 μm. Gradient [time (min)/solvent B (%)]:0.0/10, 15/95, 18/95, 19/10, 21/10.

Synthetic Routes for Intermediates

Synthetic Route 1

Intermediate 1, 5-amino-8-bromo-7-phenyl-[1,2,4]triazolo[4,3-c]pyrimidin-3(2H)-one

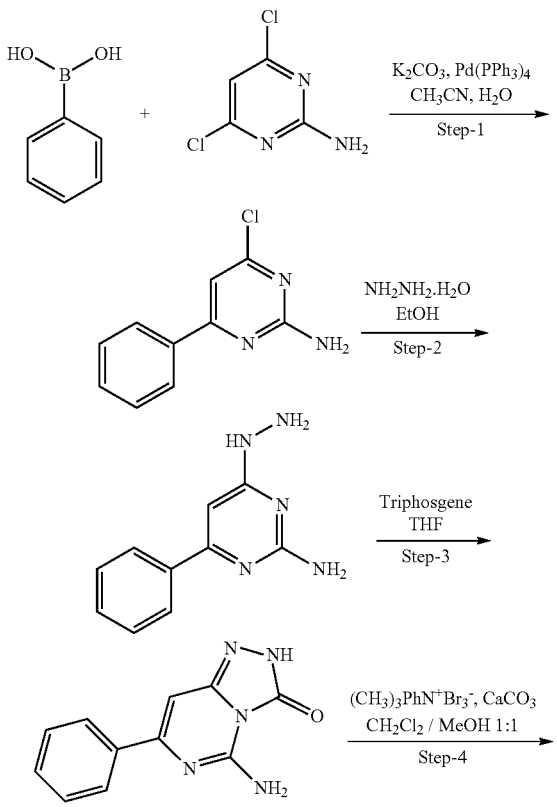

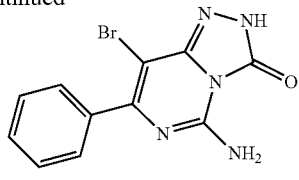

Intermediate 1

Step 1; This reaction was performed as 2×250 g batches. To a degassed suspension of phenyl boronic acid (250 g, 2.05 mol), 4,6-dichloro-2-aminopyrimidine (672 g, 4.10 mol) and $K_2CO_3$ (848 g, 6.15 mol) in $CH_3CN$ (15 L) and $H_2O$ (2 L) at room temperature was added $Pd(PPh_3)_4$ (118 g, 0.10 mol) and the resultant reaction mixture was heated to 90° C. for 6 h. The reaction mixture was concentrated under reduced pressure. The residue obtained was vigorously stirred with $H_2O$ (4 L) and DCM (10 L), undissolved solids were filtered-off through a Buchner funnel and rinsed with DCM (3 L). The filtrate was taken in a separating funnel, the organic layer was separated, dried over anhydrous $Na_2SO_4$ and concentrated under reduced pressure. The crude product was purified by flash chromatography using 230-400 silica mesh and was eluted with 0-15% EtOAc in pet-Ether to afford 4-chloro-6-phenylpyrimidin-2-amine (350 g, 41%) as an off-white solid.

LCMS (Method A): m/z 206 $(M+H)^+(ES^+)$, at 2.53 min, UV active.

$^1$H NMR: (400 MHz, DMSO-d6) δ: 8.05-8.03 (m, 2H), 7.52-7.47 (m, 3H), 7.21 (s, 1H). Exchangeable —$NH_2$ protons were not observed.

Step 2; To a stirred suspension of 4-chloro-6-phenylpyrimidin-2-amine (350 g, 1.70 mol) in EtOH (4.0 L), hydrazine hydrate (255 g, 5.1 mol) was added and the mixture was heated to 90° C. for 15 h. The reaction was concentrated under reduced pressure. The residue obtained was triturated with diethyl ether (1 L) and 10% sodium bicarbonate solution (1 L). The solid obtained was collected by filtration through a Buchner funnel, rinsed with Diethyl ether (200 mL) and dried under vacuum to afford 4-hydrazinyl-6-phenylpyrimidin-2-amine (250 g, 73%) as an off-white solid.

LCMS (Method C): m/z 202 $(M+H)^+(ES^+)$, at 0.69 min, UV active.

$^1$H NMR: (400 MHz, DMSO-d6) δ: 7.94-7.91 (m, 2H), 7.84 (s, 1H), 7.48-7.42 (m, 3H), 6.47 (s, 1H), 6.00 (s, 2H), 4.25 (s, 2H).

Step 3; To a solution of 4-hydrazinyl-6-phenylpyrimidin-2-amine (250 g, 1.24 mol) in dry THF (3.0 L) under $N_2$, cooled to −30° C. was added triphosgene (735 g, 2.48 mol) portion wise and the mixture was stirred at same temperature for 45 min. The reaction was quenched cautiously into ice cold $H_2O$ (10 L) with vigorous stirring. After the effervescence stopped, the reaction mass was concentrated under reduced pressure. The resulting solid was collected by filtration through a Buchner funnel, rinsed with $H_2O$ (1 L) and dried under vacuum to afford 5-amino-7-phenyl-[1,2,4]triazolo[4,3-c]pyrimidin-3(2H)-one (200 g, 70%) as a yellow solid.

LCMS (Method C): m/z 228 $(M+H)^+(ES^+)$, at 1.64 min, UV active.

$^1$H NMR: (400 MHz, DMSO-d6) δ: 12.46 (s, 1H), 8.05-7.98 (m, 3H), 7.65 (s, 1H), 7.50-7.44 (m, 3H), 6.93 (s, 1H).

Step 4; To a suspension of 5-amino-7-phenyl-[1,2,4]triazolo[4,3-c]pyrimidin-3(2H)-one (200 g, 0.88 mol) in DCM/MeOH 1:1 (2 L) under $N_2$ atmosphere, $CaCO_3$ (88 g, 0.88 mol) followed by $(CH_3)_3PhN^+Br_3^-$ (331 g, 0.88 mol) were added and the mixture was stirred at room temperature for 1 h. The reaction mixture was filtered through a Buchner funnel, rinsed with small portions of MeOH/DCM (1:1) and dried under vacuum to afford Intermediate 1, 5-amino-8-bromo-7-phenyl-[1,2,4]triazolo[4,3-c]pyrimidin-3(2H)-one (160 g, 59%) as a light brown solid. The data for the title compound are in Table 2.

Synthetic Route 2

Intermediate 3, 5-amino-8-bromo-7-phenyl-2-(3,3,3-trifluoropropyl)-[1,2,4]triazolo[4,3-c]pyrimidin-3 (2H)-one

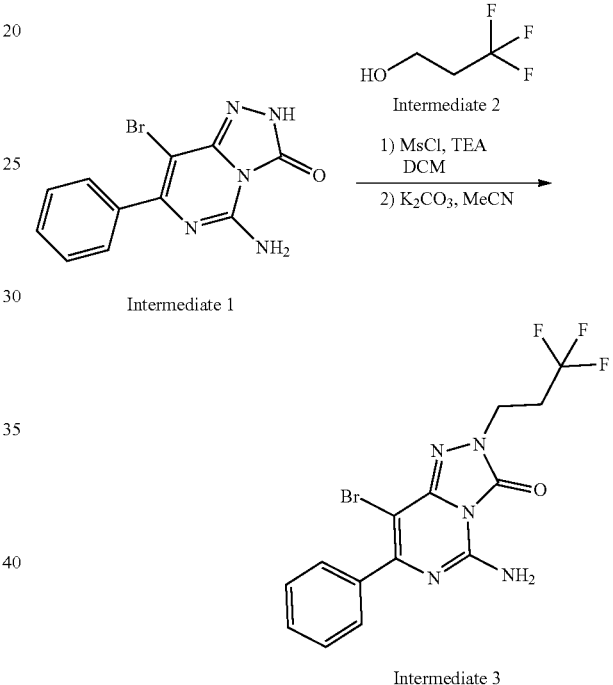

Intermediate 1

Intermediate 3

To a solution of 3,3,3-trifluoropropan-1-ol (400 mg, 3.6 mmol) in DCM (10 mL) at 0° C. was added TEA (1.3 mL, 9.6 mmol) followed by the dropwise addition of mesyl chloride (0.4 mL, 4.8 mmol). The resultant reaction mixture was stirred for 1 h. The reaction was partitioned between DCM (20 mL) and brine solution (20 mL). The organic layer was separated, dried over anhydrous $Na_2SO_4$ and concentrated under reduced pressure to afford 3,3,3-trifluoropropyl methanesulfonate. This intermediate was added to a suspension of 5-amino-8-bromo-7-phenyl-[1,2,4]triazolo[4,3-c]pyrimidin-3(2H)-one (1 g, 3.2 mmol) and $K_2CO_3$ (1.3 g, 9.6 mmol) in MeCN (20 mL) and the reaction mixture was stirred at 80° C. for 15 h. The reaction mixture was partitioned between EtOAc (50 mL) and $H_2O$ (50 mL). The organic layer was separated, dried over anhydrous $Na_2SO_4$ and concentrated under reduced pressure. The crude product was triturated with MeOH (5 mL) filtered through a Buchner funnel and dried under vacuum to afford 5-amino-8-bromo-7-phenyl-2-(3,3,3-trifluoropropyl)-[1,2,4]triazolo[4,3-c]pyrimidin-3(2H)-one (700 mg, 53%) as an off-white solid. The data for the title compound are in Table 2.

Synthetic Route 3

Intermediate 4, 5-amino-8-bromo-7-(4-fluorophenyl)-[1,2,4]triazolo[4,3-c]pyrimidin-3(2H)-one

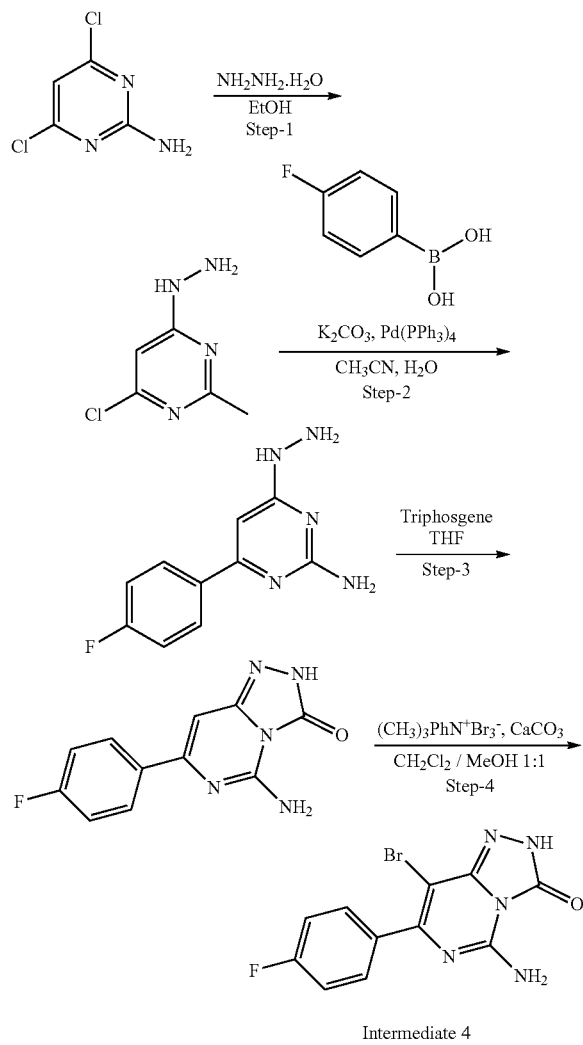

Intermediate 4

Step 1; To a stirred suspension of 4,6-dichloropyrimidin-2-amine (400 g, 2.43 mol) in EtOH (5 L), was added hydrazine hydrate (365 g, 7.31 mol) and the mixture was heated to 90° C. for 15 h. The reaction mass was concentrated under reduced pressure. The residue obtained was triturated with diethyl ether (1 L) and 10% sodium bicarbonate solution (1 L). The solid obtained was collected by filtration through a Buchner funnel, rinsed with Diethyl ether (200 mL) and dried under vacuum to afford 4-chloro-6-hydrazineylpyrimidin-2-amine (300 g, 77%) as an off-white solid.

LCMS (Method C): m/z 160 (M+H)$^+$(ES$^+$), at 0.37 min, UV active.

$^1$H NMR: (400 MHz, DMSO-d6) δ: 8.10 (s, 1H), 6.36 (s, 2H), 5.97 (s, 1H), 4.26 (s, 2H). Step 2; To a degassed suspension of 4-chloro-6-hydrazineylpyrimidin-2-amine (300 g, 1.87 mol), 4-Fluorophenyl boronic acid (313 g, 2.24 mol), and K$_2$CO$_3$ (774 g, 5.61 mol) in 1,4-dioxane (6 L) and H$_2$O (1 L) at room temperature was added Pd(PPh$_3$)$_4$ (107 g, 0.093 mol) and the resultant reaction mixture was heated to 110° C. for 15 h. The reaction mixture was concentrated under reduced pressure to remove the 1,4-dioxane. The residue obtained was vigorously stirred with H$_2$O (4 L) to obtain a solid, which was filtered through Buchner funnel and rinsed with MeOH (1 L). The solid was dried under vacuum to afford 4-(4-fluorophenyl) hydrazineylpyrimidin-2-amine (200 g, 49%) as a green solid.

LCMS (Method C): m/z 220 (M+H)$^+$(ES$^+$), at 0.76 min, UV active.

$^1$H NMR: (400 MHz, DMSO-d6) δ: 8.00-7.96 (m, 2H), 7.854 (s,1H), 7.29-7.24 (m, 2H), 6.45 (s, 1H), 6.01 (s, 2H), 4.24 (s, 2H).

Step 3; To a solution of 4-(4-fluorophenyl)-6-hydrazineylpyrimidin-2-amine (200 g, 0.91 mol) in dry THF (3.0 L) under N$_2$, cooled to −30° C. was added triphosgene (538 g, 1.82 mol) portionwise and the mixture was stirred at same temperature for 1 h. The reaction was quenched cautiously into ice cold H$_2$O (10 L) with vigorous stirring. After the effervescence stopped, the reaction mass was concentrated under reduced pressure. The resulting solid was collected by filtration through a Buchner funnel, rinsed with H$_2$O (1 L) and dried under vacuum to afford 5-amino-7-(4-fluorophenyl)-[1,2,4]triazolo[4,3-c]pyrimidin-3(2H)-one (150 g, 67%) as yellow solid.

LCMS (Method C): m/z 246 (M+H)$^+$(ES$^+$), at 1.77 min, UV active.

$^1$H NMR: (400 MHz, DMSO-d6) δ: 12.43 (s, 1H), 8.19-8.01 (m, 2H), 7.95-7.52 (m, 2H), 7.50-7.27 (m, 2H), 6.92 (s, 1H).

Step 4; This reaction was performed on 2×75 g batches. To a suspension of 5-amino-7-(4-fluorophenyl)-[1,2,4]triazolo[4,3-c]pyrimidin-3(2H)-one (150 g, 0.66 mol) in DCM/MeOH 1:1 (2 L) under N$_2$ atmosphere, CaCO$_3$ (66 g, 0.66 mol) followed by (CH$_3$)$_3$PhN$^+$Br$_3^-$(250 g, 0.66 mol) were added and the mixture was stirred at room temperature for 1 h. The reaction mixture was filtered through a Buchner funnel, rinsed with small portions of MeOH/DCM (1:1) and dried under vacuum to afford Intermediate 26, 5-amino-8-bromo-7-(4-fluorophenyl)-[1,2,4]triazolo[4,3-c]pyrimidin-3(2H)-one (120 g, 60%) as light brown solid. The data for the title compound are in Table 2.

Synthetic Route 4

Intermediate 15, 4-methyl-6-(4,4,5,5-tetramethyl-1,3,2-dioxaborolan-2-yl)benzo[d]oxazole

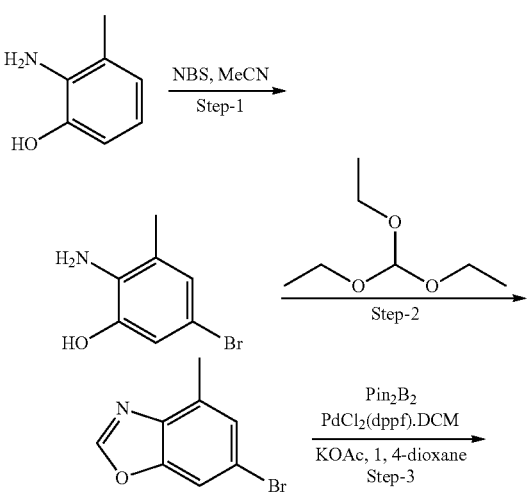

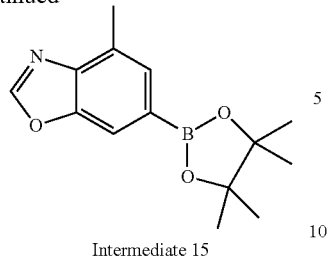

Intermediate 15

Step 1; To a stirred solution of 2-amino-3-methylphenol (5 g, 40.65 mmol) in MeCN (100 mL), was added NBS (8.6 g, 48.78 mmol) 0° C. and the resultant reaction mixture was stirred at room temperature for 2 h. The reaction mixture was quenched with $H_2O$ (50 mL) and extracted with EtOAc (2×100 mL). The organic layer was separated, dried over anhydrous $Na_2SO_4$ and concentrated under reduced pressure. The crude product was purified by flash column chromatography using silica mesh (230-400) and eluted with 5-10% EtOAc in pet ether gradient to afford 2-amino-5-bromo-3-methylphenol (1 g, 13%) as a brown solid.

LCMS (Method C): m/z 202 (M+H)$^+$(ES$^+$), at 1.54 min, UV active.

$^1$H NMR: (400 MHz, DMSO-d6) δ: 6.62 (s, 2H), 4.38 (s, 2H), 2.03 (s, 3H). Exchangeable —OH proton was not observed.

Step 2; A suspension of 2-amino-5-bromo-3-methylphenol (900 mg, 4.45 mmol) and triethoxy methane (10 mL) was heated to 100° C. for 1 h. The reaction mixture was partitioned between EtOAc (50 mL) and $H_2O$ (30 mL). The organic layer was separated, dried over anhydrous $Na_2SO_4$ and concentrated under reduced pressure. The crude product was purified by flash column chromatography using silica mesh (230-400) and eluted with 5-10% EtOAc in pet ether gradient to afford 6-bromo-4-methylbenzo[d]oxazole (400 mg, 43%) as a brown solid.

LCMS (Method C): m/z 212 (M+H)$^+$(ES$^+$), at 2.30 min, UV active.

$^1$H NMR: (400 MHz, DMSO-d6) δ: 8.74 (s, 1H), 7.92 (d, J=1.2 Hz, 1H), 7.46-7.45 (m, 1H), 2.54 (s, 3H).

Step 3; A stirred solution of 6-bromo-4-methylbenzo[d]oxazole (200 mg, 0.94 mmol), bis(pinacolato)diboron (262 mg, 1.03 mmol) and KOAc (276 mg, 2.82 mmol) in 1,4-Dioxane (25 mL) was degassed with $N_2$ gas for 5 min and then $PdCl_2$(dppf).DCM (76 mg, 0.094 mmol) was added and the resultant reaction mixture was heated to 100° C. for 2 h. The reaction mixture was concentrated under reduced pressure to afford crude 4-methyl-6-(4,4,5,5-tetramethyl-1,3,2-dioxaborolan-2-yl)benzo[d]oxazole (250 mg) which was used in the next step without purification.

Synthetic Route 5

Intermediate 18, 7-methyl-5-(4,4,5,5-tetramethyl-1,3,2-dioxaborolan-2-yl)-1-(2-(trimethylsilyl)ethoxy)methyl)-1H-indazole

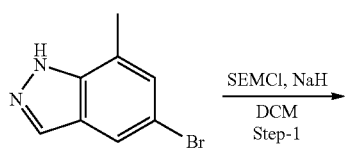

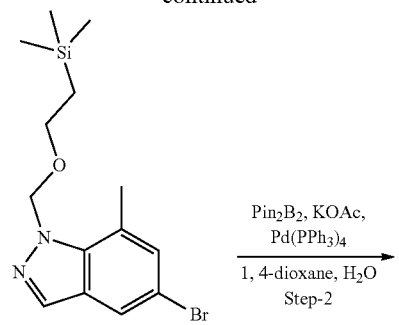

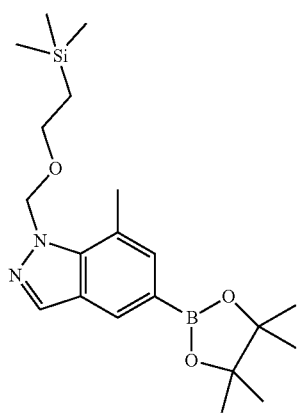

Intermediate 18

Step 1; To a solution of 5-bromo-7-methyl-1H-indazole (500 mg, 2.36 mmol) in THF (15 mL) at 0° C., were added NaH (60% dispersion in mineral oil) (113 mg, 4.73 mmol) and SEM-Cl (0.59 mg, 3.55 mmol) and the reaction mixture was stirred at room temperature for 2 h. The reaction mixture was partitioned between EtOAc (10 mL) and $H_2O$ (10 mL). The organic layer was separated, dried over anhydrous $Na_2SO_4$ and concentrated. The crude product was purified by Biotage-Isolera using 10 g silica gel snap and was eluted with 0-100% EtOAc in pet ether gradient to afford 5-bromo-7-methyl-1-((2-(trimethylsilyl)ethoxy)methyl)-1H-indazole (700 mg, 70%) as brown gum.

LCMS (Method C): m/z 341 (M+H)$^+$(ES$^+$), at 3.14 min, UV active.

$^1$H NMR: (400 MHz, DMSO-d6) δ: 8.08 (s, 1H), 7.86 (s, 1H), 7.37 (s, 1H), 5.81 (s, 2H), 3.47 (t, J=8.4 Hz, 2H), 2.71 (s, 3H), 0.85 (t, J=8.4 Hz, 2H), 0.77 (s, 9H).

Step 2; To a solution of 5-bromo-7-methyl-1-((2-(trimethylsilyl)ethoxy)methyl)-1H-indazole (600 mg, 1.75 mmol) in 1,4-dioxane (20 mL), were added KOAc (516 mg, 5.27 mmol), $Pin_2B_2$ (664 mg, 2.60 mmol) and Pd(PPh$_3$)$_4$ (196 mg, 0.17 mmol) and the resultant reaction mixture was heated to 100° C. for 16 h. The reaction mixture was partitioned between EtOAc (30 mL) and $H_2O$ (30 mL). The organic layer was separated, dried over anhydrous $Na_2SO_4$ and concentrated to afford the crude product (600 mg), which was used in the next step without purification.

Synthetic Route 6

Intermediate 27, 7-methyl-5-(4,4,5,5-tetramethyl-1,3,2-dioxaborolan-2-yl)-1H-indole

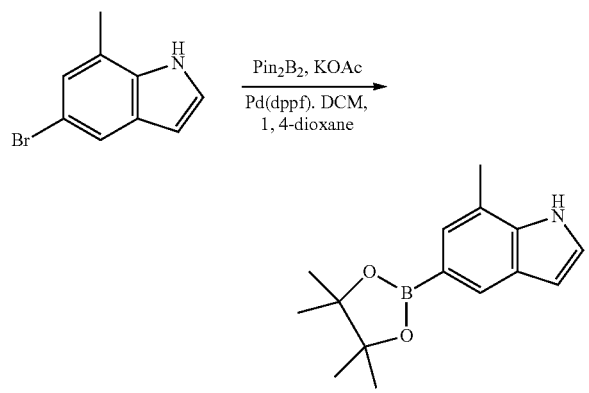

To a solution of 5-bromo-7-methyl-1H-indole (600 mg, 2.85 mmol) in 1,4-dioxane (15 mL), was added KOAc (839 mg, 8.86 mmol), $Pin_2B_2$ (1.1 g, 4.28 mmol) and Pd(dppf).DCM (239 g, 0.28 mmol) The resultant reaction mixture was heated to 90° C. for 16 h. The reaction mixture was partitioned between EtOAc (20 mL) and $H_2O$ (30 mL). The organic layer was separated, dried over anhydrous $Na_2SO_4$ and concentrated to afford crude 7-methyl-5-(4,4,5,5-tetramethyl-1,3,2-dioxaborolan-2-yl)-1H-indole (600 mg) which was used in the next step without purification.

Synthetic Routes for Examples

Synthetic Route a: Typical Procedure for the Preparation of Alkylated Triazolopyrimidinones Via an $S_NAr$ Displacement Example 1-1, 5-amino-8-[(cis)-2,6-dimethylmorpholin-4-yl]-7-phenyl-2-(3,3,3-trifluoropropyl)-[1,2,4]triazolo[4,3-c]pyrimidin-3-one

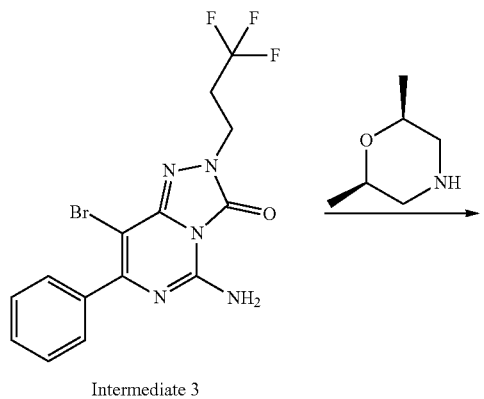

Intermediate 3

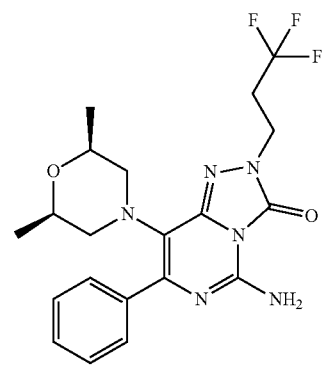

Example 1-1

A mixture of 5-amino-8-bromo-7-phenyl-2-(3,3,3-trifluoropropyl)-[1,2,4]triazolo[4,3-c]pyrimidin-3(2H)-one (200 mg, 0.49 mmol) and cis-2,6-dimethylmorpholine (2 mL) were heated in a sealed vial in a pre-heated 120° C. oil bath for 15 h. The reaction was cooled and partitioned between EtOAc (10 mL) and $H_2O$ (10 mL). The organic layer was separated, dried over anhydrous $Na_2SO_4$ and concentrated under reduced pressure. The crude product was purified by prep HPLC method (Method-A). Fractions were concentrated under reduced pressure, the residue obtained was partitioned between 10% MeOH in DCM (10 mL) and 10% $NaHCO_3$ solution (10 mL). The organic layer was separated, dried over anhydrous $Na_2SO_4$ and concentrated under reduced pressure to afford 5-amino-8-[(cis)-2,6-dimethylmorpholin-4-yl]-7-phenyl-2-(3,3,3-trifluoropropyl)-[1,2,4]triazolo[4,3-c]pyrimidin-3-one (22 mg, 10%) as a white solid. The data for the title compound are in Table 3.

Synthetic Route b

Example 1-2, 5-amino-8-[(cis)-2,6-dimethylmorpholin-4-yl]-2-(3-fluoropropyl)-7-phenyl-[1,2,4]triazolo[4,3-c]pyrimidin-3-one

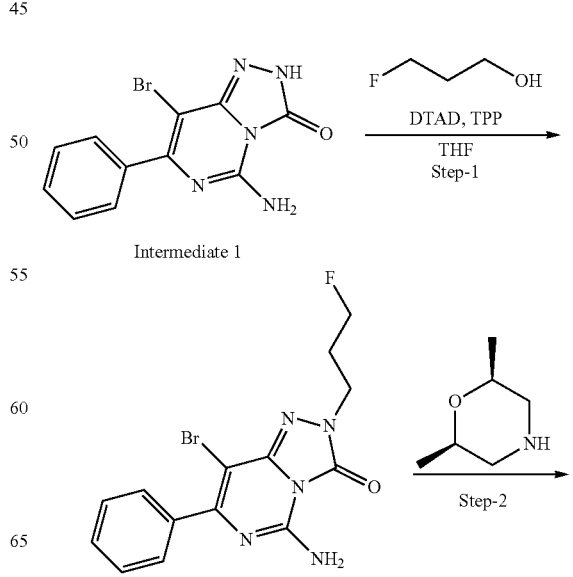

-continued

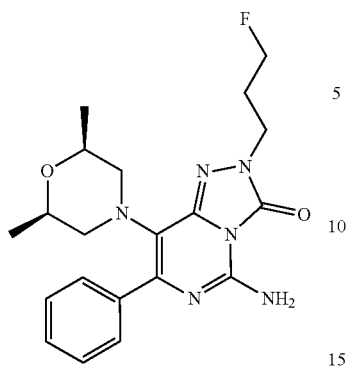

Example 1-2

Step 1; To a suspension of 5-amino-8-bromo-7-phenyl-[1,2,4]triazolo[4,3-c]pyrimidin-3(2H)-one (300 mg, 0.98 mmol), 3-fluoropropan-1-ol (92 mg, 1.18 mmol) and triphenyl phosphine (385 mg, 1.47 mmol) in THF (10 mL) at room temperature was added di-tertiary butyl azo-dicarboxylate (332 mg, 1.47 mmol) and the reaction mixture was stirred at room temperature for 60 min. The reaction mixture was concentrated under reduced pressure and the residue obtained was purified by Biotage-Isolera using 25 g silica snap and was eluted with gradient 0-100% EtOAc in pet-ether to afford 5-amino-8-bromo-2-(3-fluoropropyl)-7-phenyl-[1,2,4]triazolo[4,3-c]pyrimidin-3(2H)-one (160 mg, 44%) as an off-white solid.

LCMS (Method B): m/z 366 (M+H)$^+$(ES$^+$), at 2.55 min, UV active.

$^1$H NMR: (400 MHz, DMSO-d6) δ: 7.63-7.45 (m, 5H), 4.65-4.43 (m, 2H), 3.94 (t, J=6.8 Hz, 2H), 2.13-2.06 (m, 2H). Exchangeable —NH$_2$ protons were not observed.

Step 2; Prepared in a similar fashion to route a to afford 5-amino-8-[(cis)-2,6-dimethylmorpholin-4-yl]-2-(3-fluoropropyl)-7-phenyl-[1,2,4]triazolo[4,3-c]pyrimidin-3-one (18 mg, 13%) as a white solid. The data for the title compound are in Table 3.

Synthetic Route c

Example 1-3,5-amino-2-(3,3-difluoropropyl)-8-[(cis)-2,6-dimethylmorpholin-4-yl]phenyl-[1,2,4]triazolo[4,3-c]pyrimidin-3-one

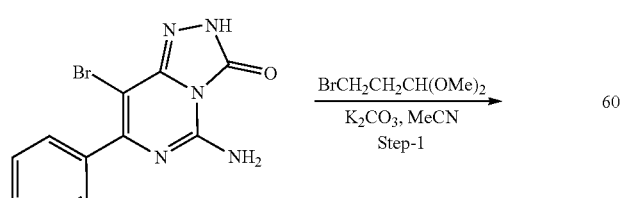

Intermediate 1

-continued

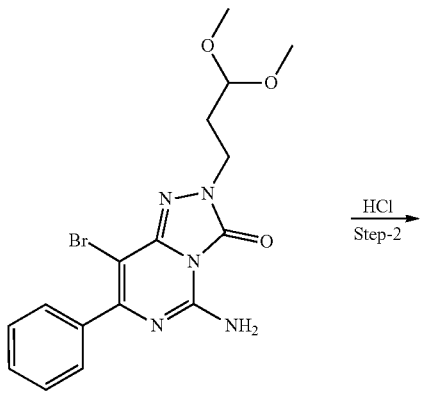

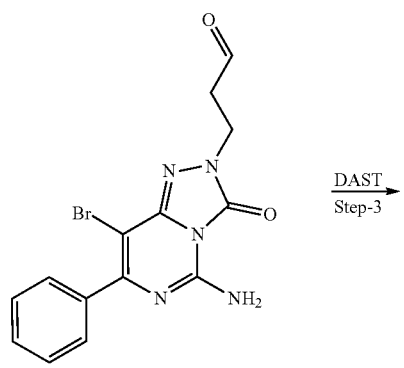

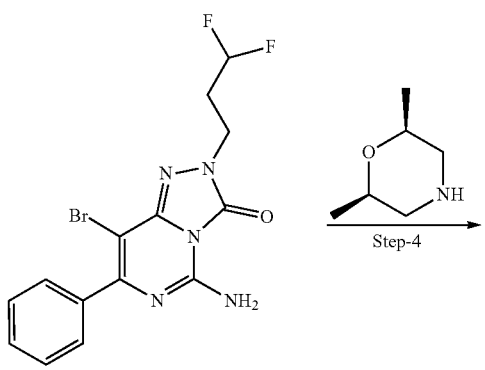

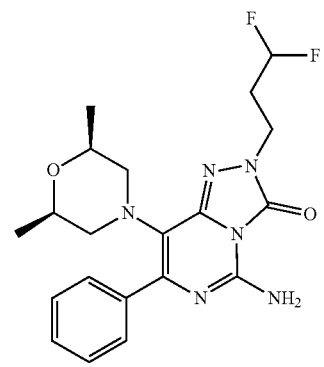

Example 1-3

Step 1; To a suspension of 5-amino-8-bromo-7-phenyl-[1,2,4]triazolo[4,3-c]pyrimidin-3(2H)-one (2 g, 6.55 mmol) and K$_2$CO$_3$ (2.7 g, 19.65 mmol) in MeCN (40 mL) at room temperature was added 3-bromo-1,1-dimethoxypropane (1.4 g, 7.86 mmol) and the reaction was stirred at 80° C. for 5 h. The mixture was partitioned between EtOAc (100 mL) and H$_2$O (100 mL). The organic layer was separated, dried over anhydrous Na$_2$SO$_4$ and concentrated under reduced pressure. The crude product was triturated with diethyl ether (10 mL), decanted and dried under vacuum to afford 5-amino-8-bromo-2-(3,3-dimethoxypropyl)-7-phenyl-[1,2,4]triazolo[4,3-c]pyrimidin-3(2H)-one (1.2 g, 45%) as an off-white solid.

LCMS (Method B): m/z 408 (M+H)$^+$(ES$^+$), at 2.68 min, UV active.

$^1$H NMR: (400 MHz, DMSO-d6) δ: 7.62-7.61 (m, 2H), 7.48-7.43 (m, 3H), 4.47 (t, J=5.6 Hz, 1H), 3.85 (t, J=7.2 Hz, 2H), 3.26 (s, 6H), 1.99-1.94 (m, 2H). Exchangeable —NH$_2$ protons were not observed.

Step 2; To a solution of 5-amino-8-bromo-2-(3,3-dimethoxypropyl)-7-phenyl-[1,2,4]triazolo[4,3-c]pyrimidin-3(2H)-one (1.2 g, 2.94 mmol) in 1,4-dioxane (10 mL) at room temperature was added 2N HCl (30 mL) and the reaction stirred for 2 h. The reaction was concentrated under reduced pressure and the residue was partitioned between EtOAc (30 mL) and saturated NaHCO$_3$ solution (20 mL). The organic layer was separated, dried over anhydrous Na$_2$SO$_4$ and concentrated under reduced pressure to afford 3-(5-amino-8-bromo-3-oxo-7-phenyl-[1,2,4]triazolo[4,3-c]pyrimidin-2(3H)-yl)propanal (assumed quantitative) as a brown gum which was taken on to the next step without further purification.

LCMS (Method B): m/z 362 (M+H)$^+$(ES$^+$), at 2.32 min, UV active.

Step 3; To a solution of 3-(5-amino-8-bromo-3-oxo-7-phenyl-[1,2,4]triazolo[4,3-c]pyrimidin-2(3H)-yl)propanal (0.6 g, 1.65 mmol) in DCM (15 mL) at −78° C. was added DAST (0.58 g, 3.63 mmol). The reaction was stirred at room temperature for 15 h, then was cautiously quenched by the drop wise addition of saturated sodium bicarbonate solution (40 mL) and extracted with DCM (2×30 mL). The combined organic layers were dried over anhydrous Na$_2$SO$_4$ and concentrated under reduced pressure. The crude product was purified by Biotage-Isolera using 25 g silica snap and was eluted with gradient 0-40% EtOAc in hexane to afford 5-amino-8-bromo-2-(3,3-difluoropropyl)-7-phenyl-[1,2,4]triazolo[4,3-c]pyrimidin-3(2H)-one (0.2 g, 31%) as an off-white solid.

LCMS (Method B): m/z 384 (M+H)$^+$(ES$^+$), at 2.80 min, UV active.

$^1$H NMR: (400 MHz, DMSO-d6) δ: 7.63-7.61 (m, 2H), 7.48-7.45 (m, 3H), 6.35-6.05 (m, 1H), 3.99 (t, J=6.8 Hz, 2H), 2.39-2.22 (m, 2H). Exchangeable —NH$_2$ protons were not observed.

Step 4; Prepared in a similar fashion to route a to afford 5-amino-2-(3,3-difluoropropyl)-8-[(cis)-2,6-dimethylmorpholin-4-yl]-7-phenyl-[1,2,4]triazolo[4,3-c]pyrimidin-3-one (11 mg, 11%) as a yellow solid. The data for the title compound are in Table 3.

Synthetic Route d: Typical Procedure for the Preparation of Alkylated Triazolopyrimidinones Via an Alkylation Reaction, Followed by an S$_N$Ar Displacement Example 1-4, 5-amino-8-[(cis)-2,6-dimethylmorpholin-4-yl]-7-phenyl-2-propyl-[1,2,4]triazolo[4,3-c]pyrimidin-3-one

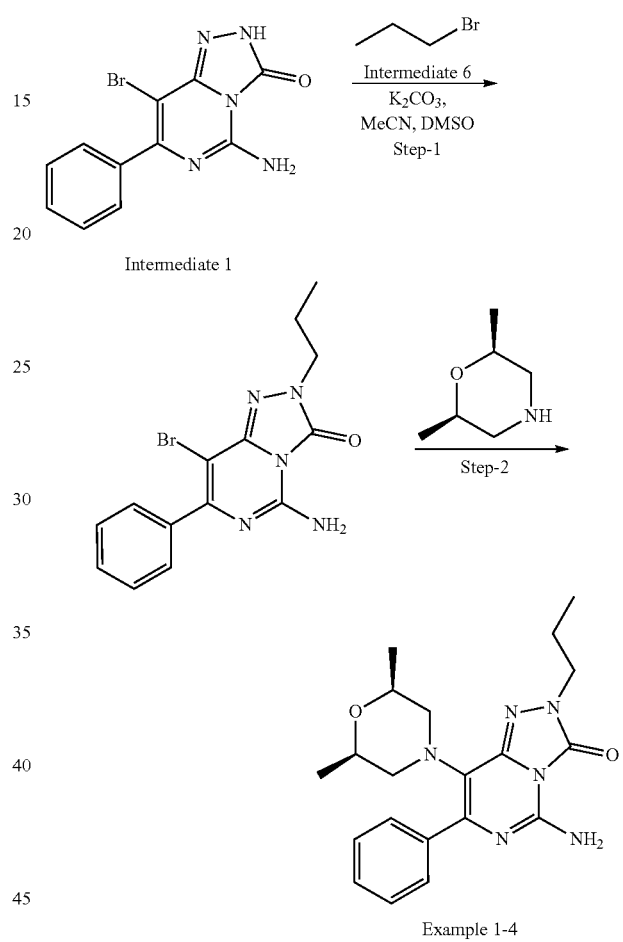

Example 1-4

Step 1; To a stirred solution of 5-amino-8-bromo-7-phenyl-[1,2,4]triazolo[4,3-c]pyrimidin-3(2H)-one (200 mg, 0.6 mmol) and 1-bromopropane (95 mg, 0.78 mmol) in MeCN (5 mL) and DMSO (5 mL) was added K$_2$CO$_3$ (123 mg, 1.9 mmol). The reaction mixture was heated to 75° C. for 12 h in a sealed tube. The reaction mixture was partitioned between EtOAc (20 mL) and H$_2$O (20 mL), the organic layer was separated and concentrated under reduced pressure. The crude product was purified by Biotage-Isolera using 10 g silica snap and was eluted with gradient 0-100% EtOAc in pet ether to afford 5-amino-8-bromo-7-phenyl-2-propyl-[1,2,4]triazolo[4,3-c]pyrimidin-3(2H)-one (125 mg, 54%) as white solid.

LCMS (Method B): m/z 348 (M+H)$^+$(ES$^+$), at 2.83 min, UV active.

$^1$H NMR: (400 MHz, DMSO-d6) δ: 7.62-7.60 (m, 2H), 7.47-7.43 (m, 3H), 3.78 (t, J=6.8 Hz, 2H), 1.77-1.71 (m, 2H), 0.90 (t, J=7.2 Hz, 3H). Exchangeable —NH$_2$ protons were not observed.

Step 2; Prepared in a similar fashion to route a to afford 5-amino-8-[(cis)-2,6-dimethylmorpholin-4-yl]-7-phenyl-2-propyl-[1,2,4]triazolo[4,3-c]pyrimidin-3-one (29 mg, 22%) as a white solid. The data for the title compound are in Table 3.

Synthetic Route e: Typical Procedure for the Preparation of Alkylated Triazolopyrimidinones via an Alcohol Mesylation and Displacement Reaction, Followed by an S$_N$Ar Displacement Example 1-7, 5-amino-8-[(cis)-2,6-dimethylmorpholin-4-yl]-2-[[(2S)-1-methylpyrrolidin-2-yl]methyl]-7-phenyl-[1,2,4]triazolo[4,3-c]pyrimidin-3-one

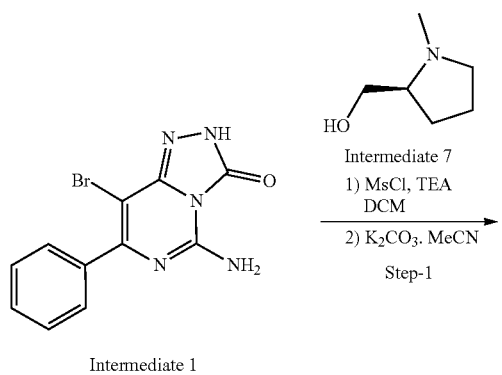

Intermediate 1

3-c]pyrimidin-3(2H)-one (300 mg, 0.98 mmol) and K$_2$CO$_3$ (405 mg, 2.94 mmol) were added. The resultant reaction mixture was heated to 70° C. for 6 h in sealed tube. The reaction mixture was partitioned between EtOAc (20 mL) and H$_2$O (20 mL). The organic layer was separated, dried over anhydrous Na$_2$SO$_4$ and concentrated under reduced pressure. The crude was purified by Biotage-Isolera using 25 g silica snap and eluted with gradient 0-100% EtOAc in pet-ether to afford (S)-5-amino-8-bromo-2-((1-methylpyrrolidin-2-yl)methyl)-7-phenyl-[1,2,4]triazolo[4,3-c]pyrimidin-3(2H)-one as an off-white solid.

LCMS (Method B): m/z 403 (M+H)$^+$(ES$^+$), at 1.94 min, UV active.

$^1$H NMR: (400 MHz, DMSO-d6) δ: 8.16 (s, 2H), 7.64-7.61 (m, 2H), 7.46-7.44 (m, 3H), 3.93-3.88 (m, 1H), 3.76-3.69 (m, 1H), 2.98-2.94 (m, 1H), 2.27 (s, 3H), 2.20-2.19 (m, 1H), 2.13-2.03 (m, 1H), 1.87-1.85 (m, 2H), 1.74-1.67 (m, 2H).

Step 2; Prepared in a similar fashion to route a, to afford 5-amino-8-[(cis)-2,6-dimethylmorpholin-4-yl]-2-[[(2S)-1-methylpyrrolidin-2-yl]methyl]-7-phenyl-[1,2,4]triazolo[4,3-c]pyrimidin-3-one (40 mg, 18%) as an off-white solid. The data for the title compound are in Table 3.

Synthetic Route f

Example 1-8, 5-amino-8-[(cis)-2,6-dimethylmorpholin-4-yl]-7-phenyl-2-[[(2R)-tetrahydrofuran-2-yl]methyl]-[1,2,4]triazolo[4,3-c]pyrimidin-3-one

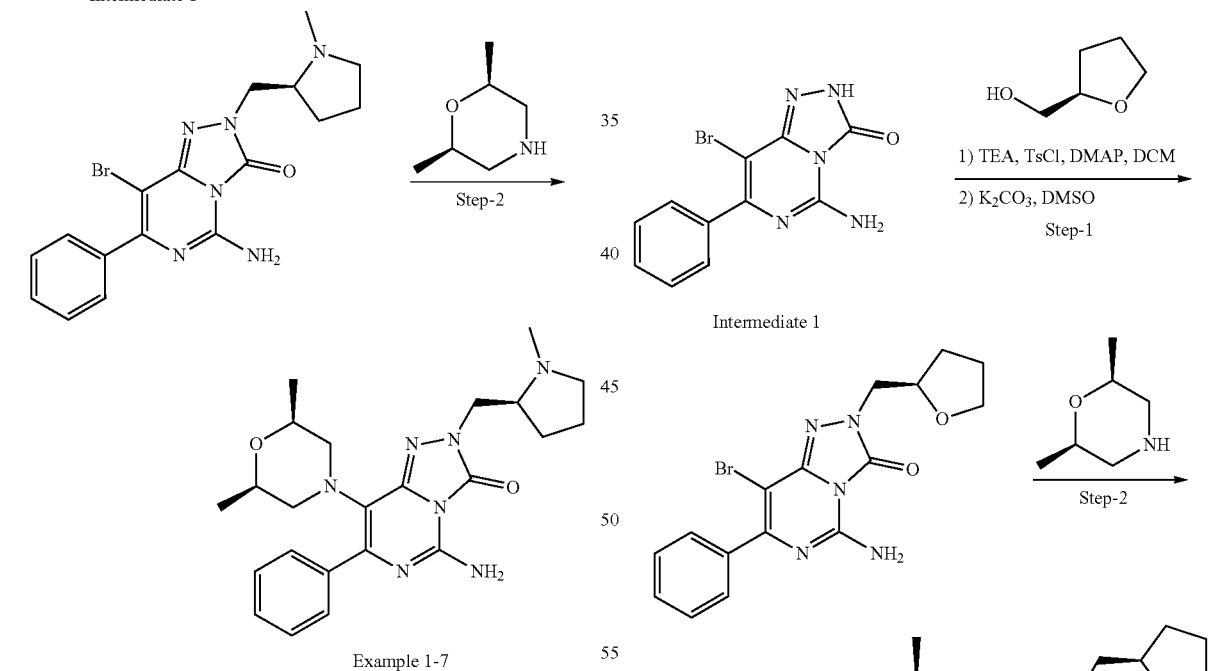

Example 1-7

Step 1; To a solution of (S)-(1-methylpyrrolidin-2-yl)methanol (123 mg, 1.07 mmol) and TEA (300 mg, 1.17 mmol) in DCM (10 mL) at 0° C. was added mesyl chloride (134 mg, 1.17 mmol) and the reaction mixture was stirred at room temperature for 1 h. The reaction mixture was partitioned between DCM (20 mL) and H$_2$O (20 mL). The organic layer was separated, dried over anhydrous Na$_2$SO$_4$ and concentrated under reduced pressure to obtain mesylated Intermediate. This intermediate was taken in MeCN (10 mL) and 5-amino-8-bromo-7-phenyl-[1,2,4]triazolo[4, Example 1-8

Step 1; To a solution of DMAP (19.9 mg, 0.16 mmol), TEA (247.5 mg, 2.45 mmol) and tosyl chloride (342.0 mg, 1.79 mmol) in DCM (20 mL) at 0° C. was added (R)-(tetrahydrofuran-2-yl)methanol (199.9 mg, 1.96 mmol) and the reaction mixture was stirred at room temperature for 1 h. The reaction mixture was partitioned between DCM (20 mL) and H$_2$O (20 mL). The organic layer was separated and concentrated under reduced pressure to obtain tosylated intermediate. The tosylated intermediate was taken in DMSO (30 mL) and 5-amino-8-bromo-7-phenyl-[1,2,4]triazolo[4,3-c]pyrimidin-3(2H)-one (500 mg, 1.63 mmol) and K$_2$CO$_3$ (676 mg, 4.09 mmol) were added, then heated to 80° C. for 4 h. The reaction mixture was partitioned between EtOAc (20 mL) and H$_2$O (20 mL). The organic layer was separated and concentrated under reduced pressure to afford (R)-5-amino-8-bromo-7-phenyl-2-((tetrahydrofuran-2-yl)methyl)-[1,2,4]triazolo[4,3-c]pyrimidin-3(2H)-one (400 mg, 62%) as off white solid. The crude product was taken onto the next step without further purification.

LCMS (Method A): m/z 390 (M+H)$^+$(ES$^+$), at 2.38 min, UV active.

$^1$H NMR: (400 MHz, DMSO-d6) δ: 7.80-7.77 (m, 1H), 7.64-7.60 (m, 2H), 7.50-7.44 (m, 2H), 4.23-4.02 (m, 1H), 4.00-3.96 (m, 2H), 3.86-3.79 (m, 2H), 3.74-3.66 (m, 2H), 1.99-1.91 (m, 2H). Exchangeable —NH$_2$ protons were not observed.

Step 2; Prepared in a similar fashion to route a, to afford 5-amino-8-[(cis)-2,6-dimethylmorpholin-4-yl]-7-phenyl-2-[[(2R)-tetrahydrofuran-2-yl]methyl]-[1,2,4]triazolo[4,3-c]pyrimidin-3-one (35 mg, 16%) as a yellow solid. The data for the title compound are in Table 3.

Synthetic Route g: Typical Procedure for the Preparation of Alkylated Triazolopyrimidinones Via an Alcohol Mesylation and Displacement Reaction, Followed by an S$_N$Ar Displacement and Benzyl Deprotection Example 1-10, 5-amino-8-[(cis)-2,6-dimethylmorpholin-4-yl]-2-[[(3S)-morpholin-3-yl]methyl]-7-phenyl-[1,2,4]triazolo[4,3-c]pyrimidin-3-one

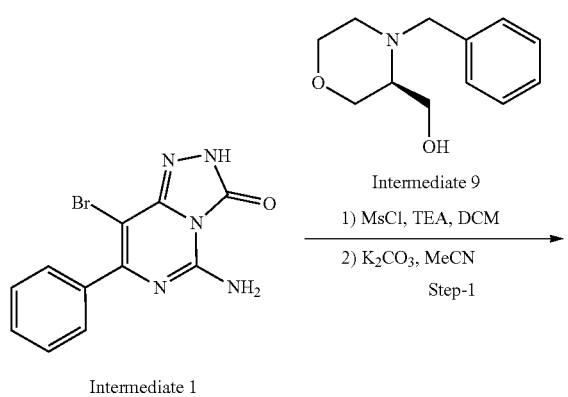

Intermediate 1

Intermediate 9

1) MsCl, TEA, DCM
2) K$_2$CO$_3$, MeCN
Step-1

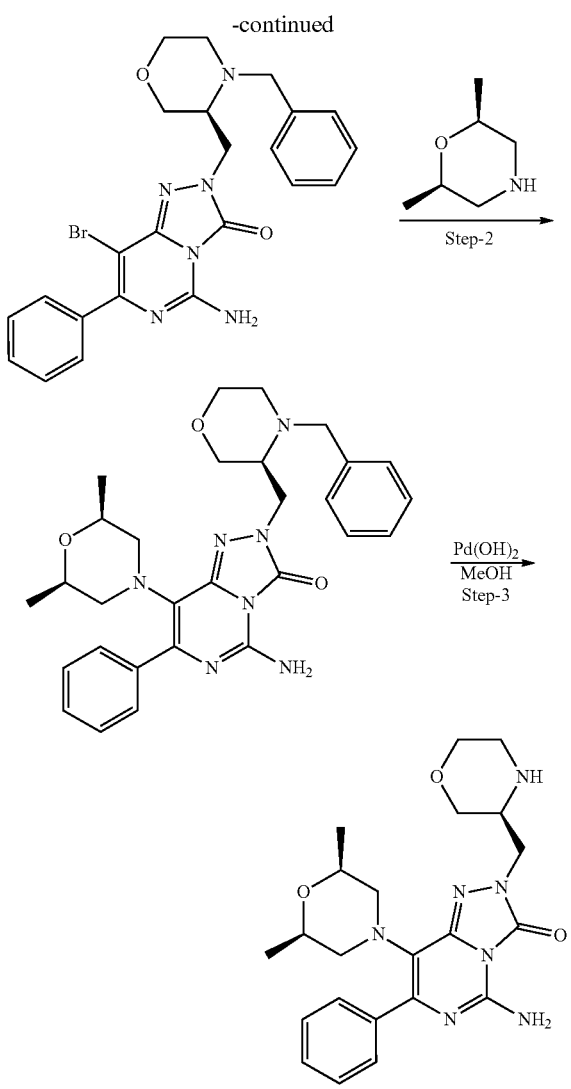

Example 1-10

Step 1; Performed in a similar fashion to route e, step 1, using intermediate 9, to afford (S)-5-amino-2-((4-benzylmorpholin-3-yl)methyl)-8-bromo-7-phenyl-[1,2,4]triazolo[4,3-c]pyrimidin-3(2H)-one (0.4 g, 55%) as a pale yellow solid.

LCMS (Method A): m/z 495 (M+H)$^+$(ES$^+$), at 3.55 min, UV active.

$^1$H NMR: (400 MHz, DMSO-d6) δ: 7.64-7.60 (m, 2H), 7.49-7.44 (m, 3H), 7.35-7.23 (m, 5H), 4.09-4.02 (m, 3H), 3.75-3.71 (m, 2H), 3.59-3.45 (m, 4H), 2.75-2.68 (m, 1H), 2.25-2.22 (m, 1H). Exchangeable —NH$_2$ protons were not observed.

Step 2; A mixture of (S)-5-amino-2-((4-benzylmorpholin-3-yl)methyl)-8-bromo-7-phenyl-[1,2,4]triazolo[4,3-c]pyrimidin-3(2H)-one (400 mg, 0.8 mmol) and cis-2,6-dimethylmorpholine (2 mL) were taken in a sealed vial and heated in a pre-heated oil bath at 120° C. for 15 h. The reaction mass was partitioned between EtOAc (30 mL) and H$_2$O (30 mL). The organic layer was separated, dried over anhydrous Na$_2$SO$_4$ and concentrated under reduced pressure. The crude product was purified by Biotage-Isolera using 25 g silica snap and was eluted with gradient 0-40% EtOAc in Hexane to afford 5-amino-2-(((S)-4-benzylmorpholin-3-yl)methyl)-

8-((cis)-2,6-dimethylmorpholino)-7-phenyl-[1,2,4]triazolo[4,3-c]pyrimidin-3(2H)-one (380 mg, 88%) as a yellow gum.

LCMS (Method A): m/z 530 (M+H)$^+$(ES$^+$), at 3.32 min, UV active.

Step 3; To a mixture of 5-amino-2-(((S)-4-benzylmorpholin-3-yl)methyl)-8-((cis)-2,6-dimethylmorpholino)-7-phenyl-[1,2,4]triazolo[4,3-c]pyrimidin-3(2H)-one (380 mg, 0.7 mmol) in MeOH (20 mL) was added Pd(OH)$_2$ (50 mg) and the reaction mixture was stirred for 15 h under an atmosphere of H$_2$ (balloon pressure). The reaction mixture was filtered through celite and rinsed with MeOH (20 mL). The filtrate was concentrated under reduced pressure and purified by prep HPLC (Method A). Fractions were concentrated under reduced pressure and the residue obtained was partitioned between EtOAc (15 mL) and saturated NaHCO$_3$ solution (10 mL). The organic layer was separated, dried over anhydrous Na$_2$SO$_4$ and concentrated under reduced pressure to afford 5-amino-8-(cis-2,6-dimethylmorpholino)-2-(((S)-morpholin-3-yl)methyl)-7-phenyl-[1,2,4]triazolo[4,3-c]pyrimidin-3(2H)-one (65 mg, 22%). The data for the title compound are in Table 3.

Synthetic Route h

Example 1-12, 5-amino-8-[(cis)-2,6-dimethylmorpholin-4-yl]-2-[[(3S)-4-methylmorpholin-3-yl]methyl]-7-phenyl-[1,2,4]triazolo[4,3-c]pyrimidin-3-one aqueous HCHO (0.012 ml, 0.13 mmol) in MeCN (2 mL) at room temperature was added sodium triacetoxyborohydride (35 mg, 0.17 mmol) and stirred for 10 min. The reaction mixture was partitioned between EtOAc (10 mL) and brine solution (10 mL). The organic layer was separated, dried over anhydrous Na$_2$SO$_4$ and concentrated. The crude product was purified by Prep-HPLC (Method-C). Fractions collected were concentrated under reduced pressure, the residue obtained was partitioned between EtOAc (2 mL) and saturated NaHCO$_3$ solution (2 mL). The organic layer was separated, dried over anhydrous Na$_2$SO$_4$ and concentrated to afford 5-amino-8-(cis-2,6-dimethylmorpholino)-2-(((S)-4-methylmorpholin-3-yl)methyl)-7-phenyl-[1,2,4]triazolo[4,3-c]pyrimidin-3(2H)-one (13 mg, 25%) as a yellow solid. The data for the title compound are in Table 3.

Route i

Example 2-1, 5-amino-8-[(cis)-2,6-dimethyl-3,6-dihydro-2H-pyran-4-yl]-7-phenyl-2-(3,3,3-trifluoropropyl)-[1,2,4]triazolo[4,3-c]pyrimidin-3-one Example 2-2, 5-amino-8-[(cis)-2,6-dimethyltetrahydropyran-4-yl]-7-phenyl-2-(3,3,3-trifluoropropyl)-[1,2,4]triazolo[4,3-c]pyrimidin-3-one

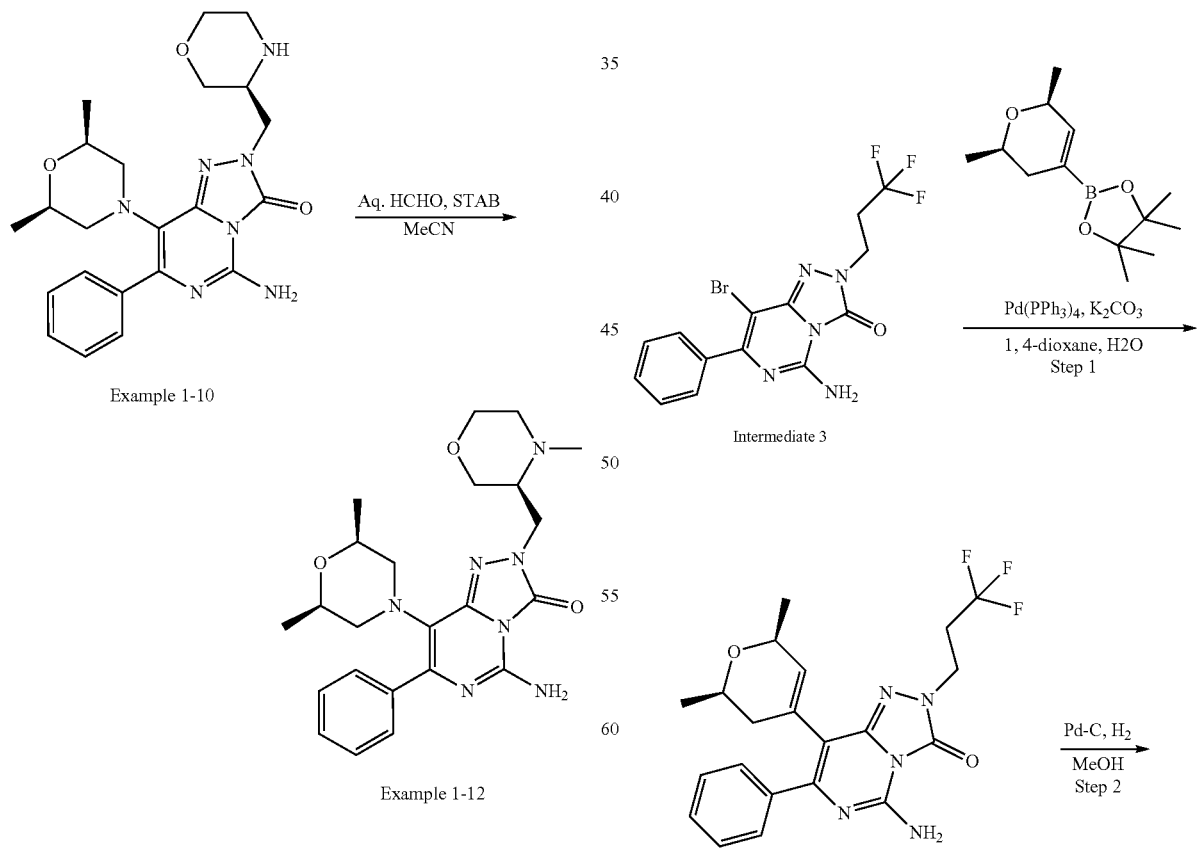

To a solution of 5-amino-8-[(cis)-2,6-dimethylmorpholin-4-yl]-2-[[(3S)-morpholin-3-yl]methyl]-7-phenyl-[1,2,4]triazolo[4,3-c]pyrimidin-3-one (50 mg, 0.11 mmol) and 33%

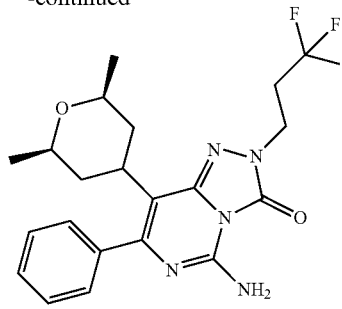

Example 2-2

Step 1; A mixture of 5-amino-8-bromo-7-phenyl-2-(3,3,3-trifluoropropyl)-[1,2,4]triazolo[4,3-c]pyrimidin-3(2H)-one (150 mg, 0.37 mmol), 2-((cis)-2,6-dimethyl-3,6-dihydro-2H-pyran-4-yl)-4,4,5,5-tetramethyl-1,3,2-dioxaborolane (97 mg, 0.41 mmol) and K₂CO₃ (153 mg, 1.11 mmol) in 1,4-dioxane (10 mL) and H₂O (5 mL) was degassed for few minutes and then Pd(PPh₃)₄ (42 mg, 0.04 mmol) was added. The vessel was sealed and heated to 100° C. for 15 h. The reaction mixture was partitioned between H₂O (20 mL) and EtOAc (20 mL). The organic layer was separated, dried over anhydrous Na₂SO₄ and concentrated. The crude product was purified by prep-HPLC (method-A) to afford 5-amino-8-((cis)-2,6-dimethyl-3,6-dihydro-2H-pyran-4-yl)-7-phenyl-2-(3,3,3-trifluoropropyl)-[1,2,4]triazolo[4,3-c]pyrimidin-3(2H)-one (120 mg, 74%) as an off-white solid. The data for the title compound are in Table 3.

Step 2; A solution of 5-amino-8-((cis)-2,6-dimethyl-3,6-dihydro-2H-pyran-4-yl)-7-phenyl-2-(3,3,3-trifluoropropyl)-[1,2,4]triazolo[4,3-c]pyrimidin-3(2H)-one (0.1 g, 0.23 mmol) in MeOH (10 mL) was degassed for few minutes with nitrogen, 10% Pd/C (20 mg) was added and the vessel was heated to 60° C. for 15 h under 5 kg/cm² of H₂ pressure. The mixture was cooled and concentrated. The crude product was purified by Prep-HPLC (method-A) to afford 5-amino-8-((cis)-2,6-dimethyltetrahydro-2H-pyran-4-yl)-7-phenyl-2-(3,3,3-trifluoropropyl)-[1,2,4]triazolo[4,3-c]pyrimidin-3(2H)-one (8.5 mg, 8%) as an off-white solid. The data for the title compound are in Table 3.

Route j

Example 3-1,5-amino-2-[(5-fluoro-2-pyridyl)methyl]-8-(4-hydroxy-3,5-dimethyl-phenyl) phenyl]-[1,2,4]triazolo[4,3-c]pyrimidin-3-one

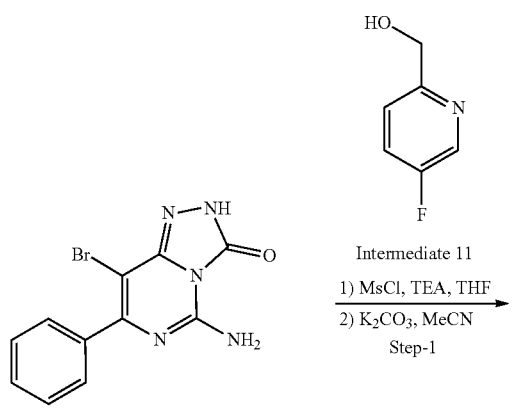

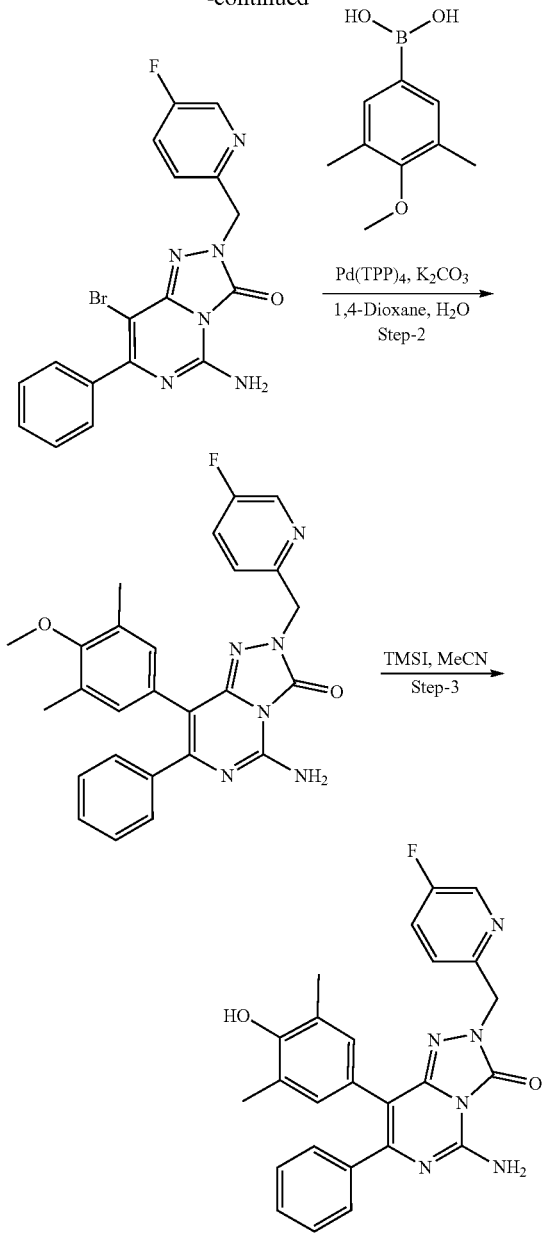

Example 3-1

Step 1; Performed in a similar fashion to route e, step 1, using Intermediates 1 and 11 in THF to afford 5-amino-8-bromo-2-((5-fluoropyridin-2-yl)methyl)-7-phenyl-[1,2,4]triazolo[4,3-c]pyrimidin-3(2H)-one (300 mg, 44%) as a yellow solid.

¹H NMR: (400 MHz, DMSO-d6) δ: 8.56 (s, 1H), 7.80 (m, 1H), 7.75 (d, J=7.6 Hz, 2H), 7.63-7.61 (m, 4H), 5.17 (s, 2H). Exchangeable —NH₂ Protons were not observed.

Step 2; To a solution of 5-amino-8-bromo-2-((5-fluoropyridin-2-yl)methyl)-7-phenyl-[1,2,4]triazolo[4,3-c]pyrimidin-3(2H)-one (300 mg, 0.7 mmol) in 1,4-dioxane (20 mL) and H₂O (5 mL) was added K₂CO₃ (299 mg, 2.17 mmol), (4-methoxy-3,5-dimethylphenyl)boronic acid (156 mg, 0.86 mmol) and Pd(PPh₃)₄ (83 mg, 0.07 mmol). The reaction was heated to 120° C. for 4 h in a sealed tube. The reaction mixture was partitioned between EtOAc (20 mL) and H₂O (15 mL), the organic layer was separated, dried over Na₂SO₄ and concentrated under reduced pressure. The crude product was purified by Biotage-Isolera using 25 g silica snap and was eluted with 0-100% EtOAc in hexane gradient to afford 5-amino-2-((5-fluoropyridin yl)methyl)-8-(4-methoxy-3,5-dimethylphenyl)-7-phenyl-[1,2,4]triazolo[4,3-c]pyrimidin-3(2H)-one (230 mg, 34%) as an off white solid.

LCMS (Method A): m/z 471 (M+H)⁺(ES⁺), at 2.66 min, UV active.

¹H NMR: (400 MHz, DMSO-d6) δ: 8.56 (s, 1H), 7.75 (d, J=7.6 Hz, 2H), 7.42-7.61 (m, 5H), 7.56 (s, 2H), 6.80-6.77 (m, 2H), 5.12 (s, 2H), 3.60 (s, 3H), 1.98 (d, J=2.0 Hz, 6H).

Step 3; To a mixture of 5-amino-2-((5-fluoropyridin-2-yl)methyl)-8-(4-methoxy-3,5-dimethylphenyl)-7-phenyl-[1,2,4]triazolo[4,3-c]pyrimidin-3(2H)-one (200 mg, 0.42 mmol) in MeCN (15 mL) was added TMSI (2 mL) at room temperature and the reaction mixture was heated to 60° C. for 16 h. The reaction mixture was quenched by addition of sodium carbonate solution (10 mL) and extracted with EtOAc (10 mL). The organic layer was separated, dried over Na₂SO₄ and concentrated. The crude compound was purified by Prep-HPLC (Method A). Fractions collected were concentrated and the residue obtained was partitioned between sodium bicarbonate (10 mL) and EtOAc (10 mL). The organic layer was separated dried over Na₂SO₄ and concentrated to dryness to afford 5-amino-2-[(5-fluoro-2-pyridyl)methyl]-8-(4-hydroxy-3,5-dimethyl-phenyl)-7-phenyl-[1,2,4]triazolo[4,3-c]pyrimidin-3-one (50 mg, 26%) as yellow solid. The data for the title compound are in Table 3.

Route k

Example 4-1, 5-amino-7-(4-fluorophenyl)-8-(4-methyl-1,3-benzoxazol-6-yl)-2-(3,3,3-trifluoropropyl)-[1,2,4]triazolo[4,3-c]pyrimidin-3-one

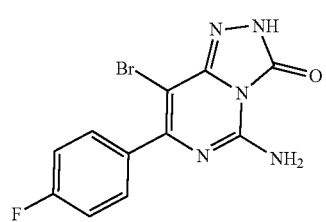

Intermediate 4

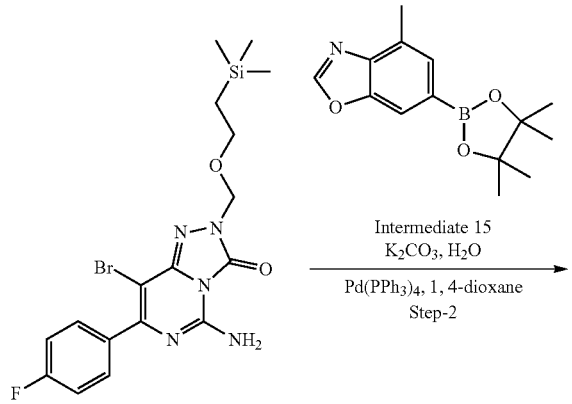

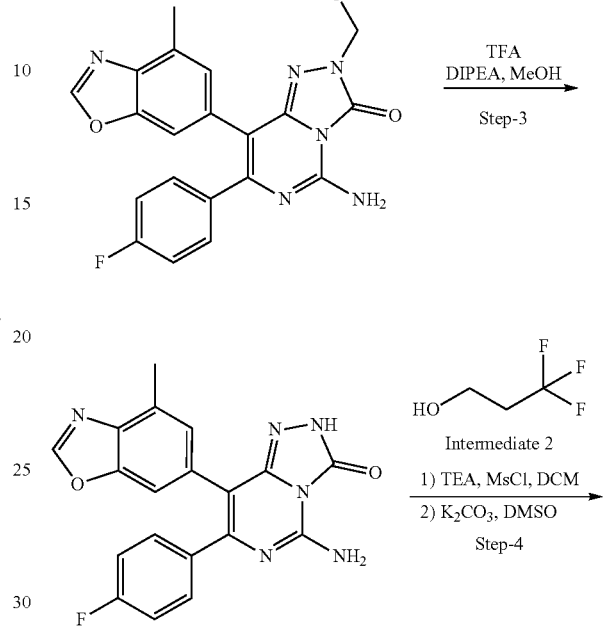

Intermediate 21

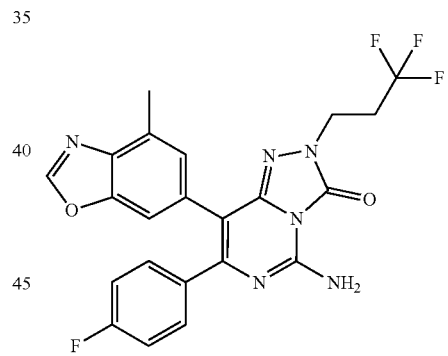

Example 4-1

Step 1; To a stirred solution of 5-amino-8-bromo-7-(4-fluorophenyl)-[1,2,4]triazolo[4,3-c]pyrimidin-3(2H)-one (5 g, 15.4 mmol) in DCM (250 mL) was added TEA (4.6 g, 46.20 mmol) and SEM-Cl (2.3 g, 13.8 mmol) at 0° C. and the resultant reaction mixture was stirred at room temperature for 1 h. The reaction mixture was quenched with H₂O (50 mL) and extracted with DCM (2×100 mL). The combined organics were dried over anhydrous Na₂SO₄ and concentrated under reduced pressure. The crude product was purified by flash column chromatography using silica mesh (230-400) and eluted with 5-10% EtOAc in pet ether to afford 5-amino-8-bromo-7-(4-fluorophenyl)-2-((2-(trimethylsilyl)ethoxy)methyl)-[1,2,4]triazolo[4,3-c]pyrimidin-3(2H)-one (4.0 g, 57%) as an off white solid.

LCMS (Method C): m/z 454 (M+H)⁺(ES⁺), at 1.90 min, UV active.

¹H NMR: (400 MHz, DMSO-d6) δ: 7.71-7.67 (m, 2H), 7.31-7.28 (m, 2H), 5.18 (s, 2H), 3.65-3.60 (m, 2H), 1.17 (s, 2H), 0.02 (s, 9H). Exchangeable —NH$_2$ protons were not observed.

Step 2; A solution of 5-amino-8-bromo-7-(4-fluorophenyl)-2-(2-(trimethylsilyl)ethoxy)methyl)-[1,2,4]triazolo[4,3-c]pyrimidin-3(2H)-one (4 g, 8.8 mmol), 4-methyl-6-(4,4,5,5-tetramethyl-1,3,2-dioxaborolan-2-yl)benzo[d]oxazole (4 g crude, 10.5 mmol) and K$_2$CO$_3$ (3.64 g, 26.4 mmol) in 1,4-dioxane (100 mL) and H$_2$O (10 mL) was degassed with N$_2$ for 5 min. Pd(PPh$_3$)$_4$ (1 g, 0.88 mmol) was added and the resultant reaction mixture was heated to 120° C. for 5 h. The reaction mass was partitioned between EtOAc (100×2 mL) and H$_2$O (100 mL). The organic layer was separated, dried over anhydrous Na$_2$SO$_4$ and concentrated under reduced pressure. The crude product was purified by Biotage-Isolera using 50 g silica snap, eluted with 30-40% EtOAc in pet-ether to afford 5-amino-7-(4-fluorophenyl)-8-(4-methyl-benzo[d]oxazol-6-yl)-2-((2-(trimethylsilyl) ethoxy)methyl)-[1,2,4]triazolo[4,3-c]pyrimidin-3(2H)-one (1.5 g, 34%) as a yellow solid.

LCMS (Method C): m/z 507 (M+H)$^+$(ES$^+$), at 2.48 min, UV active.

¹H NMR: (400 MHz, DMSO-d6) δ: 8.75 (s, 1H), 7.59-7.56 (m, 3H), 7.08-7.04 (m, 3H), 5.06 (s, 2H), 3.62-3.58 (m, 2H), 2.42 (s, 3H), 0.88-0.85 (m, 2H), 0.01 (s, 9H). Exchangeable —NH$_2$ protons were not observed.

Step 3; To a solution of 5-amino-7-(4-fluorophenyl)-8-(4-methylbenzo[d]oxazol-6-yl)-2-((2-(trimethylsilyl)ethoxy) methyl)-[1,2,4]triazolo[4,3-c]pyrimidin-3(2H)-one (2.5 g, 4.9 mmol) in TFA (10 mL) was stirred for 30 min at room temperature. The reaction mixture was concentrated under reduced pressure. The crude product was taken in MeOH (10 mL) and DIPEA (1.7 mL, 14.7 mmol) was added drop wise at 0° C. and the resultant reaction mixture was heated to 70° C. for 3 h. The precipitate was filtered and dried to afford 5-amino-7-(4-fluorophenyl)-8-(4-methylbenzo[d]oxazol-6-yl)-[1,2,4]triazolo[4,3-c]pyrimidin-3(2H)-one (1 g, 56%) as a yellow solid. The data for the title compound are in Table 2.

Step 4; To a solution of 3,3,3-trifluoropropan-1-ol (220 mg, 1.92 mmol) and TEA (0.5 mg, 5.78 mmol) in DCM (10 mL) at 0° C. was added mesyl chloride (0.1 mg, 2.31 mmol) dropwise and the resultant reaction mixture was stirred at room temperature for 30 min. The reaction mixture was partitioned between DCM (50 mL) and H$_2$O (50 mL), the organic layer was separated and concentrated under reduced pressure to obtain mesylated intermediate. The mesylated intermediate was taken in DMSO (20 mL), 5-amino-7-(4-fluorophenyl)-8-(4-methylbenzo[d]oxazol-6-yl)-[1,2,4]triazolo[4,3-c]pyrimidin-3(2H)-one (600 mg, 1.59 mmol) and K$_2$CO$_3$ (660 mg, 4.78 mmol) were added and the reaction mixture was heated to 50° C. for 16 h. The reaction mixture was partitioned between EtOAc (20 mL) and H$_2$O (20 mL), the organic layer was separated and concentrated under reduced pressure. The crude product was purified by Prep-HPLC (Method A), the collected fractions were concentrated and the residue was diluted with EtOAc (10 mL), and washed with 10% sodium bicarbonate solution (10 mL). The organic layer was separated, dried over anhydrous Na$_2$SO$_4$ and concentrated to afford 5-amino-7-(4-fluorophenyl)-8-(4-methyl-1,3-benzoxazol-6-yl)-2-(3,3,3-trifluoropropyl)-[1,2,4]triazolo[4,3-c]pyrimidin-3-one (130 mg, 17%) as a yellow solid. The data for the title compound are in Table 3.

Route 1: Typical Procedure for the Preparation of Triazolopyrimidinones Via an Alcohol Mesylation and Displacement Reaction, Followed by a Suzuki Coupling Reaction Example 4-2, 5-amino-2-[(5-chloro-2-pyridyl)methyl]-7-(4-fluorophenyl)-8-(4-methyl-1,3-benzoxazol-6-yl)-[1,2,4]triazolo[4,3-c]pyrimidin-3-one

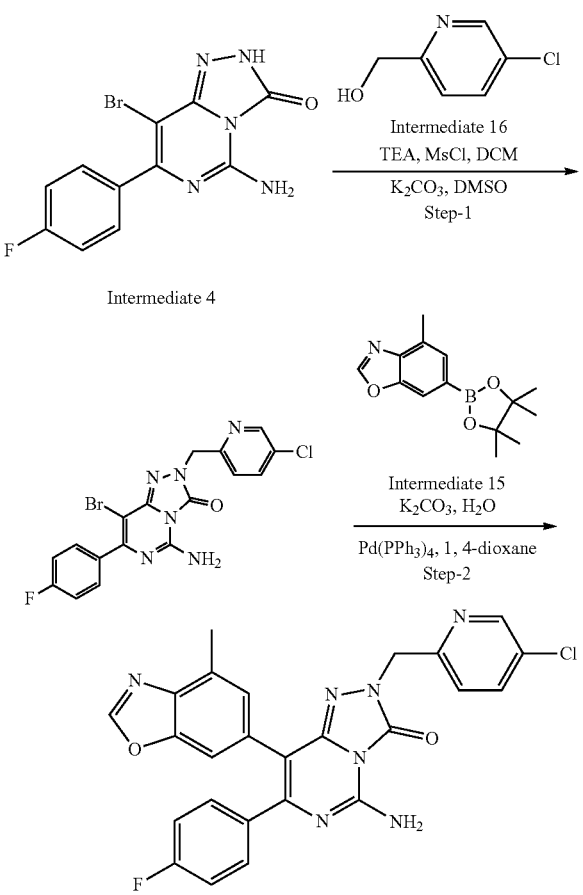

Example 4-2

Step 1; To a stirred solution of (5-chloropyridin-2-yl) methanol (797 mg, 5.5 mmol) and TEA (1.4 mL, 13.8 mmol) in DCM (20 mL) at 0° C. was added mesyl chloride (620 mg, 5.5 mmol) dropwise and the resultant reaction mixture was stirred at room temperature for 30 min. The reaction mixture was partitioned between DCM (2×20 mL) and H$_2$O (20 mL), the combined organics were separated and concentrated under reduced pressure to obtain mesylated intermediate. The mesylated intermediate was taken in DMSO (20 mL) and 5-amino-8-bromo-7-(4-fluorophenyl)-[1,2,4] triazolo[4,3-c]pyrimidin-3(2H)-one (1.5 g, 4.6 mmol), K$_2$CO$_3$ (1.90 g, 13.8 mmol) were added and the resultant reaction mixture was heated to 60° C. for 2 h. The reaction mixture was partitioned between EtOAc (2×20 mL) and H$_2$O (30×3 mL), the combined organics were separated and concentrated under reduced pressure. The crude product was purified by Prep-HPLC (Method A), collected fractions were concentrated and the residue was diluted with EtOAc (10 mL), washed with 10% sodium bicarbonate solution (10 mL). The organic layer was separated, dried over anhydrous Na₂SO₄ and concentrated to afford 5-amino-8-bromo-2-((5-chloropyridin-2-yl)methyl)-7-(4-fluorophenyl)-[1,2,4]triazolo[4,3-c]pyrimidin-3(2H)-one (1.5 g, 68%) as a pale brown solid.

LCMS (Method C): m/z 449 (M+H)⁺(ES⁺), at 2.45 min, UV active.

Step 2; Prepared in a similar fashion to route k, step-2 and purified by prep-HPLC (Method A) to afford 5-amino-2-[(5-chloro-2-pyridyl)methyl]-7-(4-fluorophenyl)-8-(4-methyl-1,3-benzoxazol-6-yl)-[1,2,4]triazolo[4,3-c]pyrimidin-3-one (150 mg, 12%) as a yellow solid. The data for the title compound are in Table 3.

Route m: Typical Procedure for the Preparation of Alkylated Triazolopyrimidinones Via an Alcohol Mesylation and Displacement Reaction, Followed by a Suzuki Coupling and Deprotection Example 4-4, 5-amino-2-[(5-fluoro-2-pyridyl)methyl]-8-(7-methyl-1H-indazol-5-yl)-7-phenyl-[1,2,4]triazolo[4,3-c]pyrimidin-3-one

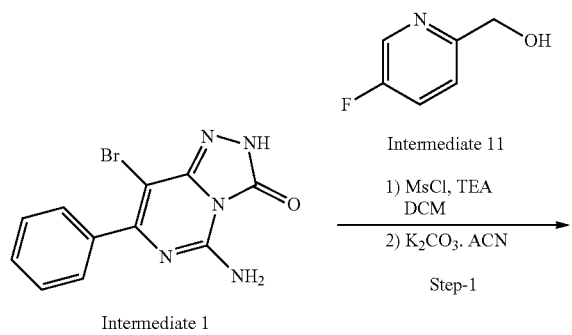

Intermediate 1

Intermediate 11

1) MsCl, TEA DCM
2) K₂CO₃. ACN

Step-1

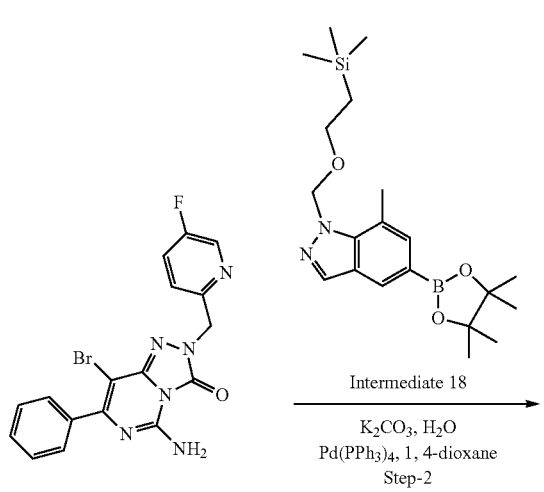

Intermediate 18

K₂CO₃, H₂O
Pd(PPh₃)₄, 1, 4-dioxane

Step-2

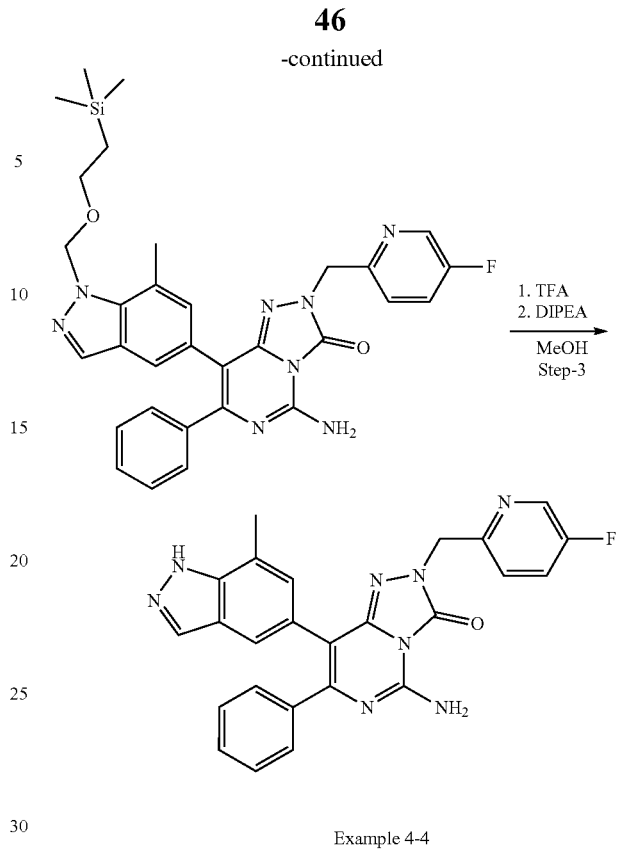

Example 4-4

1. TFA
2. DIPEA

MeOH
Step-3

Step 1; Performed in a similar fashion to route e step 1, using intermediates 1 and 11 to afford 5-amino-8-bromo-2-((5-fluoropyridin-2-yl)methyl)-7-phenyl-[1,2,4]triazolo[4,3-c]pyrimidin-3(2H)-one (170 mg, 41%) as an off-white solid.

LCMS (Method B): m/z 415 (M+H)⁺(ES⁺), at 2.64 min, UV active.

¹H NMR: (400 MHz, DMSO-d6) δ: 8.56 (s, 1H), 7.80 (m, 1H), 7.75 (d, J=7.6 Hz, 2H), 7.63-7.61 (m, 4H), 5.17 (s, 2H). Exchangeable —NH₂ Protons were not observed.

Step 2; To a mixture of 5-amino-8-bromo-2-((5-fluoropyridin-2-yl)methyl)-7-phenyl-[1,2,4]triazolo[4,3-c]pyrimidin-3(2H)-one (726 mg, 1.7 mmol) and 7-methyl-5-(4,4,5,5-tetramethyl-1,3,2-dioxaborolan-2-yl)-1-((2-(trimethylsilyl)ethoxy)methyl)-1H-indazole (600 mg, 1.75 mmol) in 1,4-dioxane (20 mL) and H₂O (0.4 mL), were added Pd(PPh₃)₄ (28 mg, 0.02 mmol) and K₂CO₃ (727 mg, 5.27 mmol) and the resultant reaction mixture was heated to 120° C. for 5 h. The reaction was partitioned between EtOAc (15 mL) and H₂O (10 mL). The organic layer was separated, dried over anhydrous Na₂SO₄ and concentrated under reduced pressure. The crude product was purified by Biotage-Isolera using 25 g silica snap and the desired compound was eluted with 0-100% EtOAc in pet-ether gradient to afford 5-amino-2-((5-fluoropyridin-2-yl)methyl)-8-(7-methyl-1-((2-(trimethylsilyl)ethoxy)methyl)-1H-indazol-5-yl)-7-phenyl-[1,2,4]triazolo[4,3-c]pyrimidin-3(2H)-one (250 mg, 25%) as a yellow solid.

LCMS (Method C): m/z 597 (M+H)⁺(ES⁺), at 1.77 min, UV active.

Step 3; A suspension of 5-amino-2-((5-fluoropyridin-2-yl)methyl)-8-(7-methyl-1-((2-(trimethylsilyl)ethoxy)methyl)-1H-indazol-5-yl)-7-phenyl-[1,2,4]triazolo[4,3-c]pyrimidin-3(2H)-one (250 mg, 0.42 mmol) in TFA (5 mL)

was stirred for 30 min at room temperature. The reaction mixture was concentrated under vacuum. The residue obtained was taken in MeOH (10 mL) and DIPEA (3.5 ml, 20.52 mmol) was added then heated to 70° C. for 3 h. The resulting solid collected by filtration through Buchner funnel, rinsed with H$_2$O (10 mL) and dried. The crude product was purified by prep-HPLC (Method-A). The collected fractions were concentrated and the residue obtained was diluted with EtOAc (10 mL) and washed with 10% sodium bicarbonate solution (10 mL). The organic layer was separated, dried over anhydrous Na$_2$SO$_4$ and concentrated to afford 5-amino-2-[(5-fluoro-2-pyridyl)methyl]-8-(7-methyl-1H-indazol-5-yl)-7-phenyl-[1,2,4]triazolo[4,3-c]pyrimidin-3-one (30 mg, 15%) as a yellow solid. The data for the title compound are in Table 3.

Route n: Typical Procedure for the Preparation of Alkylated Triazolopyrimidinones Via an Alcohol Tosylation and Displacement Reaction, Followed by a Suzuki Coupling Example 4-6,5-amino-8-(4-methyl-1,3-benzoxazol-6-yl)-2-[(5-methyloxazol-4-yl)methyl]phenyl-[1,2,4]triazolo[4,3-c]pyrimidin-3-one Step 1; Prepared in a similar fashion to route f step 1, using Intermediates 1 and 22 and purified by Biotage Isolera using silica (230-400) mesh, eluted with (0-100%) EtOAc in pet ether gradient to afford 5-amino-8-bromo-2-((5-methyloxazol-4-yl)methyl)-7-phenyl-[1,2,4]triazolo[4,3-c]pyrimidin-3(2H)-one (70 mg, 41%) as yellow solid.

LCMS (Method C): m/z 401 (M+H)$^+$(ES$^+$), at 1.93 min, UV active.

$^1$H NMR: (400 MHz, DMSO-d6) δ: 7.82 (s, 1H), 7.37-7.30 (m, 5H), 4.89 (s, 2H), 2.39 (s, 3H). Exchangeable —NH$_2$ protons were not observed.

Step 2; Prepared in a similar fashion to route m step 2 to afford 5-amino-8-(4-methyl-1,3-benzoxazol-6-yl)-2-[(5-methyloxazol-4-yl)methyl]-7-phenyl-[1,2,4]triazolo [4,3-c]pyrimidin-3-one (90 mg, 41%) as an off-white solid. The data for the title compound are in Table 3.

Route o

Example 4-7,5-amino-2-[(2,5-dimethyloxazol-4-yl)methyl]-7-(4-fluorophenyl)-8-(4-methyl-1,3-benzoxazol-6-yl)-[1,2,4]triazolo[4,3-c]pyrimidin-3-one

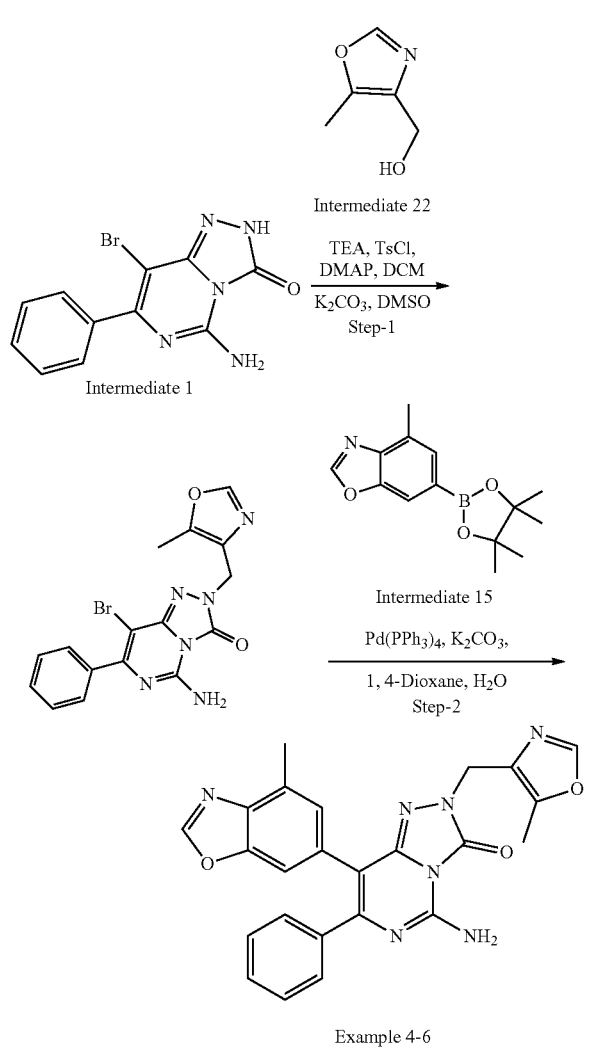

Example 4-6

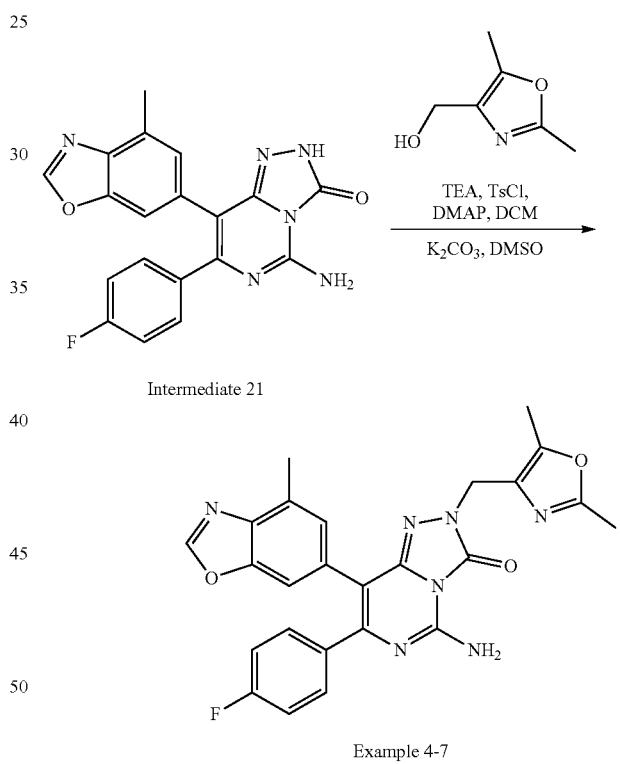

Example 4-7

To a solution of tosyl chloride (376 mg, 1.98 mmol), DMAP (16 mg, mmol) in DCM (25 mL) at 0° C. was added TEA (0.4 mL, 3.96 mmol) and (2,5-dimethyloxazol-4-yl)methanol (202 mg, 1.59 mmol) and the reaction mixture was stirred at room temperature for 30 min. The reaction mixture was partitioned between DCM (2×20 mL) and H$_2$O (10 mL). The organic layer was separated and concentrated to afford tosylated intermediate. The tosylated intermediate was taken in DMSO (15 mL) with 5-amino-7-(4-fluorophenyl)-8-(4-methylbenzo[d]oxazol-6-yl)-[1,2,4]triazolo[4,3-c]pyrimidin-3(2H)-one (500 mg, 1.32 mmol) and K$_2$CO$_3$ (546 mg, 3.9 mmol) and the resultant reaction mixture was heated to 80° C. for 3 h. The reaction mixture was partitioned between EtOAc (100 mL) and H₂O (50 mL). The organic layer was separated and concentrated under reduced pressure. The crude product was purified by prep-HPLC (Method A), collected fractions were concentrated under reduced pressure and the residue was diluted with EtOAc (30 mL) and washed with 10% sodium bicarbonate solution (10 mL). The organic layer was separated, dried over anhydrous Na₂SO₄ and concentrated to afford 5-amino-2-((2,5-dimethyloxazol-4-yl)methyl)-7-(4-fluorophenyl)-8-(4-methylbenzo[d]oxazol-6-yl)-[1,2,4]triazolo[4,3-c]pyrimidin-3(2H)-one (125 mg, 19%) as an off-white solid. The data for the title compound are in Table 3.

Route p: Typical Procedure for the Preparation of Alkylated Amine Analogues Via an Alcohol Tosylation and Displacement Reaction, Followed by Suzuki Coupling and Deprotection Example 4-8,5-amino-7-(4-fluorophenyl)-8-(7-methyl-1H-indazol-5-yl)-2-[(5-methyloxazol-4-yl)methyl]-[1,2,4]triazolo[4,3-c]pyrimidin-3-one

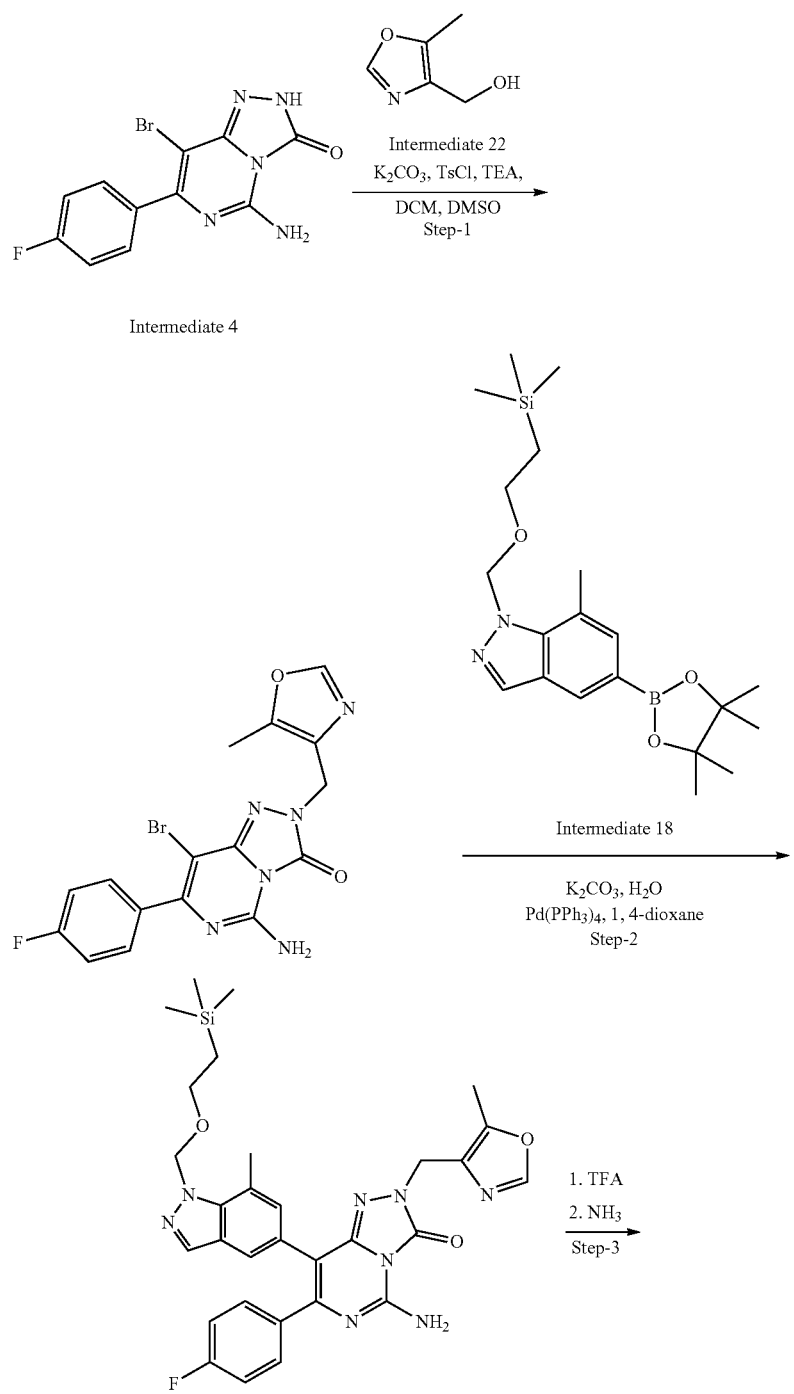

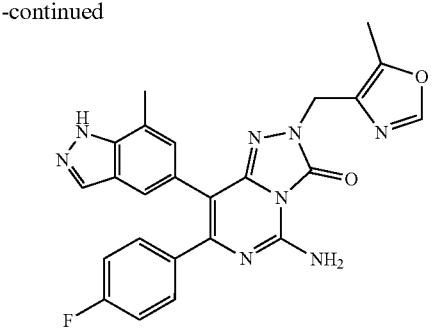

Example 4-8

Step 1; To a solution of tosyl chloride (380 mg, 2.002 mmol), TEA (0.7 mL, 4.620 mmol) and DMAP (18 mg, 0.154 mmol) in DCM (10 mL) at 0° C., (5-methyloxazol-4-yl)methanol (209 mg, 1.8 mmol) was added and the resultant reaction mixture was stirred at room temperature for 30 min. The reaction mixture was partitioned between DCM (20 mL) and H$_2$O (20 mL). The organic layer was separated and concentrated under reduced pressure to afford tosylated intermediate. The tosylated intermediate was taken in DMSO (20 mL) and 5-amino-8-bromo-7-(4-fluorophenyl)-[1,2,4]triazolo[4,3-c]pyrimidin-3(2H)-one (500 mg, 1.5 mmol) and K$_2$CO$_3$ (620 mg, 4.620 mmol) were added and the resultant reaction mixture was heated to 80° C. for 2 h. The reaction mixture was partitioned between EtOAc (10 mL) and H$_2$O (10 mL). The organic layer was separated and concentrated under reduced pressure. The crude product was purified by Biotage-Isolera using 25 g silica snap and eluted with 0-100% EtOAc in pet-ether gradient to afford 5-amino-8-bromo-7-(4-fluorophenyl)-2-((5-methyloxazol-4-yl)methyl)-[1,2,4]triazolo[4,3-c]pyrimidin-3(2H)-one (200 mg, 31%) as an off white solid.

LCMS (Method C): m/z 419 (M+H)$^+$(ES$^+$), at 1.97 min, UV active.

$^1$H NMR: (400 MHz, DMSO-d6) δ: 8.19 (s, 1H), 7.69-7.66 (m, 2H), 7.32-7.27 (m, 2H), 4.91 (s, 2H), 2.00 (s, 3H). Exchangeable —NH$_2$ protons were not observed.

Step 2; Prepared in a similar fashion to route m step 2 to afford 5-amino-7-(4-fluorophenyl)-8-(7-methyl-1-((2-(trimethylsilyl)ethoxy)methyl)-1H-indazol-5-yl)-2-((5-methyloxazol-4-yl)methyl)-[1,2,4]triazolo[4,3-c]pyrimidin-3(2H)-one (250 mg, 35%) as a yellow solid.

LCMS (Method C): m/z 601 (M+H)$^+$(ES$^+$), at 2.86 min, UV active.

Step 3; A suspension of 5-amino-7-(4-fluorophenyl)-8-(7-methyl-1-((2-(trimethylsilyl)ethoxy)methyl)-1H-indazol-5-yl)-2-((5-methyloxazol-4-yl)methyl)-[1,2,4]triazolo[4,3-c]pyrimidin-3(2H)-one (250 mg, 0.42 mmol) in TFA (1.5 mL) was stirred for 30 min at room temperature. The reaction mixture was concentrated under reduced pressure. The crude material was taken in methanolic ammonia (4 M Solution) at 0° C. and heated to 70° C. for 3 h. The resulting precipitate was filtered and dried. The crude product was purified by Prep-HPLC (Method-A). Collected fractions were concentrated and the residue was diluted with EtOAc (10 mL) and washed with 10% sodium bicarbonate solution (10 mL). The organic layer was separated, dried over anhydrous Na$_2$SO$_4$ and concentrated to afford 5-amino-7-(4-fluorophenyl)-8-(7-methyl-1H-indazol-5-yl)-2-((5-methyloxazol-4-yl) methyl)-[1,2,4]triazolo[4,3-c]pyrimidin-3(2H)-one (57 mg, 30%) as an off white solid. The data for the title compound are in Table 3.

TABLE 1

Examples

Example 1-1

Example 1-2

Example 1-3

TABLE 1-continued
Examples
Example 1-4
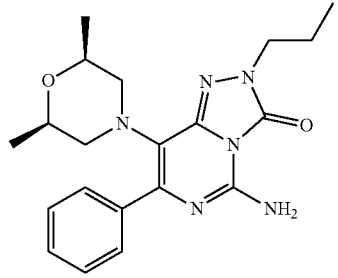 [SMILES: CCCn1nc2c(N3C[C@@H](C)O[C@@H](C)C3)c(-c3ccccc3)nc(N)n2c1=O]
Example 1-5
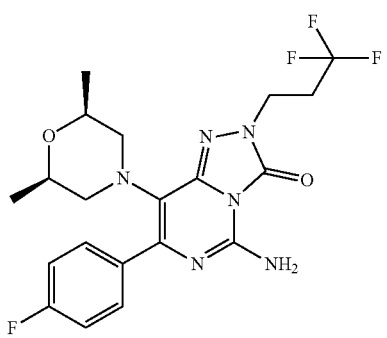 [SMILES: C[C@@H]1CN(c2c(-c3ccc(F)cc3)nc(N)n3c(=O)n(CCC(F)(F)F)nc23)C[C@H](C)O1]
Example 1-6
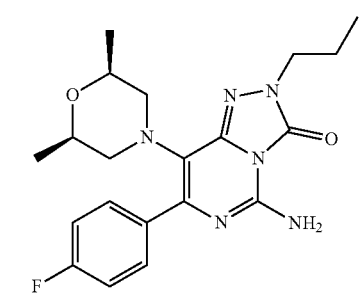
Example 1-7
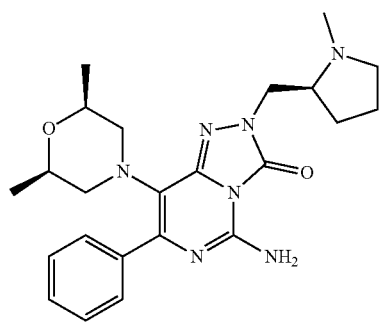 [SMILES: C[C@@H]1CN(c2c(-c3ccccc3)nc(N)n3c(=O)n(C[C@@H]4CCCN4C)nc23)C[C@H](C)O1]
Example 1-8
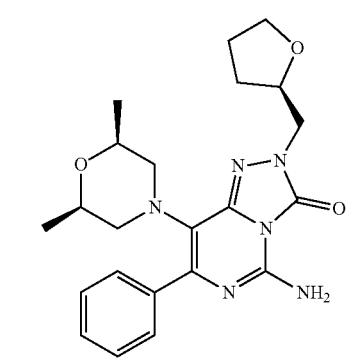 [SMILES: C[C@@H]1CN(c2c(-c3ccccc3)nc(N)n3c(=O)n(C[C@H]4CCCO4)nc23)C[C@H](C)O1]
TABLE 1-continued
Examples
Example 1-9
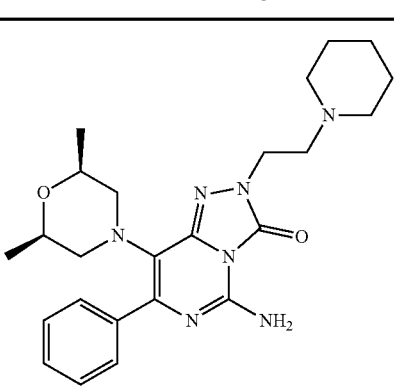
Example 1-10
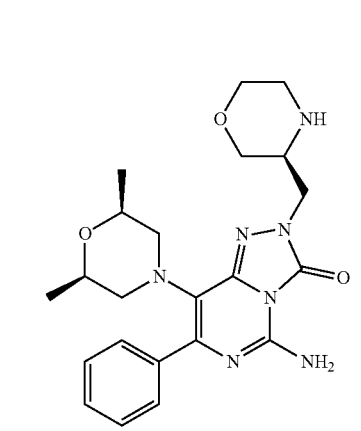 [SMILES: C[C@@H]1CN(c2c(-c3ccccc3)nc(N)n3c(=O)n(C[C@H]4COCCN4)nc23)C[C@H](C)O1]
Example 1-11
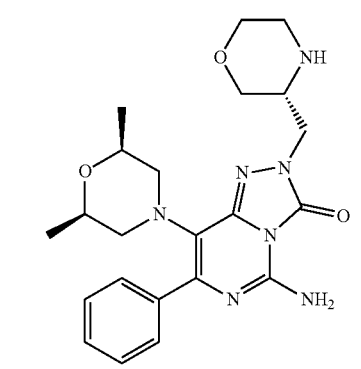 [SMILES: C[C@@H]1CN(c2c(-c3ccccc3)nc(N)n3c(=O)n(C[C@@H]4COCCN4)nc23)C[C@H](C)O1]
Example 1-12
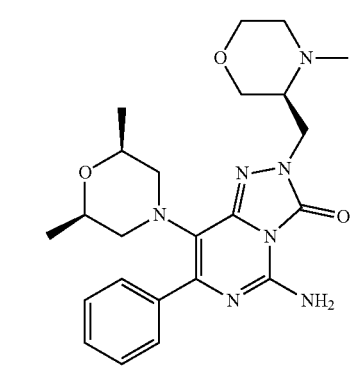

TABLE 1-continued
Examples
Example 1-13
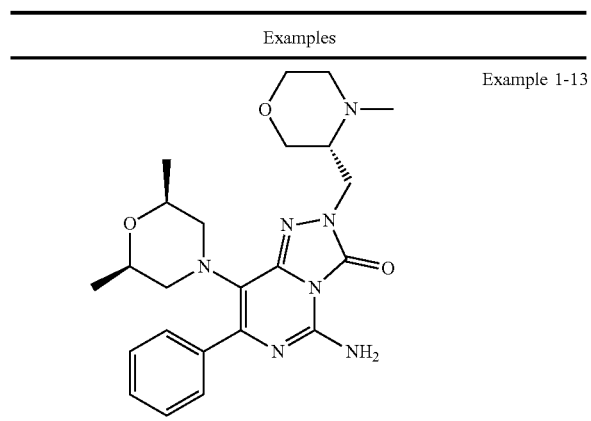
Example 1-14
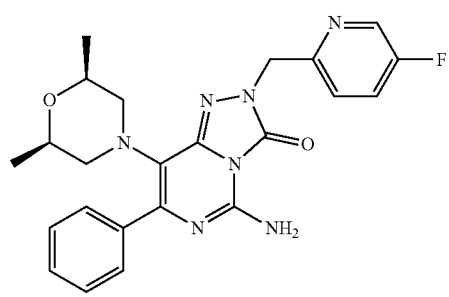 [SMILES: C[C@@H]1CN(c2c(-c3ccccc3)nc(N)n3c(=O)n(Cc4ccc(F)cn4)nc23)C[C@H](C)O1]
Example 1-15
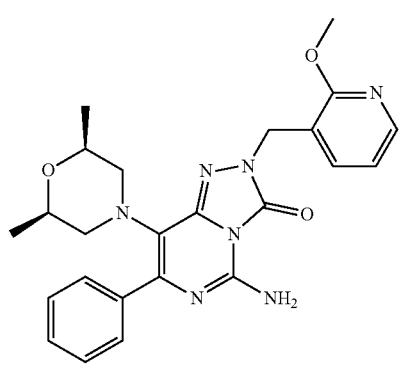 [SMILES: COc1ncccc1Cn1nc2c(N3C[C@@H](C)O[C@@H](C)C3)c(-c3ccccc3)nc(N)n2c1=O]
Example 1-16
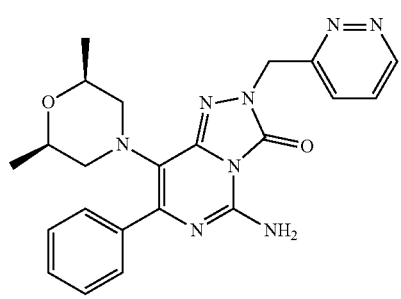 [SMILES: C[C@@H]1CN(c2c(-c3ccccc3)nc(N)n3c(=O)n(Cc4cccnn4)nc23)C[C@H](C)O1]
TABLE 1-continued
Examples
Example 1-17
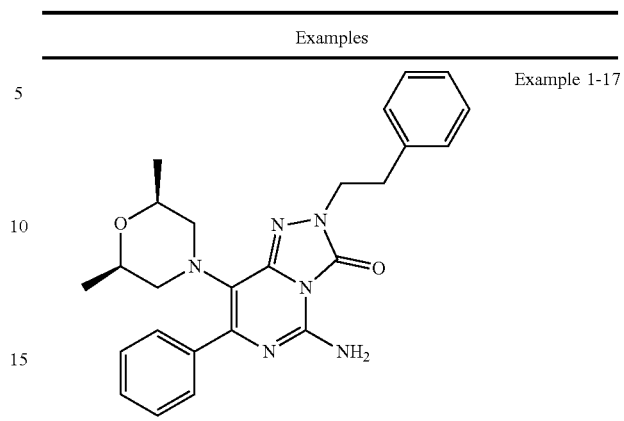
Example 2-1
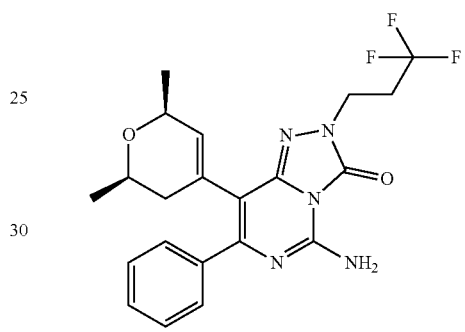
Example 2-2
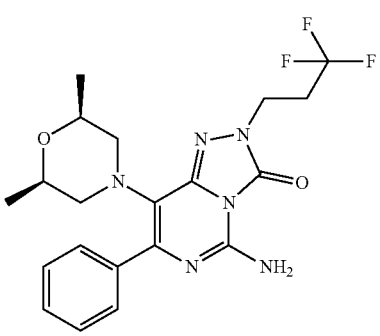 [SMILES: C[C@@H]1CN(c2c(-c3ccccc3)nc(N)n3c(=O)n(CCC(F)(F)F)nc23)C[C@H](C)O1]
Example 3-1
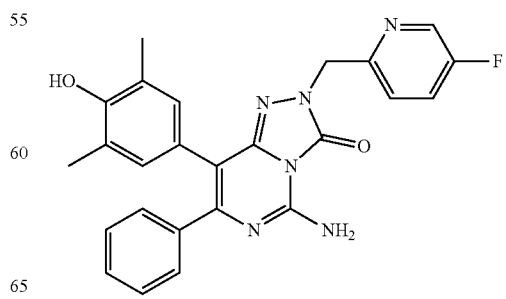

TABLE 1-continued

Examples

Example 4-1

Example 4-2

Example 4-3

Example 4-4

Example 4-5

TABLE 1-continued

Examples

Example 4-6

Example 4-7

Example 4-8

Example 4-9

Example 4-10

TABLE 1-continued

Examples

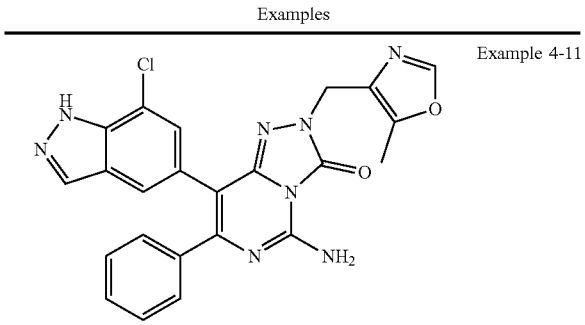

Example 4-11

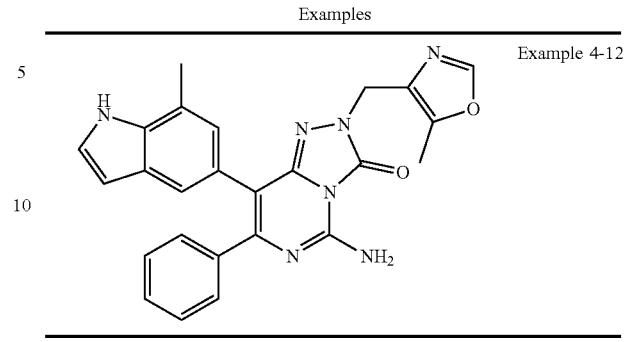

Example 4-12

TABLE 2

| Int. | Route | Name | Data |
|---|---|---|---|
| 1 | 1 | 5-amino-8-bromo-7-phenyl-[1,2,4]triazolo[4,3-c]pyrimidin-3(2H)-one | LCMS (Method C): m/z 306 (M + H)+ (ES+), at 1.78 min, UV active. $^1$H NMR: (400 MHz, DMSO-d6) δ: 12.57 (s, 1H), 7.62-7.60 (m, 2H), 7.45-7.41 (m, 3H). Exchangeable —NH$_2$ protons were not observed. |
| 2 | | 3,3,3-trifluoropropan-1-ol | |
| 3 | 2 | 5-amino-8-bromo-7-phenyl-2-(3,3,3-trifluoropropyl)-[1,2,4]triazolo[4,3-c]pyrimidin-3(2H)-one | LCMS (Method B): m/z 402 (M + H)+ (ES+), at 2.69 min, UV active. $^1$H NMR: (400 MHz, DMSO-d6) δ: 8.26 (s, 2H), 7.64-7.61 (m, 2H), 7.47-7.44 (m, 3H), 4.10 (t, J = 8.8 Hz, 2H), 2.84-2.76 (m, 2H). |
| 4 | 3 | 5-amino-8-bromo-7-(4-fluorophenyl)-[1,2,4]triazolo[4,3-c]pyrimidin-3(2H)-one | LCMS (Method C): m/z 323 (M + H)+ (ES+), at 1.87 min, UV active. $^1$H NMR: (400 MHz, DMSO-d6) δ: 12.58 (s, 1H), 8.19-8.01 (m, 2H), 7.70-7.67 (m, 2H), 7.32-7.27 (m, 2H). |
| 5 | 2 (Intermediate 3) | 5-amino-8-bromo-7-(4-fluorophenyl)-2-(3,3,3-trifluoropropyl)-[1,2,4]triazolo[4,3-c]pyrimidin-3(2H)-one | LCMS (Method A): m/z 420 (M + H)+ (ES+), at 2.97 min, UV active. $^1$H NMR: (400 MHz, DMSO-d6) δ: 7.69 (d, J = 4.0 Hz, 2H), 7.33-7.30 (m, 2H), 4.12-4.10 (m, 2H), 2.78-2.76 (m, 2H). Exchangeable —NH$_2$ protons were not observed. |
| 6 | | 1-bromopropane | |
| 7 | | (S)-(1-methylpyrrolidin-2-yl)methanol | |
| 8 | | 1-(2-chloroethyl)piperidine hydrochloride | |
| 9 | | (S)-(4-benzylmorpholin-3-yl)methanol | |
| 10 | | (R)-(4-benzylmorpholin-3-yl)methanol | |
| 11 | | (5-Fluoropyridin-2-yl)methanol | |
| 12 | | (2-methoxypyridin-3-yl)methanol | |
| 13 | | pyridazin-3-ylmethanol | |
| 14 | | (2-bromoethyl)benzene | |
| 15 | 4 | 4-methyl-6-(4,4,5,5-tetramethyl-1,3,2-dioxaborolan-2-yl)benzo[d]oxazole | Used crude |
| 16 | | (5-Chloropyridin-2-yl)methanol | |
| 17 | | 5-Methyl-2-pyridinemethanol | |
| 18 | 5 | 7-methyl-5-(4,4,5,5-tetramethyl-1,3,2-dioxaborolan-2-yl)-1-((2-(trimethylsilyl)ethoxy)methyl)-1H-indazole | Used crude |

TABLE 2-continued

Intermediates

| Int. | Route | Name | Data |
|---|---|---|---|
| 19 | 5 (Intermediate 20, step 1) | 7-methyl-5-(4,4,5,5-tetramethyl-1,3,2-dioxaborolan-2-yl)-1-((2-(trimethylsilyl)ethoxy)methyl)-1H-benzo[d]imidazole | Used crude |
| 20 | | 5-Bromo-7-methyl-1H-benzimidazole | |
| 21 | k (steps 1-3) | 5-amino-7-(4-fluorophenyl)-8-(4-methylbenzo[d]oxazol-6-yl)-[1,2,4]triazolo[4,3-c]pyrimidin-3(2H)-one | LCMS (Method C): m/z 375 (M − H)⁻ (ES⁻), at 2.30 min, UV active.<br>$^1$H NMR: (400 MHz, DMSO-d6) δ: 12.40 (s, 1H), 8.67 (s, 2H), 7.61 (s, 1H), 7.31-7.27 (m, 3H), 7.07-7.02 (m, 3H), 2.44 (s, 3H). |
| 22 | | (5-methyloxazol-4-yl)methanol | |
| 23 | 1 (intermediate 24, step 1) | 5-amino-8-bromo-7-(phenyl-d5)-[1,2,4]triazolo[4,3-c]pyrimidin-3(2H)-one | $^1$H NMR: (400 MHz, DMSO-d6) δ: 12.57 (s, 1H), 8.30 (s, 1H), 7.59 (s, 1H). |
| 24 | | (phenyl-d5)boronic acid | |
| 25 | 5 (intermediate 26, step 1) | 7-chloro-5-(4,4,5,5-tetramethyl-1,3,2-dioxaborolan-2-yl)-1-((2-(trimethylsilyl)ethoxy)methyl)-1H-benzo[d]imidazole | Used crude |
| 26 | | 5-Bromo-7-chloro-1H-indazole | |
| 27 | 6 | 7-methyl-5-(4,4,5,5-tetramethyl-1,3,2-dioxaborolan-2-yl)-1H-indole | Used crude |

TABLE 3

Data for Examples

| Ex. | Name | Details |
|---|---|---|
| 1-1 | 5-amino-8-[(cis)-2,6-dimethylmorpholin-4-yl]-7-phenyl-2-(3,3,3-trifluoropropyl)-[1,2,4]triazolo[4,3-c]pyrimidin-3-one | Synthetic route a<br>$^1$H NMR (400 MHz, DMSO-d6) δ: 7.86-7.47 (m, 4H), 7.48-7.26 (m, 3H), 4.10 (t, J = 6.6 Hz, 2H), 3.59-3.45 (m, 2H), 2.98 (t, J = 10.8 Hz, 2H), 2.90-2.73 (m, 2H), 2.71-2.60 (m, 2H), 1.02 (d, J = 6.2 Hz, 6H).<br>LCMS Method A: m/z 437 (M + H)⁺ (ES+), at 4.38 min, UV active |
| 1-2 | 5-amino-8-[(cis)-2,6-dimethylmorpholin-4-yl]-2-(3-fluoropropyl)-7-phenyl-[1,2,4]triazolo[4,3-c]pyrimidin-3-one | Synthetic route b<br>$^1$H NMR (400 MHz, DMSO-d6) δ: 7.86-7.77 (m, 2H), 7.69 (s, 2H), 7.46-7.25 (m, 3H), 4.70-4.39 (m, 2H), 4.04-3.86 (m, 2H), 3.60-3.41 (m, 2H), 2.97 (t, J = 10.8 Hz, 2H), 2.73-2.59 (m, 2H), 2.20-2.01 (m, 2H), 1.01 (d, J = 6.2 Hz, 6H).<br>LCMS Method A: m/z 401 (M + H)⁺ (ES+), at 3.82 min, UV active |
| 1-3 | 5-amino-2-(3,3-difluoropropyl)-8-[(cis)-2,6-dimethylmorpholin-4-yl]-7-phenyl-[1,2,4]triazolo[4,3-c]pyrimidin-3-one | Synthetic route c<br>$^1$H NMR (400 MHz, DMSO-d6) δ: 7.81 (d, J = 7.5 Hz, 2H), 7.69 (s, 2H), 7.49-7.28 (m, 3H), 6.42-6.02 (m, 1H), 4.03-3.93 (m, 2H), 3.57-3.46 (m, 2H), 2.96 (t, J = 10.8 Hz, 2H), 2.69-2.59 (m, 2H), 2.39-2.19 (m, 2H), 1.01 (d, J = 6.1 Hz, 6H).<br>LCMS Method A: m/z 419 (M + H)⁺ (ES+), at 4.06 min, UV active |
| 1-4 | 5-amino-8-[(cis)-2,6-dimethylmorpholin-4-yl]-7-phenyl-2-propyl-[1,2,4]triazolo[4,3-c]pyrimidin-3-one | Synthetic route d<br>$^1$H NMR (400 MHz, DMSO-d6) δ: 7.82 (d, J = 7.9 Hz, 2H), 7.71-7.54 (m, 2H), 7.41-7.38 (m, 3H), 3.79 (t, J = 7.0 Hz, 2H), 3.54-3.52 (m, 2H), 3.00-2.97 (m, 2H), 2.67 (d, J = 9.7 Hz, 2H), 1.77-1.72 (m, 2H), 1.01 (d, J = 6.2 Hz, 6H), 0.92 (t, J = 7.3 Hz, 3H).<br>LCMS Method A: m/z 383 (M + H)⁺ (ES+), at 4.02 min, UV active |
| 1-5 | 5-amino-8-[(cis)-2,6-dimethylmorpholin-4-yl]-7-(4-fluorophenyl)-2-(3,3,3-trifluoropropyl)-[1,2,4]triazolo[4,3-c]pyrimidin-3-one | Synthetic route a; intermediate 5<br>$^1$H NMR (400 MHz, DMSO-d6) δ: 7.98-7.86 (m, 2H), 7.73 (s, 2H), 7.31-7.15 (m, 2H), 4.11 (d, J = 6.5 Hz, 2H), 3.66-3.41 (m, 2H), 3.01 (t, J = 10.7 Hz, 2H), 2.89-2.72 (m, 2H), 2.72-2.59 (m, 2H), 1.13-0.96 (m, 6H).<br>LCMS Method A: m/z 455 (M + H)⁺ (ES+), at 4.70 min, UV active |

TABLE 3-continued

Data for Examples

| Ex. | Name | Details |
|---|---|---|
| 1-6 | 5-amino-8-[(cis)-2,6-dimethylmorpholin-4-yl]-7-(4-fluorophenyl)-2-propyl-[1,2,4]triazolo[4,3-c]pyrimidin-3-one | Synthetic route d; intermediates 4 & 6 (step 1)<br>$^1$H NMR (400 MHz, DMSO-d6) 7.95-7.88 (m, 2H), 7.26-7.18 (m, 2H), 3.78 (t, J = 6.9 Hz, 2H), 3.59-3.50 (m, 2H), 3.00 (t, J = 10.8 Hz, 2H), 2.69-2.66 (m, 2H), 1.79-1.69 (m, 2H), 1.02 (d, J = 6.2 Hz, 6H), 0.91 (t, J = 7.4 Hz, 3H). Exchangeable —NH$_2$ Protons were not observed.<br>LCMS Method A: m/z 401 (M + H)$^+$ (ES+), at 4.03 min, UV active |
| 1-7 | 5-amino-8-[(cis)-2,6-dimethylmorpholin-4-yl]-2-[[(2S)-1-methylpyrrolidin-2-yl]methyl]-7-phenyl-[1,2,4]triazolo[4,3-c]pyrimidin-3-one | Synthetic route e<br>$^1$H NMR (400 MHz, DMSO-d6) δ: 7.83-7.81 (m, 2H), 7.70 (s, 2H), 7.41-7.35 (m, 3H), 3.90 (dd, J = 13.8, 4.1 Hz, 1H), 3.76 (dd, J = 6.7, 13.8 Hz, 1H), 3.52 (t, J = 7.1 Hz, 2H), 2.99-2.94 (m, 3H), 2.68-2.63 (m, 2H), 2.31 (s, 3H), 2.21-2.14 (m, 2H), 1.92-1.87 (m, 1H), 1.80-1.77 (m, 1H), 1.68-1.62 (m, 2H), 1.01 (d, J = 6.1 Hz, 6H).<br>LCMS Method A: m/z 438 (M + H)$^+$ (ES+), at 2.95 min, UV active |
| 1-8 | 5-amino-8-[(cis)-2,6-dimethylmorpholin-4-yl]-7-phenyl-2-[[(2R)-tetrahydrofuran-2-yl]methyl]-[1,2,4]triazolo[4,3-c]pyrimidin-3-one | Synthetic route f<br>$^1$H NMR (400 MHz, DMSO-d6) δ: 7.83-7.81 (m, 2H), 7.42 (s, 2H), 7.37-7.35 (m, 3H), 4.22-3.88 (m, 1H), 3.81-3.80 (m, 1H), 3.78-3.76 (m, 2H), 3.76-3.55 (m, 1H), 3.53-3.50 (m, 2H), 3.01-2.95 (m, 2H), 2.66-2.62 (m, 2H), 1.91-2.10 (m, 1H), 1.86-1.83 (m, 2H), 2.66-2.80 (m, 1H), 1.01 (d, J = 6.40 Hz, 6H).<br>LCMS Method A: m/z 425 (M + H)$^+$ (ES+), at 3.70 min, UV active |
| 1-9 | 5-amino-8-[(cis)-2,6-dimethylmorpholin-4-yl]-7-phenyl-2-[2-(1-piperidyl)ethyl]-[1,2,4]triazolo[4,3-c]pyrimidin-3-one | Synthetic route d; intermediates 8 & 1 (step 1)<br>$^1$H NMR (400 MHz, DMSO-d6) δ: 7.82 (d, J = 8.0 Hz, 2H), 7.70 (s, 2H), 7.41-7.33 (m, 3H), 4.12-3.91 (m, 2H), 3.52-3.51 (m, 2H), 2.99 (t, J = 10.6 Hz, 2H), 2.68-2.64 (m, 4H), 2.51-2.34 (m, 4H), 1.46-1.38 (m, 4H), 1.37-1.24 (m, 2H), 1.02 (s, 6H).<br>LCMS Method A: m/z 452 (M + H)$^+$ (ES+), at 3.16 min, UV active |
| 1-10 | 5-amino-8-[(cis)-2,6-dimethylmorpholin-4-yl]-2-[[(3S)-morpholin-3-yl]methyl]-7-phenyl-[1,2,4]triazolo[4,3-c]pyrimidin-3-one | Synthetic route g<br>$^1$H NMR (400 MHz, DMSO-d6) δ: 7.81 (d, J = 6.8 Hz, 2H), 7.65 (s, 2H), 7.41-7.34 (m, 3H), 3.98-3.79 (m, 1H), 3.76-3.67 (m, 2H), 3.63-3.60 (m, 1H), 3.54-3.50 (m, 2H), 3.43-3.38 (m, 1H), 3.27-3.22 (m, 1H), 3.16-3.06 (m, 1H), 2.99-2.92 (m, 2H), 2.87-2.79 (m, 1H), 2.70-2.60 (m, 4H), 1.01 (d, J = 6.4 Hz, 6H).<br>LCMS Method A: m/z 440 (M + H)$^+$ (ES+), at 2.89 min, UV active |
| 1-11 | 5-amino-8-[(cis)-2,6-dimethylmorpholin-4-yl]-2-[[(3R)-morpholin-3-yl]methyl]-7-phenyl-[1,2,4]triazolo[4,3-c]pyrimidin-3-one | Synthetic route g; intermediates 10 & 1 (step 1)<br>$^1$H NMR (400 MHz, DMSO-d6) δ: 7.81 (d, J = 6.8 Hz, 2H), 7.65 (s, 2H), 7.41-7.34 (m, 3H), 3.98-3.67 (m, 3H), 3.63-3.60 (m, 1H), 3.54-3.50 (m, 2H), 3.43-3.38 (m, 1H), 3.27-3.22 (m, 1H), 3.16-3.06 (m, 1H), 2.99-2.92 (m, 2H), 2.87-2.79 (m, 1H), 2.70-2.60 (m, 4H), 1.01 (d, J = 6.4 Hz, 6H).<br>LCMS Method A: m/z 440 (M + H)$^+$ (ES+), at 2.90 min, UV active |
| 1-12 | 5-amino-8-[(cis)-2,6-dimethylmorpholin-4-yl]-2-[[(3S)-4-methylmorpholin-3-yl]methyl]-7-phenyl-[1,2,4]triazolo[4,3-c]pyrimidin-3-one | Synthetic route h<br>$^1$H NMR (400 MHz, DMSO-d6) δ: 7.82-7.80 (m, 2H), 7.65 (s, 2H), 7.42-7.35 (m, 3H), 3.97-3.95 (m, 1H), 3.88-3.86 (m, 1H), 3.75-3.74 (m, 1H), 3.72-3.71 (m, 1H), 3.68-3.42 (m, 4H), 2.98-2.94 (m, 2H), 2.70-2.64 (m, 2H), 2.52-2.51 (m, 2H), 2.34 (s, 3H), 2.24-2.22 (m, 1H), 1.01 (d, J = 6.2 Hz, 6H).<br>LCMS Method A: m/z 454 (M + H)$^+$ (ES+), at 2.94 min, UV active |
| 1-13 | 5-amino-8-[(cis)-2,6-dimethylmorpholin-4-yl]-2-[[(3R)-4-methylmorpholin-3-yl]methyl]-7-phenyl-[1,2,4]triazolo[4,3-c]pyrimidin-3-one | Synthetic route h; intermediate used: Example 1-11<br>$^1$H NMR (400 MHz, DMSO-d6) δ: 7.82-7.80 (m, 2H), 7.65 (s, 2H), 7.42-7.35 (m, 3H), 3.97-3.95 (m, 1H), 3.88-3.86 (m, 1H), 3.75-3.74 (m, 1H), 3.72-3.71 (m, 1H), 3.68-3.42 (m, 4H), 2.98-2.94 (m, 2H), 2.70-2.64 (m, 2H), 2.52-2.51 (m, 2H), 2.34 (s, 3H), 2.24-2.22 (m, 1H), 1.01 (d, J = 6.2 Hz, 6H).<br>LCMS Method A: m/z 454 (M + H)$^+$ (ES+), at 2.93 min, UV active |

TABLE 3-continued

Data for Examples

| Ex. | Name | Details |
|---|---|---|
| 1-14 | 5-amino-8-[(cis)-2,6-dimethylmorpholin-4-yl]-2-[(5-fluoro-2-pyridyl)methyl]-7-phenyl-[1,2,4]triazolo[4,3-c]pyrimidin-3-one | Synthetic route e; intermediates 11 & 1 (step 1)<br>$^1$H NMR (400 MHz, DMSO-d6) δ: 8.56 (s, 1H), 7.83-7.75 (m, 5H), 7.47-7.35 (m, 4H), 5.18 (s, 2H), 3.54-3.44 (m, 2H), 2.95-2.85 (m, 2H), 2.68-2.60 (m, 2H), 0.97 (d, J = 5.7 Hz, 6H).<br>LCMS Method A: m/z 450 (M + H)$^+$ (ES+), at 3.91 min, UV active |
| 1-15 | 5-amino-8-[(cis)-2,6-dimethylmorpholin-4-yl]-2-[(2-methoxy-3-pyridyl)methyl]-7-phenyl-[1,2,4]triazolo[4,3-c]pyrimidin-3-one | Synthetic route e; intermediates 12 & 1 (step 1)<br>$^1$H NMR (400 MHz, DMSO-d6) δ: 8.14 (d, J = 4.9 Hz, 1H), 7.82 (d, J = 8.2 Hz, 2H), 7.70 (s, 2H), 7.53 (d, J = 7.3 Hz, 1H), 7.41-7.35 (m, 3H), 7.01-6.98 (m, 1H), 4.99 (s, 2H), 3.93 (s, 3H), 3.50-3.49 (m, 2H), 2.93-2.91 (m, 2H), 2.65-2.60 (m, 2H), 0.97 (d, J = 6.2 Hz, 6H).<br>LCMS Method A: m/z 462 (M + H)$^+$ (ES+), at 4.03 min, UV active |
| 1-16 | 5-amino-8-[(cis)-2,6-dimethylmorpholin-4-yl]-7-phenyl-2-(pyridazin-3-ylmethyl)-[1,2,4]triazolo[4,3-c]pyrimidin-3-one | Synthetic route e; intermediates 13 & 1 (step 1)<br>$^1$H NMR (400 MHz, DMSO-d6) δ: 9.21-9.19 (m, 1H), 7.81-7.67 (m, 6H), 7.41-7.34 (m, 3H), 5.39 (s, 2H), 3.50-3.47 (m, 2H), 2.89-2.26 (m, 2H), 2.67-2.59 (m, 2H), 0.96 (d, J = 6.4 Hz, 6H).<br>LCMS Method A: m/z 433 (M + H)$^+$ (ES+), at 2.85 min, UV active |
| 1-17 | 5-amino-8-[(cis)-2,6-dimethylmorpholin-4-yl]-7-phenyl-2-(2-phenylethyl)-[1,2,4]triazolo[4,3-c]pyrimidin-3-one | Synthetic route d; intermediates 14 & 1 (step 1)<br>$^1$H NMR (400 MHz, DMSO-d6) δ: 7.82 (d, J = 7.3 Hz, 2H), 7.64 (s, 2H), 7.44-7.33 (m, 3H), 7.32-7.17 (m, 5H), 4.13-4.04 (m, 2H), 3.57-3.46 (m, 2H), 3.11-3.01 (m, 2H), 3.00-2.89 (m, 2H), 2.64-2.57 (m, 2H), 1.02 (d, J = 6.1 Hz, 6H).<br>LCMS Method A: m/z 445 (M + H)$^+$ (ES+), at 4.70 min, UV active |
| 2-1 | 5-amino-8-[(cis)-2,6-dimethyl-3,6-dihydro-2H-pyran-4-yl]-7-phenyl-2-(3,3,3-trifluoropropyl)-[1,2,4]triazolo[4,3-c]pyrimidin-3-one | Synthetic route i<br>$^1$H NMR (400 MHz, DMSO-d6) δ: 7.79 (s, 2H), 7.51-7.49 (m, 2H), 7.39-7.32 (m, 3H), 5.35 (s, 1H), 4.09-4.05 (m, 3H), 3.63-3.58 (m, 1H), 2.82-2.74 (m, 2H), 2.21-2.17 (m, 1H), 2.04-2.01 (m, 1H), 1.12 (d, J = 6.0 Hz, 3H), 0.92 (d, J = 6.0 Hz, 3H).<br>LCMS Method A: m/z 434 (M + H)$^+$ (ES+), at 4.26 min, UV active |
| 2-2 | 5-amino-8-[(cis)-2,6-dimethyltetrahydropyran-4-yl]-7-phenyl-2-(3,3,3-trifluoropropyl)-[1,2,4]triazolo[4,3-c]pyrimidin-3-one | Synthetic route i<br>$^1$H NMR (400 MHz, DMSO-d6) δ: 7.73-7.63 (m, 2H), 7.44-7.37 (m, 5H), 4.11 (t, J = 6.4 Hz, 2H), 3.34 (s, 2H), 2.82-2.74 (m, 3H), 2.08-1.98 (m, 2H), 1.47-1.44 (m, 2H), 1.09 (d, J = 8.0 Hz, 6H).<br>LCMS Method A: m/z 436 (M + H)$^+$ (ES+), at 4.19 min, UV active |
| 3-1 | 5-amino-2-[(5-fluoro-2-pyridyl)methyl]-8-(4-hydroxy-3,5-dimethyl-phenyl)-7-phenyl-[1,2,4]triazolo[4,3-c]pyrimidin-3-one | Synthetic route j<br>$^1$H NMR (400 MHz, DMSO-d6) δ: 8.52 (s, 1H), 8.22 (s, 1H), 7.71 (d, J = 6.0 Hz, 1H), 7.41 (d, J = 8.4 Hz, 1H), 7.40-7.39 (m, 2H), 7.30-7.28 (m, 3H), 6.68 (s, 2H), 5.11 (s, 2H), 2.00 (s, 6H). Exchangeable —NH$_2$ Protons were not observed.<br>LCMS Method A: m/z 457 (M + H)$^+$ (ES+), at 2.04 min, UV active |
| 4-1 | 5-amino-7-(4-fluorophenyl)-8-(4-methyl-1,3-benzoxazol-6-yl)-2-(3,3,3-trifluoropropyl)-[1,2,4]triazolo[4,3-c]pyrimidin-3-one | Synthetic route k<br>$^1$H NMR (400 MHz, DMSO-d6) δ: 8.68 (d, J = 5.0 Hz, 1H), 7.42 (s, 1H), 7.32-7.28 (m, 2H), 7.07-7.05 (m, 3H), 4.04 (d, J = 6.1 Hz, 2H), 2.70-2.65 (m, 2H), 2.33 (s, 3H). Exchangeable —NH$_2$ Protons were not observed.<br>LCMS Method D: m/z 473 (M + H)$^+$ (ES+), at 2.88 min, UV active |
| 4-2 | 5-amino-2-[(5-chloro-2-pyridyl)methyl]-7-(4-fluorophenyl)-8-(4-methyl-1,3-benzoxazol-6-yl)-[1,2,4]triazolo[4,3-c]pyrimidin-3-one | Synthetic route l<br>$^1$H NMR (400 MHz, DMSO-d6) δ: 8.66 (s, 1H), 8.56 (d, J = 2.5 Hz, 1H), 7.92 (d, J = 2.5 Hz, 1H), 7.39 (s, 2H), 7.32-7.28 (m, 2H), 7.07 (s, 2H), 6.97 (s, 1H), 5.12 (s, 2H), 2.34 (s, 3H). Exchangeable —NH$_2$ protons were not observed.<br>LCMS Method C: m/z 502 (M + H)$^+$ (ES+), at 2.19 min, UV active |
| 4-3 | 5-amino-7-(4-fluorophenyl)-8-(4-methyl-1,3-benzoxazol-6-yl)-2-[(5-methyl-2-pyridyl)methyl]-[1,2,4]triazolo[4,3-c]pyrimidin-3-one | Synthetic route l; intermediates 4 & 17 (step 1) (Step 2 purified by column chromatography (silica, 230-400) eluted with (50-60%) EtOAc in pet ether)<br>$^1$H NMR (400 MHz, DMSO-d6) δ: 8.66 (s, 1H), 8.32 (s, 1H), 7.58 (s, 1H), 7.37 (s, 1H), 7.32-7.29 (m, 2H), 7.19 |

TABLE 3-continued

Data for Examples

| Ex. | Name | Details |
|---|---|---|
| | | (s, 1H), 7.07-7.02 (m, 2H), 6.97 (d, J = 0.8 Hz, 1H), 5.05 (s, 2H), 2.39 (s, 3H), 2.26 (s, 3H). Exchangeable —NH$_2$ protons were not observed. LCMS Method C: m/z 482 (M + H)$^+$ (ES+), at 1.95 min, UV active |
| 4-4 | 5-amino-2-[(5-fluoro-2-pyridyl)methyl]-8-(7-methyl-1H-indazol-5-yl)-7-phenyl-[1,2,4]triazolo[4,3-c]pyrimidin-3-one | Synthetic route m<br>$^1$H NMR (400 MHz, DMSO-d6) δ: 13.09 (s, 1H), 8.49 (d, J = 2.8 Hz, 1H), 7.94 (s, 1H), 7.68 (d, J = 5.8 Hz, 1H), 7.40 (s, 2H), 7.36-7.27 (m, 2H), 7.26-7.26 (m, 3H), 6.86 (s, 1H), 5.10 (s, 2H), 2.36 (s, 3H). Exchangeable —NH$_2$ protons were not observed. LCMS Method C: m/z 467 (M + H)$^+$ (ES+), at 2.02 min, UV active |
| 4-5 | 5-amino-2-[(5-fluoro-2-pyridyl)methyl]-8-(7-methyl-1H-benzimidazol-5-yl)-7-phenyl-[1,2,4]triazolo[4,3-c]pyrimidin-3-one | Synthetic route m; intermediates 1 & 11 (step 1), 19 (step 2)<br>$^1$H NMR (400 MHz, DMSO-d6) δ: 8.49 (d, J = 2.8 Hz, 1H), 8.11 (s, 1H), 7.69-7.67 (m, 1H), 7.40-7.37 (m, 1H), 7.28-7.26 (m, 1H), 7.18-7.15 (m, 2H), 7.13-7.13 (m, 4H), 6.74 (s, 1H), 5.10 (s, 2H), 2.33 (s, 3H). Exchangeable —NH$_2$ protons were not observed. LCMS Method C: m/z 467 (M + H)$^+$ (ES+), at 1.24 min, UV active |
| 4-6 | 5-amino-8-(4-methyl-1,3-benzoxazol-6-yl)-2-[(5-methyloxazol-4-yl)methyl]-7-phenyl-[1,2,4]triazolo[4,3-c]pyrimidin-3-one | Synthetic route<br>$^1$H NMR (400 MHz, DMSO-d6) δ: 8.66 (s, 1H), 8.14 (s, 1H), 7.33 (s, 1H), 7.25-7.20 (m, 5H), 7.00 (s, 1H), 4.86 (s, 2H), 2.40 (s, 3H), 2.33 (s, 3H). Exchangeable —NH$_2$ protons were not observed. LCMS Method C: m/z 454 (M + H)$^+$ (ES+), at 1.92 min, UV active |
| 4-7 | 5-amino-2-[(2,5-dimethyloxazol-4-yl)methyl]-7-(4-fluorophenyl)-8-(4-methyl-1,3-benzoxazol-6-yl)-[1,2,4]triazolo[4,3-c]pyrimidin-3-one | Synthetic route o<br>$^1$H NMR (400 MHz, DMSO-d6) δ: 8.68 (s, 1H), 7.36 (s, 1H), 7.31-7.27 (m, 2H), 7.06-6.99 (m, 3H), 4.78 (s, 2H), 2.26 (s, 3H), 2.08 (s, 6H). Exchangeable —NH$_2$ protons were not observed. LCMS Method C: m/z 486 (M + H)$^+$ (ES+), at 1.92 min, UV active |
| 4-8 | 5-amino-7-(4-fluorophenyl)-8-(7-methyl-1H-indazol-5-yl)-2-[(5-methyloxazol-4-yl)methyl]-[1,2,4]triazolo[4,3-c]pyrimidin-3-one | Synthetic route p<br>$^1$H NMR (400 MHz, DMSO-d6) δ: 13.19 (s, 1H), 8.12 (s, 1H), 7.98 (s, 1H), 7.37 (s, 1H), 7.30-7.29 (m, 2H), 7.02-7.01 (m, 2H), 6.98-6.97 (m, 1H), 4.84 (s, 2H), 2.50 (s, 3H), 2.49 (s, 3H). Exchangeable —NH$_2$ protons were not observed. LCMS Method C: m/z 471 (M + H)$^+$ (ES+), at 1.77 min, UV active |
| 4-9 | 5-amino-8-(7-methyl-1H-indazol-5-yl)-2-[(5-methyloxazol-4-yl)methyl]-7-phenyl-[1,2,4]triazolo[4,3-c]pyrimidin-3-one | Synthetic route p; intermediates 1 & 22 (step 1)<br>$^1$H NMR (400 MHz, DMSO-d6) δ: 13.12 (s, 1H), 8.12 (s, 1H), 7.96 (d, J = 1.2 Hz, 1H), 7.35 (s, 1H), 7.27-7.24 (m, 2H), 7.16-7.11 (m, 3H), 6.88 (s, 1H), 4.84 (s, 2H), 2.38 (s, 3H), 2.33-2.30 (m, 3H). Exchangeable —NH$_2$ protons were not observed. LCMS Method C: m/z 453 (M + H)$^+$ (ES+), at 1.83 min, UV active |
| 4-10 | 5-amino-8-(7-methyl-1H-indazol-5-yl)-2-[(5-methyloxazol-4-yl)methyl]-7-(2,3,4,5,6-pentadeuteriophenyl)-[1,2,4]triazolo[4,3-c]pyrimidin-3-one | Synthetic route p; intermediates 23 & 22 (step 1)<br>$^1$H NMR (400 MHz, DMSO-d6) δ: 13.11 (s, 1H), 8.12 (s, 1H), 7.90 (s, 1H), 7.35 (s, 1H), 6.88 (s, 1H), 4.83 (s, 2H), 2.37 (s, 3H), 2.31 (s, 3H). Exchangeable —NH$_2$ protons were not observed. LCMS Method C: m/z 456 (M − H)$^−$ (ES−), at 2.48 min, UV active |
| 4-11 | 5-amino-8-(7-chloro-1H-indazol-5-yl)-2-[(5-methyloxazol-4-yl)methyl]-7-phenyl-[1,2,4]triazolo[4,3-c]pyrimidin-3-one | Synthetic route p; intermediates 1 & 22 (step 1), 25 (step 2)<br>$^1$H NMR (400 MHz, DMSO-d6) δ: 13.52 (s, 1H), 8.14-8.11 (m, 2H), 7.52 (s, 1H), 7.27 (t, J = 6.8 Hz, 2H), 7.20-7.17 (m, 4H), 4.86 (s, 2H), 2.32 (s, 3H). Exchangeable —NH$_2$ protons were not observed. LCMS Method C: m/z 473 (M + H)$^+$ (ES+), at 1.76 min, UV active |
| 4-12 | 5-amino-8-(7-methyl-1H-indol-5-yl)-2-[(5-methyloxazol-4-yl)methyl]-7-phenyl-[1,2,4]triazolo[4,3-c]pyrimidin-3-one | Synthetic route n; intermediate 27 (step 2)<br>$^1$H NMR (400 MHz, DMSO-d6) δ: 11.05 (s, 1H), 8.13 (s, 1H), 7.34-7.21 (m, 3H), 7.19-7.04 (m, 4H), 6.67 (s, 1H), 6.37-6.19 (m, 1H), 4.85 (s, 2H), 2.34 (s, 3H), 2.31 (s, 3H). Exchangeable —NH$_2$ protons were not observed. LCMS Method C: m/z 452 (M + H)$^+$ (ES+), at 2.16 min, UV active |

Example 5: Adenosine Receptor Binding Assay

Inhibition binding assays were performed using 0.2 µg of membranes prepared from HEK293 cells infected with BacMam human adenosine $A_{2A}$ receptor or 1.4 µg of membranes prepared from HEK293 cells infected with BacMam human adenosine A1 receptor. Membranes were incubated in 50 mM Tris-HCl (HEK293-h$A_{2A}$; pH 7.4) or 50 mM Tris-HCl, 100 mM NaCl, 10 mM MgCl2 (CHO-h$A_1$; pH 7.4) in the presence of varying concentrations of test compound and 1 nM [$^3$H]ZM241385 (HEK293-h$A_{2A}$) or [$^3$H]DPCPX (CHO-h$A_1$) at 25° C. for 1 h. The assay was then terminated by rapid filtration onto GF/B grade Unifilter plates using a TomTec cell harvester, followed by 5×0.5 ml washes with dd$H_2O$. Nonspecific binding was defined in the presence of 1 µM CGS15943 (HEK293-h$A_{2A}$) or 1 µM DPCPX (CHO-h$A_1$). Bound radioactivity was determined by liquid scintillation counting and inhibition curves were analysed using a four-parameter logistic equation. $IC_{50}$ values were converted to Ki values with the Cheng-Prusoff equation using a KD value derived from saturation binding studies. Results are summarized in Table 4.

TABLE 4

Adenosine receptor binding

| Example | A1 pKi | A2A pKi |
|---|---|---|
| 1-1 | <5.4 | 8.3 |
| 1-2 | <5.5 | 6.8 |
| 1-3 | <5.4 | 7.1 |
| 1-4 | <5.5 | 7.2 |
| 1-5 | <5.5 | 7.3 |
| 1-6 | 6.4 | 6.9 |
| 1-7 | 5.7 | 6.8 |
| 1-8 | <5.7 | 8.0 |
| 1-9 | <5.5 | 6.7 |
| 1-10 | <5.4 | 6.9 |
| 1-11 | <5.6 | 6.7 |
| 1-12 | <5.4 | 6.9 |
| 1-13 | <5.4 | 7.1 |
| 1-14 | 5.9 | 7.9 |
| 1-15 | 6.4 | 8.4 |
| 1-16 | 6.1 | 7.2 |
| 1-17 | <5.8 | 7.2 |
| 2-1 | 6.3 | 8.6 |
| 2-2 | <5.5 | 7.4 |
| 3-1 | 7.0 | 9.2 |
| 4-1 | 6.5 | 9.3 |
| 4-2 | 7.2 | 9.8 |
| 4-3 | 6.9 | 9.8 |
| 4-4 | 7.6 | 9.6 |
| 4-5 | 7.0 | 9.0 |
| 4-6 | 8.1 | 10.1 |
| 4-7 | 7.7 | 9.9 |
| 4-8 | 8.4 | 9.6 |
| 4-9 | 8.8 | 10.1 |
| 4-10 | 8.7 | 10.0 |
| 4-11 | 8.7 | 9.8 |
| 4-12 | 7.2 | 9.3 |

Example 6: CB-1 Receptor Binding and Antagonism

Receptor binding: Evaluation of the affinity of compounds for the agonist site of the human CB-1 cannabinoid receptor in transfected CHO cells determined in a radioligand binding assay: Cell membrane homogenates (20 µg protein) are incubated for 120 min at 37° C. with 0.5 nM [$^3$H]CP 55940 in the absence or presence of the test compound in a buffer containing 50 mM Tris-HCl (pH 7.4), 5 mM MgCl2, 2.5 mM EDTA and 0.3% BSA. Nonspecific binding is determined in the presence of 10 µM WIN 55212-2.

Following incubation, the samples are filtered rapidly under vacuum through glass fiber filters (GF/B, Packard) presoaked with 0.3% PEI and rinsed several times with an ice-cold buffer containing 50 mM Tris-HCl (pH 7.4) and 0.5% BSA using a 96-sample cell harvester (Unifilter, Packard). The filters are dried then counted for radioactivity in a scintillation counter (Topcount, Packard) using a scintillation cocktail (Microscint O, Packard).

The standard reference compound is CP 55940 which is tested in each experiment at several concentrations to obtain a competition curve from which its $IC_{50}$ is calculated.

Receptor antagonism: Evaluation of the antagonist activity of compounds at the human CB1 receptor expressed in transfected CHO cells, determined by measuring their effects on agonist-induced cAMP modulation using the HTRF detection method.

The cells are suspended in HBSS buffer (Invitrogen) complemented with 20 mM HEPES (pH 7.4), then distributed in microplates at a density of $5.10^3$ cells/well and preincubated for 5 min at room temperature in the presence of either of the following: HBSS (stimulated control), the reference antagonist AM 281 at 3 µM (basal control) or various concentrations ($IC_{50}$ determination), or the test compounds.

Thereafter, the reference agonist CP 55940 and the adenylyl cyclase activator NKH 477 are added at respective final concentrations of 3 nM and 3 µM.

For basal control measurements, CP 55940 is omitted from the wells containing 3 µM AM 281.

Following 20 min incubation at 37° C., the cells are lysed and the fluorescence acceptor (D2-labeled cAMP) and fluorescence donor (anti-cAMP antibody labeled with europium cryptate) are added.

After 60 min at room temperature, the fluorescence transfer is measured at $\lambda_{ex}$=337 nm and $\lambda_{em}$=620 and 665 nm using a microplate reader (Rubystar, BMG). The cAMP concentration is determined by dividing the signal measured at 665 nm by that measured at 620 nm (ratio).

The results are expressed as a percent inhibition of the control response to 3 nM CP 55940.

The standard reference antagonist is AM 281, which is tested in each experiment at several concentrations to generate a concentration-response curve from which its $IC_{50}$ value is calculated.

In Table 5, blank entries for $K_i$ indicate that the observed binding was too weak to measure a $K_i$ value.

TABLE 5

CB1 receptor binding and functional assay

| Example | Binding Ki (µM) | Antag IC50 (µM) |
|---|---|---|
| 1-1 | 33.9 | 14.7 |
| 1-8 | 66.5 | >100 |
| 1-14 | 9.5 | 7.0 |
| 2-1 | 31.5 | 72.2 |
| 3-1 | 25.2 | >100 |
| 4-1 | 3.7 | 2.4 |
| 4-4 | 5.5 | 1.3 |
| 4-5 | 24.4 | 68.6 |
| 4-6 | 23.0 | 17.9 |
| 4-9 | 39.1 | 15.5 |
| 4-11 | 2.5 | 2.6 |
| 4-12 | 39.6 | 22.5 |

Other embodiments are within the scope of the following claims.

What is claimed is:

1. A compound of Formula (IIa) or (IIb):

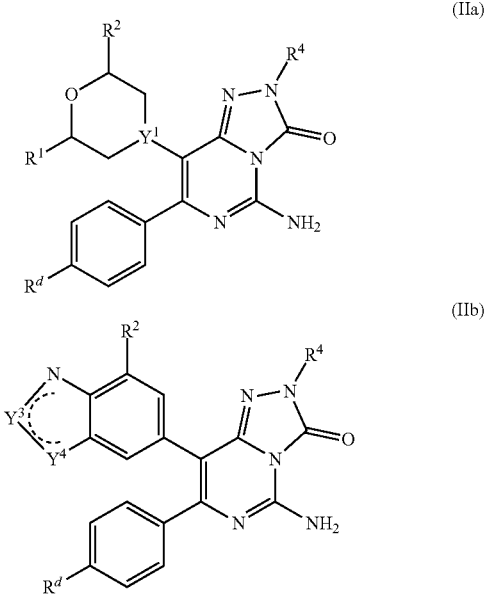

or a pharmaceutically acceptable salt thereof, wherein:
$Y^1$ is N or CH;
$Y^3$ and $Y^4$ together are —CH=N—, —N=CH—, —CH=CH—, or =CH—O—;
each $R^1$ and each $R^2$, independently, is halo, $C_{1-3}$alkyl, or —O—$C_{1-3}$alkyl;
wherein alkyl is optionally substituted with one or more substituents independently selected from —OH and halo;
$R^4$ is —CHR$^c$—R$^5$;
$R^5$ is:
(1) 5- or 6-membered heterocyclyl, or 5- or 6-membered heteroaryl;
wherein heterocyclyl and heteroaryl, independently, include from 1 to 4 heteroatoms independently selected from N, O, and S(O)$_k$;
wherein one or two ring atoms of $R^5$ is optionally replaced by —C(=O)—;
wherein heterocyclyl and heteroaryl are optionally substituted with one or more substituents independently selected from halo, —R$^e$, and —OR$^e$; or
(2) H, halo, or $C_{1-3}$alkyl;
wherein alkyl is optionally substituted with one or more substituents independently selected from —OH and halo;
each $R^a$ and each $R^b$, independently, is H, $C_{1-6}$alkyl, $C_{3-8}$cycloalkyl, or $C_{4-9}$ cycloalkylalkyl;
wherein each $R^a$ and each $R^b$, independently, is optionally substituted with one or more substituents independently selected from —OH and halo;
$R^c$ is H, halo, $C_{1-3}$alkyl, or —(CH$_2$)$_n$—NR$^a$R$^b$;
wherein alkyl is optionally substituted with one or more substituents independently selected from —OR$^a$ and halo;
$R^d$ is H or halo;
each $R^e$, independently, is H or $C_{1-6}$alkyl;
wherein alkyl is optionally substituted with one or more substituents independently selected from —OH and halo; n is 0 or 1; and k is 0, 1, or 2.

2. The compound of claim 1 of Formula (IIa), or a pharmaceutically acceptable salt thereof, wherein: $Y^1$ is N; and $R^1$ and $R^2$ are each independently —CH$_3$.

3. The compound of claim 1 of Formula (IIb), wherein: $R^2$ is —CH$_3$; and $R^5$ is 5- or 6-membered heteroaryl.

4. The compound of claim 1 of Formula (IIa) or Formula (IIb), or a pharmaceutically acceptable salt thereof, wherein: $R^c$ is H; and $R^5$ is $C_{1-3}$alkyl optionally substituted with from one to three fluoro.

5. A compound, or a pharmaceutically acceptable salt thereof, selected from the group consisting of:
5-amino-8-[(cis)-2,6-dimethylmorpholin-4-yl]-7-phenyl-2-(3,3,3-trifluoropropyl)-[1,2,4]triazolo [4,3-c]pyrimidin-3-one;
5-amino-8-[(cis)-2,6-dimethylmorpholin-4-yl]-2-(3-fluoropropyl)-7-phenyl-[1,2,4]triazolo [4,3-c]pyrimidin-3-one;
5-amino-2-(3,3-difluoropropyl)-8-[(cis)-2,6-dimethylmorpholin-4-yl]-7-phenyl-[1,2,4]triazolo [4,3-c]pyrimidin-3-one;
5-amino-8-[(cis)-2,6-dimethylmorpholin-4-yl]-7-phenyl-2-propyl-[1,2,4]triazolo [4,3-c] pyrimidin-3-one;
5-amino-8-[(cis)-2,6-dimethylmorpholin-4-yl]-7-(4-fluorophenyl)-2-(3,3,3-trifluoropropyl)-[1,2,4]triazolo [4,3-c]pyrimidin-3-one;
5-amino-8-[(cis)-2,6-dimethylmorpholin-4-yl]-7-(4-fluorophenyl)-2-propyl-[1,2,4]triazolo [4,3-c]pyrimidin-3-one;
5-amino-8-[(cis)-2,6-dimethylmorpholin-4-yl]-2-[(2S)-1-methylpyrrolidin-2-yl] methyl]-7-phenyl-[1,2,4]triazolo [4,3-c]pyrimidin-3-one;
5-amino-8-[(cis)-2,6-dimethylmorpholin-4-yl]-7-phenyl-2-[(2R)-tetrahydrofuran-2-yl] methyl]-[1,2,4]triazolo [4,3-c]pyrimidin-3-one;
5-amino-8-[(cis)-2,6-dimethylmorpholin-4-yl]-7-phenyl-2-[2-(1-piperidyl)ethyl]-[1,2,4]triazolo [4,3-c]pyrimidin-3-one;
5-amino-8-[(cis)-2,6-dimethylmorpholin-4-yl]-2-[(3S)-morpholin-3-yl] methyl]-7-phenyl-[1,2,4]triazolo [4,3-c]pyrimidin-3-one;
5-amino-8-[(cis)-2,6-dimethylmorpholin-4-yl]-2-[[(3R)-morpholin-3-yl] methyl]-7-phenyl-[1,2,4]triazolo [4,3-c]pyrimidin-3-one;
5-amino-8-[(cis)-2,6-dimethylmorpholin-4-yl]-2-[(3S)-4-methylmorpholin-3-yl] methyl]-7-phenyl-[1,2,4]triazolo [4,3-c]pyrimidin-3-one;
5-amino-8-[(cis)-2,6-dimethylmorpholin-4-yl]-2-[(3R)-4-methylmorpholin-3-yl] methyl]-7-phenyl-[1,2,4]triazolo [4,3-c]pyrimidin-3-one;
5-amino-8-[(cis)-2,6-dimethylmorpholin-4-yl]-2-[(5-fluoro-2-pyridyl)methyl]-7-phenyl-[1,2,4]triazolo [4,3-c]pyrimidin-3-one;
5-amino-8-[(cis)-2,6-dimethylmorpholin-4-yl]-2-[(2-methoxy-3-pyridyl)methyl]-7-phenyl-[1,2,4]triazolo [4,3-c]pyrimidin-3-one;
5-amino-8-[(cis)-2,6-dimethylmorpholin-4-yl]-7-phenyl-2-(pyridazin-3-ylmethyl)-[1,2,4]triazolo [4,3-c]pyrimidin-3-one;
5-amino-8-[(cis)-2,6-dimethylmorpholin-4-yl]-7-phenyl-2-(2-phenylethyl)-[1,2,4]triazolo [4,3-c]pyrimidin-3-one;
5-amino-8-[(cis)-2,6-dimethyl-3,6-dihydro-2H-pyran-4-yl]-7-phenyl-2-(3,3,3-trifluoropropyl)-[1,2,4]triazolo [4,3-c]pyrimidin-3-one;
5-amino-8-[(cis)-2,6-dimethyltetrahydropyran-4-yl]-7-phenyl-2-(3,3,3-trifluoropropyl)-[1,2,4]triazolo [4,3-c] pyrimidin-3-one;

5-amino-2-[(5-fluoro-2-pyridyl)methyl]-8-(4-hydroxy-3,5-dimethyl-phenyl)-7-phenyl-[1,2,4]triazolo [4,3-c]pyrimidin-3-one;

5-amino-7-(4-fluorophenyl)-8-(4-methyl-1,3-benzoxazol-6-yl)-2-(3,3,3-trifluoropropyl)-[1,2,4]triazolo [4,3-c]pyrimidin-3-one;

5-amino-2-[(5-chloro-2-pyridyl)methyl]-7-(4-fluorophenyl)-8-(4-methyl-1,3-benzoxazol-6-yl)-[1,2,4]triazolo [4,3-c]pyrimidin-3-one;

5-amino-7-(4-fluorophenyl)-8-(4-methyl-1,3-benzoxazol-6-yl)-2-[(5-methyl-2-pyridyl)methyl]-[1,2,4]triazolo [4,3-c]pyrimidin-3-one;

5-amino-2-[(5-fluoro-2-pyridyl)methyl]-8-(7-methyl-1H-indazol-5-yl)-7-phenyl-[1,2,4]triazolo [4,3-c]pyrimidin-3-one;

5-amino-2-[(5-fluoro-2-pyridyl)methyl]-8-(7-methyl-1H-benzimidazol-5-yl)-7-phenyl-[1,2,4]triazolo [4,3-c]pyrimidin-3-one;

5-amino-8-(4-methyl-1,3-benzoxazol-6-yl)-2-[(5-methyloxazol-4-yl) methyl]-7-phenyl-[1,2,4]triazolo [4,3-c]pyrimidin-3-one;

5-amino-2-[(2,5-dimethyloxazol-4-yl) methyl]-7-(4-fluorophenyl)-8-(4-methyl-1,3-benzoxazol-6-yl)-[1,2,4]triazolo [4,3-c]pyrimidin-3-one;

5-amino-7-(4-fluorophenyl)-8-(7-methyl-1H-indazol-5-yl)-2-[(5-methyloxazol-4-yl) methyl]-[1,2,4]triazolo [4,3-c]pyrimidin-3-one;

5-amino-8-(7-methyl-1H-indazol-5-yl)-2-[(5-methyloxazol-4-yl) methyl]-7-phenyl-[1,2,4]triazolo [4,3-c]pyrimidin-3-one;

5-amino-8-(7-methyl-1H-indazol-5-yl)-2-[(5-methyloxazol-4-yl) methyl]-7-(2,3,4,5,6-pentadeuteriophenyl)-[1,2,4]triazolo [4,3-c]pyrimidin-3-one;

5-amino-8-(7-chloro-1H-indazol-5-yl)-2-[(5-methyloxazol-4-yl) methyl]-7-phenyl-[1,2,4]triazolo [4,3-c]pyrimidin-3-one; and 5-amino-8-(7-methyl-1H-indol-5-yl)-2-[(5-methyloxazol-4-yl) methyl]-7-phenyl-[1,2,4]triazolo [4,3-c]pyrimidin-3-one.

6. A pharmaceutical composition comprising a compound of claim 1, or a pharmaceutically acceptable salt thereof, and a pharmaceutically acceptable carrier, diluent, or excipient.

7. A method for treating a disease or condition mediated by an adenosine receptor which comprises administering a compound of claim 1, or a pharmaceutically acceptable salt thereof, to a patient in need thereof,
wherein the disease or condition mediated by the adenosine receptor is lung cancer, pancreatic cancer, prostate cancer, ovarian cancer, cervical cancer, colorectal cancer, breast cancer, brain cancer, gastric cancer, liver cancer, renal cancer endometrial cancer, thyroid cancer, bladder cancer, glial cancer, or melanoma.

* * * * *